(12) United States Patent
Kim et al.

(10) Patent No.: US 11,296,829 B2
(45) Date of Patent: Apr. 5, 2022

(54) FEEDBACK METHOD FOR REPETITIVE UPLINK TRANSMISSION IN COMMUNICATION SYSTEM

(71) Applicant: ELECTRONICS AND TELECOMMUNICATIONS RESEARCH INSTITUTE, Daejeon (KR)

(72) Inventors: Cheul Soon Kim, Daejeon (KR); Gi Yoon Park, Daejeon (KR); Ok Sun Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 85 days.

(21) Appl. No.: 16/777,951

(22) Filed: Jan. 31, 2020

(65) Prior Publication Data

US 2020/0252168 A1 Aug. 6, 2020

(30) Foreign Application Priority Data

Feb. 1, 2019 (KR) .......... 10-2019-0013709
Mar. 29, 2019 (KR) .......... 10-2019-0037259
(Continued)

(51) Int. Cl.
*H04W 72/04* (2009.01)
*H04L 1/18* (2006.01)
(Continued)

(52) U.S. Cl.
CPC .......... *H04L 1/1819* (2013.01); *H04B 7/0456* (2013.01); *H04W 72/0413* (2013.01);
(Continued)

(58) Field of Classification Search
CPC ... H04B 7/0456; H04L 1/1664; H04L 1/1812; H04L 1/1819; H04L 1/1854;
(Continued)

(56) References Cited

U.S. PATENT DOCUMENTS 9,894,645 B2 2/2018 Kang et al.
10,003,439 B2 * 6/2018 Lee .............. H04L 1/1812
(Continued)

FOREIGN PATENT DOCUMENTS

WO 2017/030489 A1 2/2017
WO 2018/128401 A1 7/2018

*Primary Examiner* — Phuc H Tran
(74) *Attorney, Agent, or Firm* — Rabin & Berdo, P.C.

(57) ABSTRACT

Feedback methods for repetitive uplink transmissions in a communication system are disclosed. An operation method of a terminal may comprise receiving DL data #1 from a base station through a DL data channel #1; receiving DL data #2 from the base station through a DL data channel #2; and when each of a UL control channel #1 on which an HARQ response #1 for the DL data #1 is to be transmitted and a UL control channel #2 on which an HARQ response #2 for the DL data #2 is to be transmitted overlaps with a UL data channel assigned by the base station, transmitting the HARQ response #1 and the HARQ response #2 to the base station through the UL data channel. Therefore, the performance of the communication system can be improved.

14 Claims, 30 Drawing Sheets

(30) Foreign Application Priority Data

| Apr. 2, 2019 | (KR) | 10-2019-0038350 |
|---|---|---|
| Apr. 10, 2019 | (KR) | 10-2019-0042099 |
| Apr. 26, 2019 | (KR) | 10-2019-0049245 |
| May 3, 2019 | (KR) | 10-2019-0052539 |
| Oct. 18, 2019 | (KR) | 10-2019-0130005 |
| Nov. 8, 2019 | (KR) | 10-2019-0142650 |
| Nov. 13, 2019 | (KR) | 10-2019-0145445 |
| Dec. 27, 2019 | (KR) | 10-2019-0176957 |
| Jan. 20, 2020 | (KR) | 10-2020-0007059 |
| Jan. 30, 2020 | (KR) | 10-2020-0011087 |

(51) Int. Cl.
*H04W 72/12* (2009.01)
*H04B 7/0456* (2017.01)

(52) U.S. Cl.
CPC ... *H04W 72/1257* (2013.01); *H04W 72/1268* (2013.01); *H04W 72/1273* (2013.01)

(58) Field of Classification Search
CPC ... H04L 1/1858; H04L 1/1861; H04L 5/0053; H04L 5/0055; H04L 5/0048; H04L 5/005; H04L 5/0064; H04L 5/0091; H04L 1/0026; H04L 1/08; H04L 1/1607; H04L 1/1614; H04L 1/1671; H04L 1/1685; H04L 1/1825
See application file for complete search history.

(56) References Cited

U.S. PATENT DOCUMENTS

| 10,374,748 | B2* | 8/2019 | Oketani | H04L 1/1861 |
|---|---|---|---|---|
| 2018/0254851 | A1* | 9/2018 | Roessel | H04L 1/1861 |
| 2018/0278380 | A1 | 9/2018 | Kim et al. | |
| 2018/0324788 | A1 | 11/2018 | Choi et al. | |
| 2018/0367262 | A1 | 12/2018 | Hwang et al. | |
| 2019/0052421 | A1 | 2/2019 | Yin et al. | |
| 2019/0081763 | A1 | 3/2019 | Akkarakaran et al. | |
| 2019/0123879 | A1* | 4/2019 | Wang | H04L 5/0064 |
| 2021/0092762 | A1* | 3/2021 | Choi | H04W 72/12 |
| 2021/0184801 | A1* | 6/2021 | El Hamss | H04L 1/1854 |

* cited by examiner

100

SCHEME A

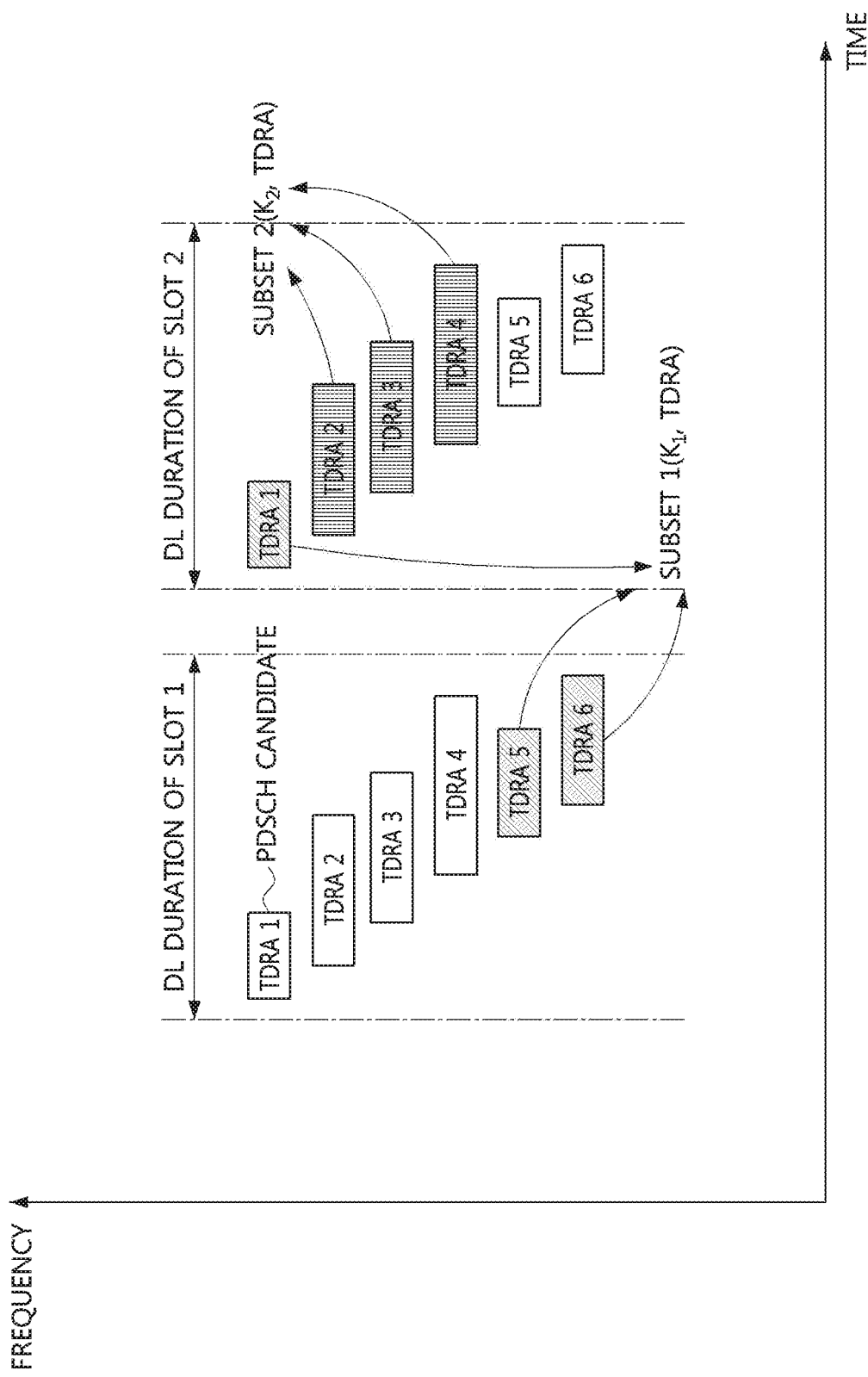

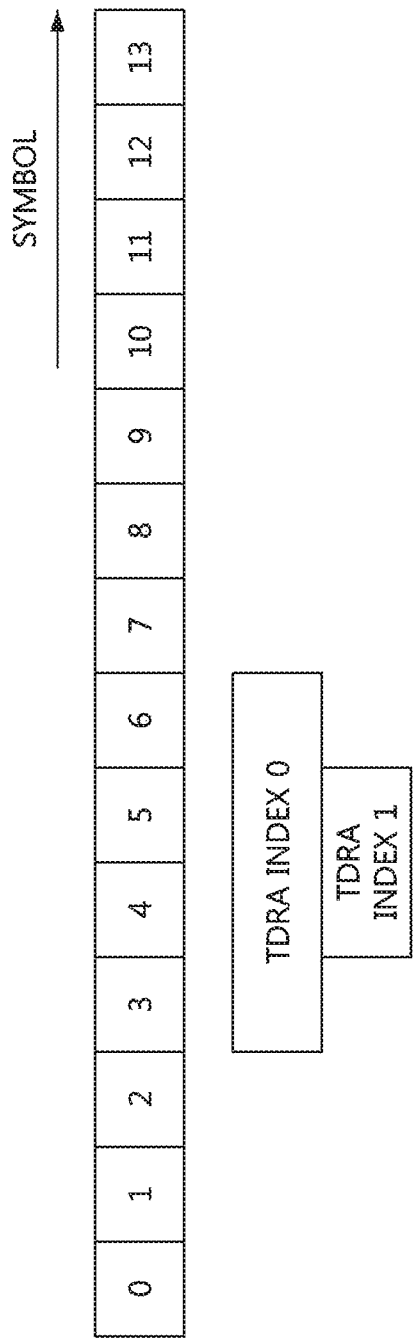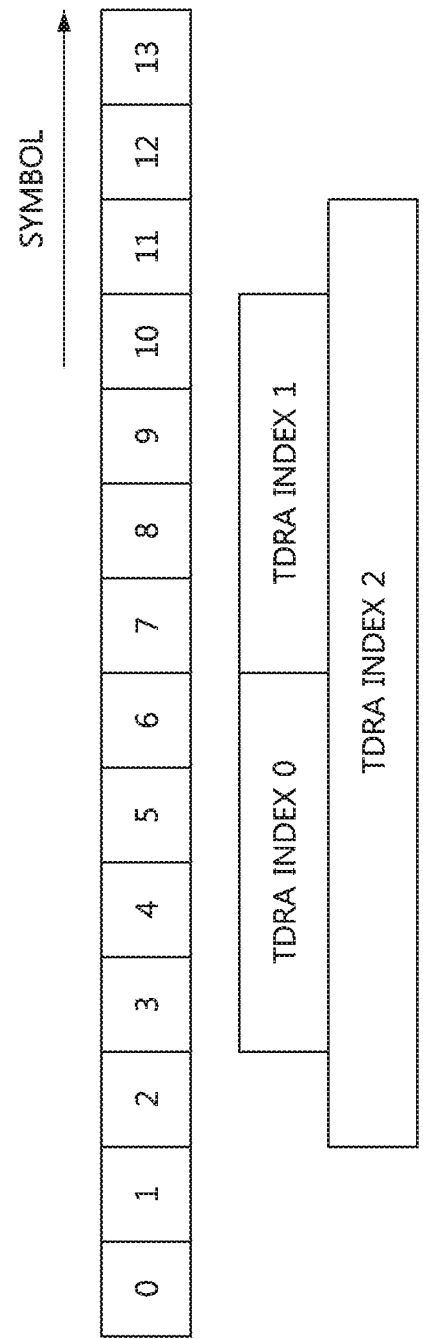

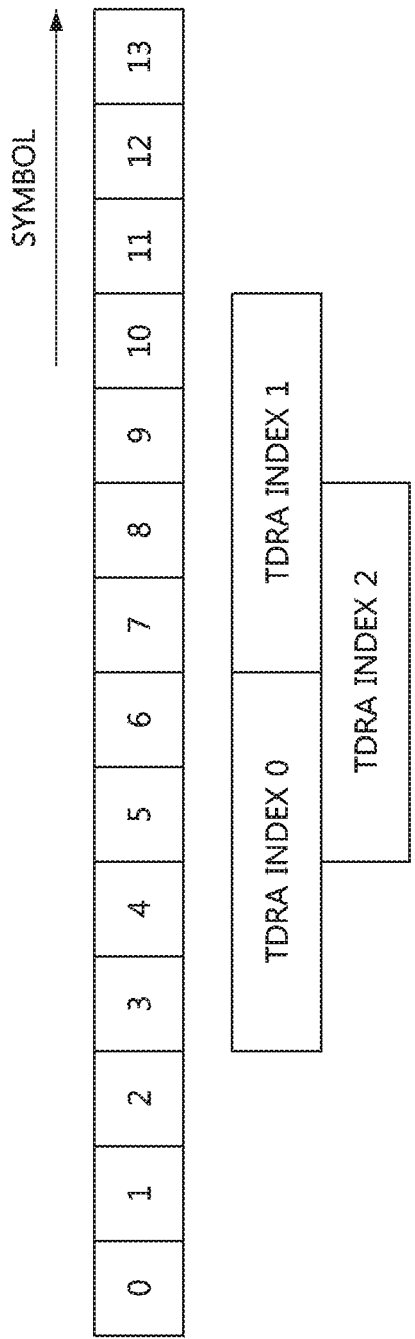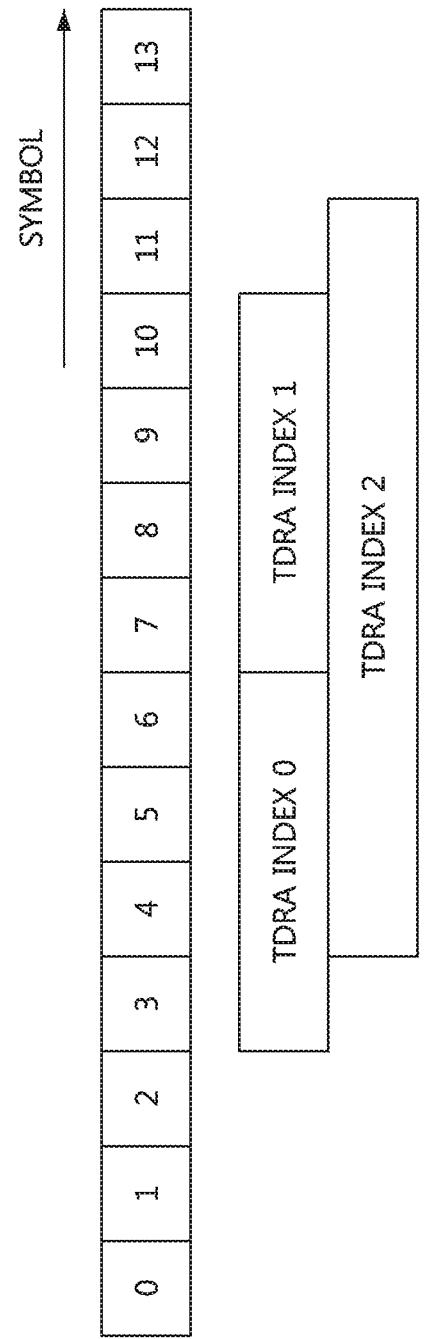

FEEDBACK METHOD FOR REPETITIVE UPLINK TRANSMISSION IN COMMUNICATION SYSTEM

CROSS-REFERENCE TO RELATED APPLICATIONS

This application claims priority to Korean Patent Applications No. 10-2019-0013709 filed on Feb. 1, 2019, No. 10-2019-0037259 filed on Mar. 29, 2019, No. 10-2019-0038350 filed on Apr. 2, 2019, No. 10-2019-0042099 filed on Apr. 10, 2019, No. 10-2019-0049245 filed on Apr. 26, 2019, No. 10-2019-0052539 filed on May 3, 2019, No. 10-2019-0130005 filed on Oct. 18, 2019, No. 10-2019-0142650 filed on Nov. 8, 2019, No. 10-2019-0145445 filed on Nov. 13, 2019, No. 10-2019-0176957 filed on Dec. 27, 2019, No. 10-2020-0007059 filed on Jan. 20, 2020, and No. 10-2020-0011087 filed on Jan. 30, 2020 with the Korean Intellectual Property Office (KIPO), the entire contents of which are hereby incorporated by reference.

BACKGROUND

1. Technical Field

The present disclosure relates generally to feedback technologies in a communication system, and more specifically, to techniques for transmitting hybrid automatic repeat request (HARQ) responses for uplink repetitive transmissions.

2. Related Art

The communication system (hereinafter, a new radio (NR) communication system) using a higher frequency band (e.g., a frequency band of 6 GHz or higher) than a frequency band (e.g., a frequency band lower below 6 GHz) of the long term evolution (LTE) (or, LTE-A) is being considered for processing of soaring wireless data. The NR communication system may support not only a frequency band below 6 GHz but also 6 GHz or higher frequency band, and may support various communication services and scenarios as compared to the LTE communication system. For example, usage scenarios of the NR communication system may include enhanced mobile broadband (eMBB), ultra-reliable low-latency communication (URLLC), massive machine type communication (mMTC), and the like.

Meanwhile, in order to support high reliability requirements in the communication system, a low code rate may be maintained. When a low code rate is used and time resources are used in a mapping process of physical resources (e.g., resource grid), there may not be physical resources to which a new codeword generated based on new information bits is mapped. In this case, time resources may be consumed for physical resource mapping of the new codeword. This may mean a queuing delay or a delay in a scheduler. If the information bits whose transmission is delayed correspond to downlink control information (DCI), the transmission delay of the DCI may be referred to as a DCI blocking.

The transmission of the information bits may be delayed until physical resources are available. In this case, before all transmission of the existing codeword is completed, the transmission of the new codeword may not be performed. In addition, a base station may transmit downlink data after performing the mapping operation of downlink physical resources, and receives a hybrid automatic repeat request (HARQ) response (e.g., acknowledgment (ACK)) that is feedback for the downlink data. The HARQ response may be transmitted on an uplink control channel, and an uplink data channel may be transmitted to the base station after encoding and/or modulation processes.

In case that the terminal operates in a communication system supporting a time division duplex (TDD), the base station may dynamically change a slot format. When the number of uplink symbols that can be transmitted is small, the terminal may maintain a reception quality of the HARQ response by transmitting the uplink control channel in two or more slots. In this case, the terminal may repeatedly transmit the HARQ response.

In order to transmit downlink data satisfying the URLLC requirements to the terminal located at a cell boundary, the base station may determine whether or not to feed back the HARQ response to the downlink data. In the existing communication system, the base station may determine whether to retransmit the information bits under assumption that the terminal always feeds back the HARQ response to the downlink data. In this case, the HARQ response may be transmitted in consideration of a power situation of the terminal, and the terminal may transmit a small amount of HARQ response at a high power by using a narrow band. Therefore, the transmission of the HARQ response may be delayed.

In addition, the terminal may not transmit two or more uplink channels due to power limitation. Therefore, when a new HARQ response is generated, the terminal may transmit the new HARQ response using a new uplink control channel.

SUMMARY

Accordingly, exemplary embodiments of the present disclosure provide methods for transmitting HARQ responses for repetitive uplink transmissions in a communication system.

According to an exemplary embodiment of the present disclosure, an operation method of a terminal in a communication system may comprise receiving downlink (DL) data #1 from a base station through a DL data channel #1; receiving DL data #2 from the base station through a DL data channel #2; and when each of an uplink (UL) control channel #1 on which a hybrid automatic repeat request (HARQ) response #1 for the DL data #1 is to be transmitted and a UL control channel #2 on which an HARQ response #2 for the DL data #2 is to be transmitted overlaps with a UL data channel assigned by the base station, transmitting the HARQ response #1 and the HARQ response #2 to the base station through the UL data channel.

At least one DL data channel among the DL data channel #1 and the DL data channel #2 may be indicated by a dynamic scheduling scheme, and the remaining DL data channel may be indicated by a semi-persistent scheduling scheme.

When a priority of each of the DL data #1 and the DL data #2 is identical to a priority of UL data to be transmitted through the UL data channel, the HARQ response #1 and the HARQ response #2 may be multiplexed in the UL data channel.

Each of the UL control channel #1 and the UL control channel #2 may be configured in units of a sub-slot, and the UL data channel may be configured in units of a slot comprising two or more sub-slots.

One HARQ response codebook including the HARQ response #1 and the HARQ response #2 may be generated, and the one HARQ response codebook may be multiplexed in the UL data channel.

The one HARQ response codebook may be configured in units of a slot comprising two or more sub-slots.

Arrangement positions of the HARQ response #1 and the HARQ response #2 within the one HARQ response codebook may be determined based on timings of receiving the DL data #1 and the DL data #2.

Arrangement positions of the HARQ response #1 and the HARQ response #2 within the one HARQ response codebook may be determined based on timings of receiving DL scheduling information #1 of the DL data #1 and DL scheduling information #2 of the DL data #2.

UL scheduling information of the UL data channel may be received after DL scheduling information #1 of the DL data #1 and DL scheduling information #2 of the DL data #2, and a size of the UL data channel may be configured considering a size of the HARQ response #1 and a size of the HARQ response #2.

A size of uplink control information (UCI) including the HARQ response #1 and the HARQ response #2 may be estimated based on UL scheduling information of the UL data channel, a puncturing operation or a rate-matching operation for the UL data channel may be performed based on the estimated size of the UCI.

A timing of encoding the HARQ response #1 may be identical to a timing of encoding the HARQ response #2.

The HARQ response #1 may be multiplexed in a radio resource overlapping or adjacent to the UL control channel #1 among radio resources occupied by the UL data channel, and the HARQ response #2 may be multiplexed in a radio resource overlapping or adjacent to the UL control channel #2 among the radio resources occupied by the UL data channel.

When the UL data channel is transmitted based on a frequency hopping scheme, the HARQ response #1 may be transmitted on the UL data channel of a hop # n, the HARQ response #2 may be transmitted on the UL data channel of a hop # m, and n and m may be different natural numbers.

When the UL data channel includes a plurality of UL data channel instances, the HARQ response #1 may be multiplexed in a UL data channel instance # n, the HARQ response #2 may be multiplexed in a UL data channel instance # m, and n and m may be different natural numbers.

When the UL control channel #1 overlaps the UL data channel instance # n and a UL data channel instance # n+1, the HARQ response #1 may be multiplexed in the UL data channel instance # n located first in time among the UL data channel instances # n and # n+1, and when the UL control channel #2 overlaps the UL data channel instance # m and a UL data channel instance # m+1, the HARQ response #2 may be multiplexed in the UL data channel instance # m located first in time among the UL data channel instances # m and # m+1.

When the DL data channel #2 is located after the DL data channel #1 in a time domain, an interval between a last symbol of the DL data channel #2 and a start symbol of the UL data channel may be equal to or larger than an interval configured by the base station.

According to another exemplary embodiment of the present disclosure, an operation method of a base station in a communication system may comprise transmitting downlink (DL) data #1 to a terminal through a DL data channel #1; transmitting DL data #2 to the terminal through a DL data channel #2; generating uplink (UL) scheduling information of a UL data channel in consideration of a size of a hybrid automatic repeat request (HARQ) response #1 for the DL data #1 and a size of an HARQ response #2 for the DL data #2; transmitting the UL scheduling information to the terminal; and receiving UL data, the HARQ response #1, and the HARQ response #2 on the UL data channel indicated by the UL scheduling information, wherein each of a UL control channel #1 on which the HARQ response #1 is to be transmitted and a UL control channel #2 on which the HARQ response #2 is to be transmitted overlaps with the UL data channel.

When a priority of each of the DL data #1 and the DL data #2 is identical to a priority of the UL data to be transmitted through the UL data channel, the HARQ response #1 and the HARQ response #2 may be multiplexed in the UL data channel.

When the UL data channel is transmitted based on a frequency hopping scheme, the HARQ response #1 may be transmitted on the UL data channel of a hop # n, the HARQ response #2 may be transmitted on the UL data channel of a hop # m, and n and m may be different natural numbers.

When the UL data channel includes a plurality of UL data channel instances, the HARQ response #1 may be multiplexed in a UL data channel instance # n, the HARQ response #2 may be multiplexed in a UL data channel instance # m, and n and m may be different natural numbers.

According to the exemplary embodiments of the present disclosure, when physical uplink control channels (PUCCHs) overlap in the time domain, a plurality of hybrid automatic repeat request (HARQ) response bits associated with the corresponding PUCCHs may be multiplexed in one HARQ response codebook. In addition, when a PUCCH overlaps with a physical uplink shared channel (PUSCH) in the time domain, HARQ response bits to be transmitted on the PUCCH may be multiplexed in the PUSCH. In addition, PDSCHs belonging to the same subset may be mapped to one PUCCH, and HARQ responses for the PDSCHs belonging to the same subset may be transmitted on a PUCCH mapped to the corresponding subset. Therefore, the HARQ responses can be transmitted efficiently, and the performance of the communication system can be improved.

BRIEF DESCRIPTION OF DRAWINGS

Exemplary embodiments of the present disclosure will become more apparent by describing in detail embodiments of the present disclosure with reference to the accompanying drawings, in which:

FIG. 12 is a conceptual diagram illustrating a third exemplary embodiment of a method of configuring a DL data channel in a communication system;

FIG. 33 is a conceptual diagram illustrating a first exemplary embodiment of a method for configuring a TDRA index in a communication system;

FIG. 34A is a conceptual diagram illustrating a second exemplary embodiment of a method of configuring a TDRA index in a communication system, FIG. 34B is a conceptual diagram illustrating a third exemplary embodiment of a method of configuring a TDRA index in a communication system, and FIG. 34C is a conceptual diagram illustrating a fourth exemplary embodiment of a method of configuring a TDRA index in a communication system.

Figure 1:
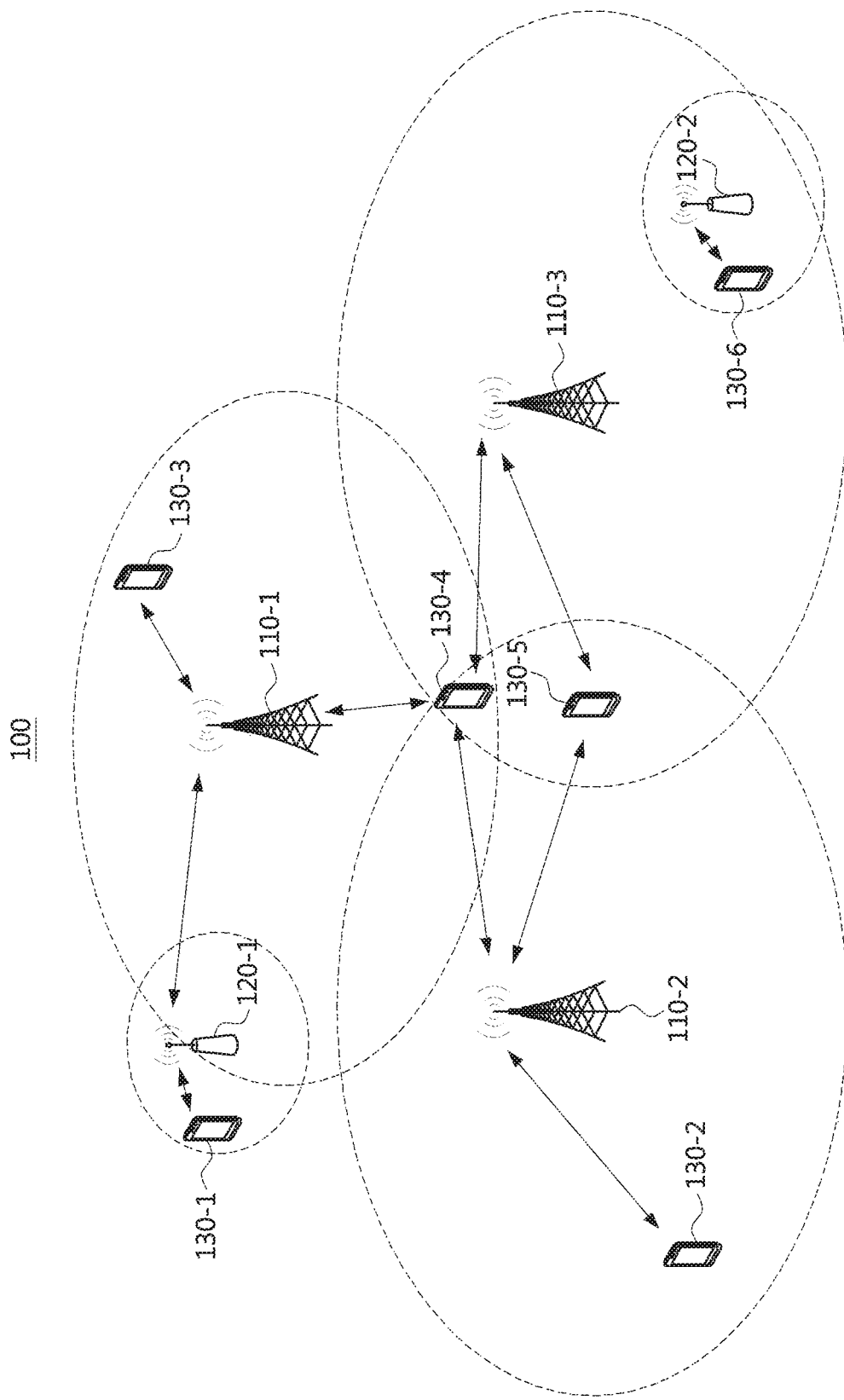
FIG. 1 is a conceptual diagram illustrating a first exemplary embodiment of a communication system.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments of the present disclosure are applied will be described. The communication system to which the exemplary embodiments according to the present disclosure are applied is not limited to the following description, and the exemplary embodiments according to the present disclosure may be applied to various communication systems. Here, the communication system may be used in the same sense as a communication network.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4G communication (e.g., long term evolution (LTE), LTE-advanced (LTE-A)), 5G communication (e.g., new radio (NR)), or the like. The 4G communication may be performed in a frequency band below 6 GHz, and the 5G communication may be performed in a frequency band above 6 GHz as well as the frequency band below 6 GHz.

For example, for the 4G communication and the 5G communication, the plurality of communication nodes may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like.

Also, the communication system 100 may further comprise a core network. When the communication system supports the 4G communication, the core network may include a serving gateway (S-GW), a packet data network (PDN) gateway (P-GW), a mobility management entity (MME), and the like. When the communication system 100 supports the 5G communication, the core network may include an access and mobility management function (AMF), a user plane function (UPF), a session management function (SMF), and the like.

Meanwhile each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
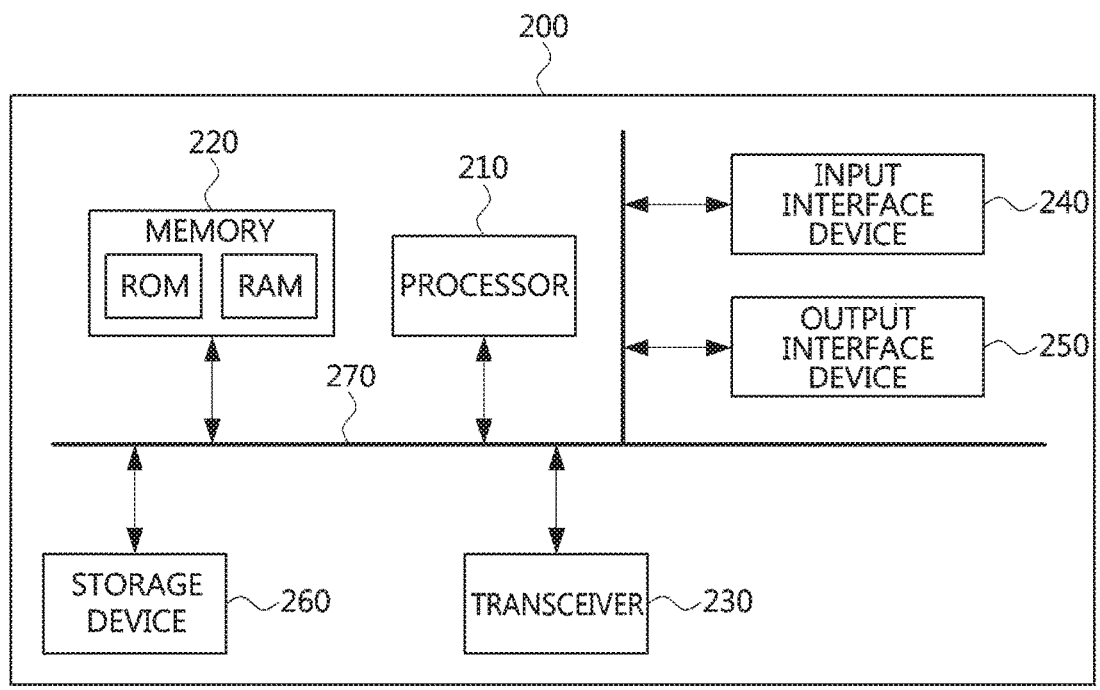
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may not be connected to the common bus 270 but may be connected to the processor 210 via an individual interface or a separate bus. For example, the processor 210 may be connected to at least one of the memory 220, the transceiver 230, the input interface device 240, the output interface device 250 and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a gNB, a base transceiver station (BTS), a radio base station, a radio transceiver, an access point, an access node, or the like. Also, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods for transmitting and receiving HARQ-responses in a communication system will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a terminal is described, a corresponding base station may perform an operation corresponding to the operation of the terminal. Conversely, when an operation of the base station is described, the corresponding terminal may perform an operation corresponding to the operation of the base station.

In the following exemplary embodiments, a DL control channel may refer to downlink control information (DCI) or a radio resource used for transmission of the DCI, and a DL data channel may refer to a DL data unit or a radio resource used for transmission of the DL data unit. A UL control channel may mean uplink control information (UCI) or a radio resource used for transmission of the UCI, and a UL data channel may mean a UL data unit or a radio resource used for transmission of the UL data unit.

The DL control channel may be a physical downlink control channel (PDCCH), and the DL data channel may be a physical downlink shared channel (PDSCH). The UL control channel may be a physical uplink control channel (PUCCH), and the UL data channel may be a physical uplink shared channel (PUSCH). In addition, in the following exemplary embodiments, a base station may mean a serving base station, and a terminal may mean a terminal connected to the serving base station.

Figure 3:
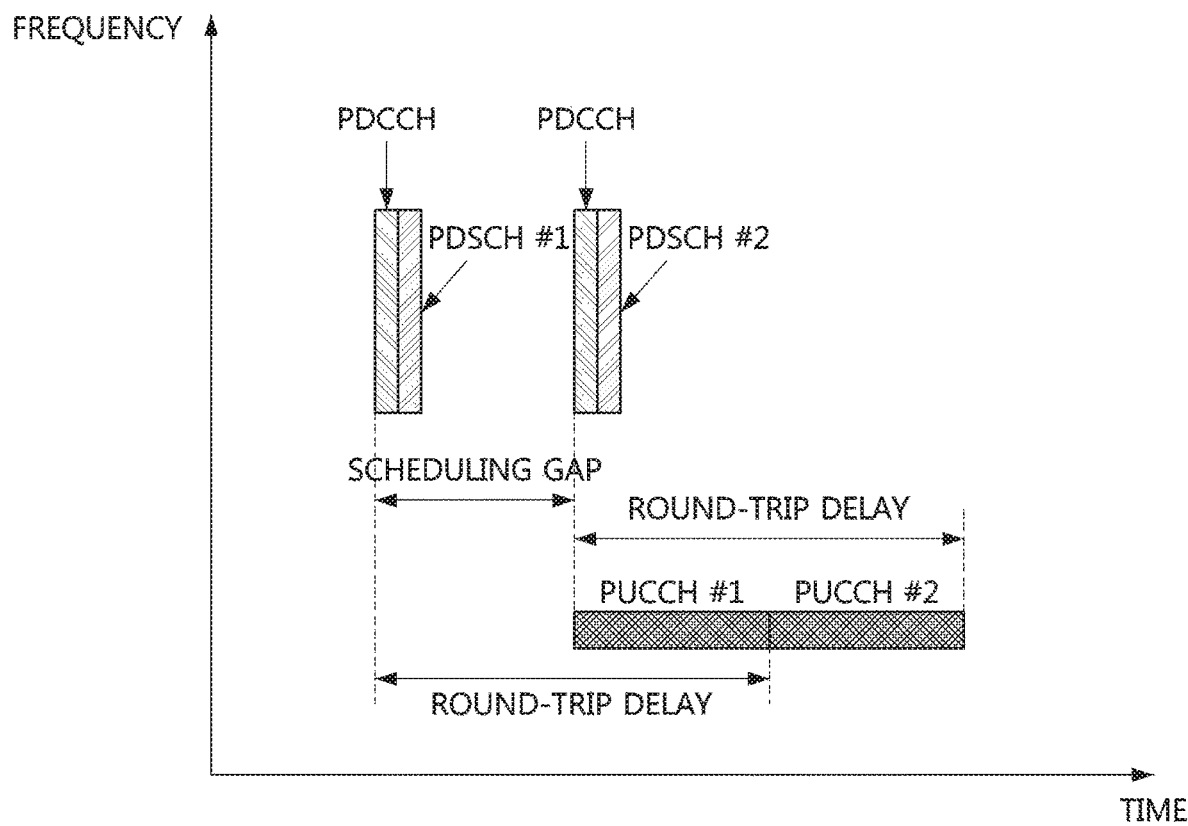
FIG. 3 is a timing diagram illustrating a first exemplary embodiment of a scheduling method in a communication system.

FIG. 3 is a timing diagram illustrating a first exemplary embodiment of a scheduling method in a communication system.

Referring to FIG. 3, the base station may transmit DCI on a PDCCH, and may transmit downlink data to the terminal through a PDSCH scheduled by the corresponding DCI. The terminal may receive the DCI from the base station, and may receive downlink data scheduled by the corresponding DCI from the base station. The terminal may transmit an HARQ response for the downlink data to the base station. The HARQ response may be transmitted on a PUCCH. In the following exemplary embodiments, the HARQ response may mean an HARQ acknowledgement (HARQ-ACK). The terminal may transmit one or more uplink control channels (e.g., PUCCHs). In this case, the HARQ response may be repeatedly transmitted.

On the other hand, the terminal may receive a DL control channel (e.g., DCI) from the base station (e.g., serving base station). The terminal may receive a DL data channel scheduled by the DL control channel and transmit UCI including an HARQ response for the DL data channel to the base station. The UCI may be transmitted on a UL control channel.

The resource of the UL control channel may be indicated by the base station. For example, the base station may configure a plurality of resources (e.g., UL control channel candidates) for the UL control channel to the terminal using higher layer signaling (e.g., radio resource control (RRC) signaling). In the following exemplary embodiments, a higher layer signaling operation may be performed using an RRC message. The base station may indicate to the terminal one resource (e.g., one UL control channel candidate) for the UL control channel using an implicit signaling method or an explicit signaling method (e.g., a specific field included in the DCI).

Time resource information of the UL control channel may include an index of a slot in which the UL control channel is located, an index (e.g., an index of the first UL symbol) of UL symbols in which the UL control channel is located within the slot, and/or the number of UL symbols occupied by the UL control channel. Frequency resource information of the UL control channel may include an index (e.g., an index of the first resource block) of resource blocks in which the UL control channel is located, the number of resource blocks occupied by the UL control channel, information indicating whether to perform frequency hopping of the UL control channel, generation information of a spreading sequence for the UL control channel, and/or generation information of a reference signal for the UL control channel.

Meanwhile, the terminal may transmit channel state information (CSI) to the base station (e.g., serving base station) using a UL control channel. The terminal may feed back the CSI to the base station using a semi-static reporting scheme or a dynamic reporting scheme. The base station may configure the type of CSI to be fed back and physical resources (e.g., UL control channel) for the feedback of the CSI to the terminal through higher layer signaling.

Alternatively, the terminal may identify the location of the radio resources to which the DL data channel is allocated from the DL control channel and may identify feedback information (e.g., resource information) for the HARQ response to the DL data channel. The terminal may indirectly identify a service corresponding to the DL data (e.g., Enhanced Mobile BroadBand (eMBB) service or Ultra Reliable Low Latency Communication (URLLC) service) based on a search space in which a DL assignment is detected. Alternatively, the terminal may indirectly identify the service (e.g., eMBB service or URLLC service) corresponding to the DL data using a radio network temporary identifier (RNTI) or a sequence used for scrambling of the DCI (or DL assignment information).

When the DCI (e.g., a cyclic redundancy check (CRC) of the DCI) is scrambled with a modulation and coding scheme-cell-radio network temporary identifier (MCS-C-RNTI) or when the DCI is received in a search space configured by higher layer signaling, the terminal may assume that the DL data channel indicated by the corresponding DCI includes a transport block (TB) or a code block group (CBG) for the URLLC service.

The terminal may feed back an HARQ response for the TB or CBG to the base station. The HARQ response may be transmitted on a UL control channel or a UL data channel. The terminal may identify a resource of the UL control channel (or UL data channel) used for transmission of the HARQ response based on a field included in the DCI. The base station (e.g., serving base station) may configure sets of resources (e.g., sets of resources of UL control channel candidates) for the UL control channel to the terminal using higher layer signaling.

The terminal may select one set of resources for the UL control channel based on the amount of UL control information (e.g., UCI) included in the UL control channel among the sets configured by higher layer signaling. In this case, the terminal may select one set of resources for the UL control channel based on a field included in the DCI received from the base station. In order to feed back the UCI to the base station in the communication system supporting the URLLC service, the terminal may process the UCI on a smaller time unit basis than the conventional communication system. In the conventional communication system, the UCI may be processed in units of slots. The terminal may process the UCI in units of a sub-slot, a mini slot, or a symbol, which is smaller than the slot.

When the UCI is repeatedly transmitted in a proposed method, the terminal may map UCI having a small number of transmissions to a column having a good quality in a codebook generation process.

When the UCI is not repeatedly transmitted, the terminal may generate a codebook using the conventional method. When the UCI is repeatedly transmitted, the quality (e.g., reception quality) of the UCI may be different because the size of the codebook is changed. The quality of the UCI may mean an error rate. The column having a good quality may mean a column having a low error rate in a generator matrix G. A codeword C may be obtained through the code book or a product (G·u) of the information bits u and the generator matrix G.

Considering the i-th codebook, the information bits may be represented by u(i) and the codeword may be represented by (G(i)·u(i)). Since the information bits are represented by a column vector, the codeword may also be given as a column vector. The product of the matrices may be performed in a finite field (GF(2)) consisting of 0s and 1s. In the following exemplary embodiments, the UCI may mean HARQ response(s) (e.g., HARQ-ACK), and the following exemplary embodiments may be applied to a CSI transmission operation. The bits of the information bits represented by scalar values may be represented by a vector, and the information bits may be constructed by concatenating the bits represented by the vector.

In the following exemplary embodiment, it is assumed that $m(i)$ ($\in 0,1$) is the i-th generated UCI, and the UCI is repeatedly transmitted K times. When the terminal transmits the UCI once (i.e., K=1), it may be defined as $u(i)=m(i)$.

When the terminal transmits the UCI more than once (i.e., K≥2), Equation 1 below may be defined.

$$u(i)=[f_{i,K}\{m(i),m(i-1),\ldots,m(i-K+1)\}]^T \quad \text{[Equation 1]}$$

$f_{i,K}$ may refer to a permutation function of mixing K elements applied to the i-th codebook. When the UCI are HARQ responses, u(i) may be a column vector consisting of K bits. When the terminal does not generate the UCI, u(i) may be a column vector consisting of K−1 or less bits. The probability that the terminal generates the UCI may be the same as the probability that the base station transmits a DL control channel to the terminal. Considering the feedback for the DL data channel, since the base station transmits the TB according to an arrival rate, the generation probability of the UCI may be the same as the arrival rate of the TB.

The permutation function ($f_{i,K}$) may output inputs in ascending or descending order. The permutation function ($f_{i,K}$) may be a permutation function that first arranges the assigned UCI first. Alternatively, in a proposed method, the permutation function ($f_{i,K}$) may be a permutation function that mixes K elements such that the error rate of the UCI is minimized.

When K=2, the terminal may generate a codebook (or information bits) by multiplexing the i-th UCI and the (i+1)-th UCI. The i-th information bits may be [$f_{i,2}$\{m(i−1), m(i)\}] and the (i+1)-th information bits may be [$f_{i,2}$\{m(i), m(i+1)\}]. The codeword may be generated from information bits consisting of K bits. According to a proposed method, one UCI may be generated K times.

Figure 4:
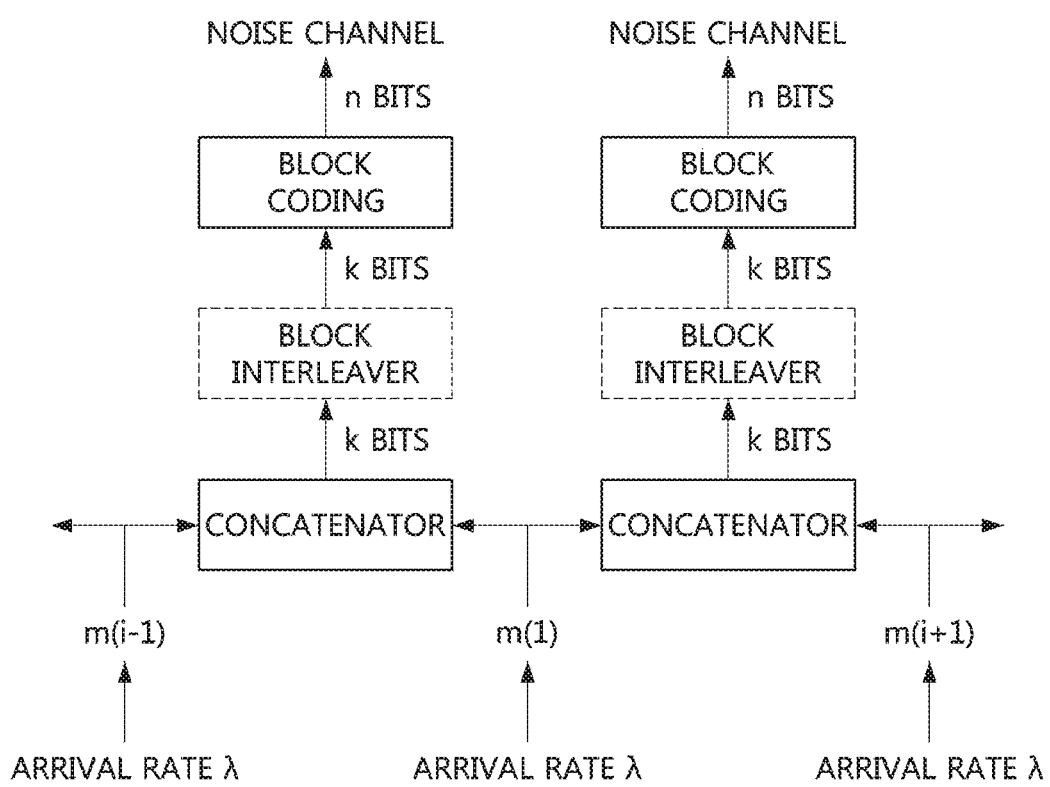
FIG. 4 is a conceptual diagram illustrating a first exemplary embodiment of an encoding method for generating UCI in a communication system.

FIG. 4 is a conceptual diagram illustrating a first exemplary embodiment of an encoding method for generating UCI in a communication system.

Referring to FIG. 4, new UCI may be generated when the transmission of the UL control channel is not completed. Here, K may be 2. In order to apply a block coding operation, m(i) may be transmitted twice. $f_i$ may be expressed as an interleaver or a permutation function that generates the codebook. The block interleaving may be optionally performed, and a concatenation operation may be performed by a concatenator.

Figure 5:
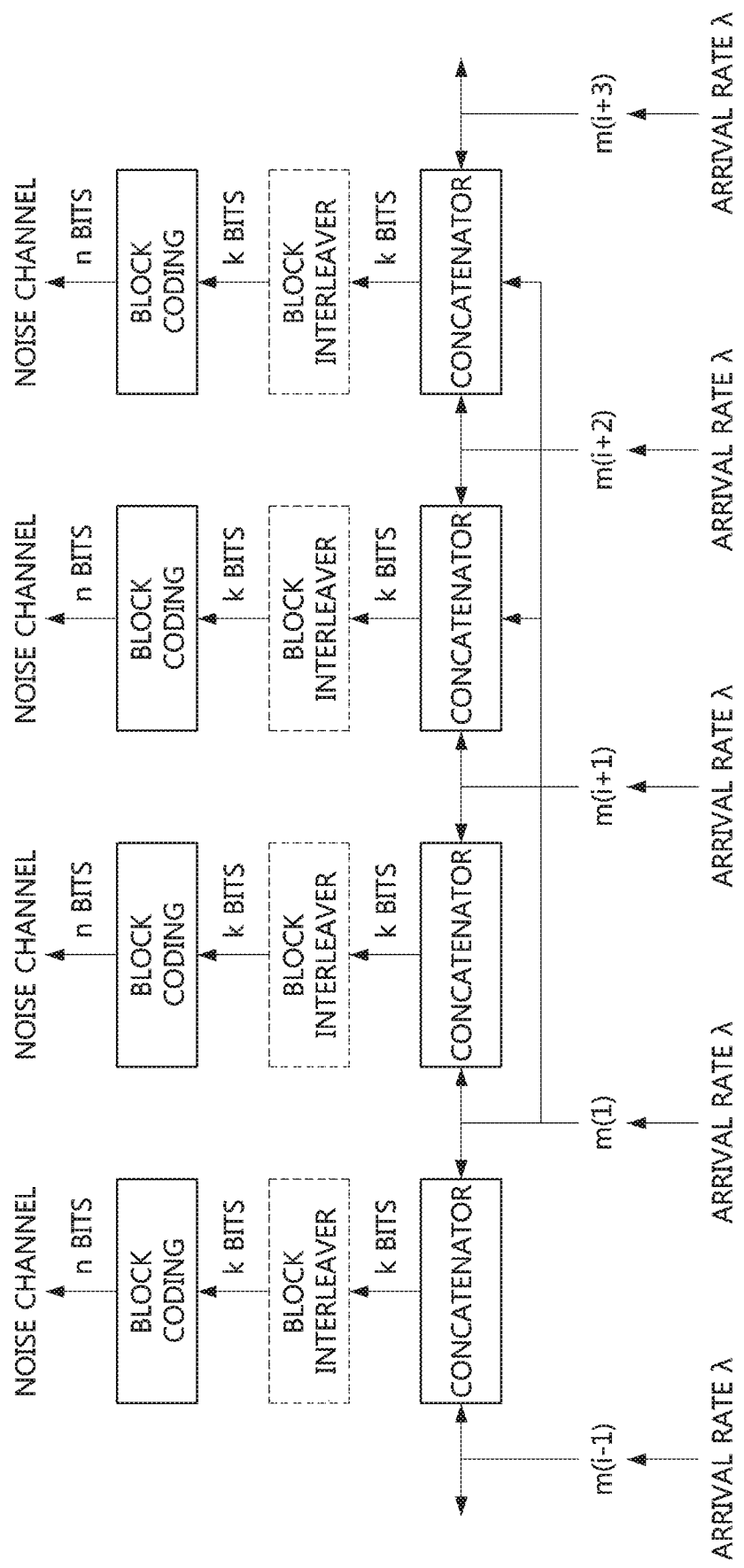
FIG. 5 is a conceptual diagram illustrating a second exemplary embodiment of an encoding method for generating UCI in a communication system.

FIG. 5 is a conceptual diagram illustrating a second exemplary embodiment of an encoding method for generating UCI in a communication system.

Referring to FIG. 5, new UCI may be generated when the transmission of the UL control channel is not completed. Here, K may be 4. m(i) may be transmitted four times. The block interleaving may be optionally performed, and the concatenation operation may be performed by the concatenator.

The codeword generated by the terminal may be expressed as a product of the generator matrix and the information bits. Therefore, the codeword generated by the terminal may be defined as in Equation 2 below.

$$x(i) = \sum_{k=0}^{K-1} g_{i,k} m(i+k) = (g_{i,0} \quad g_{i,1} \quad \cdots \quad g_{i,K-1}) \quad \text{[Equation 2]}$$

$$(m(i) \quad m(i+1) \quad \ldots \quad m(i+K-1))^T$$

In Equation 2, $f_{i,K}$ may be a result of selecting a basis of the generator matrix. Since the terminal repeatedly transmits the UCI twice (i.e., K=2), the codeword considered by the base station (e.g., serving base station) may be an augmented matrix rather than a generator matrix. In this case, Equation 3 below may be defined. Equation 3 may indicate a relationship between the information bits including m(i) and the codeword when K is 2. Equation 3 corresponds to a case where the UCI is generated continuously in the terminal, the equation for generating the codeword when some UCI does not occur may be changed.

$$\begin{pmatrix} x(i-1) \\ x(i) \end{pmatrix} = \begin{pmatrix} g_{i-1,0} & g_{i-1,1} & 0 \\ 0 & g_{i,0} & g_{i,1} \end{pmatrix} \begin{pmatrix} m(i-1) \\ m(i) \\ m(i+1) \end{pmatrix} \quad \text{[Equation 3]}$$

The proposed method may be applied to an arbitrary block coding method. Since a Reed Muller code or a polar code may be applied, a new operation of the terminal in the encoding procedure may be minimized. The terminal may apply the encoding scheme differently according to the size of the codebook. When the size of the codebook is equal to or greater than 3 bits and equal to or less than 11 bits, the terminal may use the Reed Muller code. When the size of the codebook is 12 bits or more, the terminal may use the polar code. In a proposed method, the generation method of the codebook may vary depending on the size of the codebook.

When the size of the codebook is 11 bits or less, the basis of the generator matrix G may be selected based on a Hamming distance. In this case, a (32, 11) generator matrix G corresponding to the Reed Muller code may be used. The generator matrix G may be defined as shown in Table 1 below.

TABLE 1

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |

TABLE 1-continued

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

By selecting J bases out of 11 bases by the permutation function ($f_{i,J}$), an abbreviated generator matrix $\tilde{G}(32, J)$ may be generated. J may be 1 or more and K or less. The codeword may be a product of the information bits and the abbreviated generator matrix $\tilde{G}$. The base station may indirectly inform the terminal of the size (J) of the codebook using a downlink assignment index (DAI) in the DL control channel. Therefore, J may be the same value in the base station and the terminal. Alternatively, the terminal may generate a column vector having a length of 11 by attaching 0s to the information bits composed of J bits, and obtain the codeword x by multiplying the generated column vector by the generator matrix G.

When selecting bases from the generator matrix in a proposed method, the selected basis may be independent of the index i of the codebook. In addition, the selected bases may have time-invariant properties.

That is, the permutation function may be expressed as $f_K$ instead of $f_{i,K}$. Since the permutation function does not need to be designed according to the index i of the codebook and does not have a general functional relationship between the index i of the codebook and the index of the UCI, implementation complexity may be reduced. The permutation function may be defined separately according to the size J of the codebook (e.g., the amount of UL control channel). In case when K=J=2, the codeword may be defined as in Equation 4 below. The proposed method may be applied even when K=J=4.

$$\begin{pmatrix} x(i-1) \\ x(i) \end{pmatrix} = \underbrace{\begin{pmatrix} g_a & g_b & 0 \\ 0 & g_a & g_b \end{pmatrix}}_{\overline{G}} \begin{pmatrix} m(i-1) \\ m(i) \\ m(i+1) \end{pmatrix} \quad \text{[Equation 4]}$$

Equation 4 may represent a relationship between the information bits and the code word including m(i) when K is 2. Each of a and b may be a natural number equal to or greater than 1 and equal to or less than 11, and may be independent of the index i of the codebook. a and b may be determined by f. In order for the base station to decode the codeword including m(i), the generator matrix may be interpreted as a new generator matrix $\overline{G}$ instead of G or $\tilde{G}$. $\overline{G}$ may affect the error rate of the UL control channel.

When the bases of the generator matrix are selected in a proposed method, the same basis may not be selected.

Therefore, each of a and b in Equation 4 may have a different value. In the procedure of generating the codeword by the terminal, the Reed Muller code G may be reused as a new generator matrix by properly defining the permutation function or the codebook generation procedure. Since a is different from b, the terminal may obtain the codeword by multiplying the information bits by the generator matrix $\tilde{G}$. In order to minimize the error rate of m(i) in the generator matrix $\overline{G}$, a column having a good characteristic among the columns of G may be selected.

The base station (e.g., serving base station) may decode m(i−1) before decoding m(i). The decoding procedure of the base station may start with the codeword excluding m(i−1). For example, Equation 4 may be modified to Equation 5 below. The error rate of m(i) may be determined by $\overline{\overline{G}}$ corresponding to a partial matrix of $\overline{G}$. When K is 2 and m(i−1) is known, Equation 5 may indicate a relationship between the information bits and the codeword including m(i).

$$\begin{pmatrix} x'(i-1) \\ x(i) \end{pmatrix} = \begin{pmatrix} 0 & g_b & 0 \\ 0 & g_a & g_b \end{pmatrix} \begin{pmatrix} m(i-1) \\ m(i) \\ m(i+1) \end{pmatrix}, \overline{\overline{G}} := \begin{pmatrix} g_b & 0 \\ g_a & g_b \end{pmatrix} \quad \text{[Equation 5]}$$

In a proposed method, a Hamming distance between the codewords according to the generator matrix $\overline{G}$ may be maximized.

The column vector of $\overline{G}$ in Equation 5 may be given as '$[g_b, g_a]T, [0, g_a]^T$', and the Hamming distance between the codewords may be maximized also when m(i−1), m(i), m(i+1)∈{0,1} is applied. The Hamming distance may be calculated for each dimension, the terminal may repeat the UCI transmission twice by selecting two columns with a far Hamming distance from the Reed Muller matrix (G), and may optimize the case of the codebook having the size of 2 (e.g., K=2, J=2).

Examining the column vectors of the Reed Muller matrix, a set consisting of column vectors that maximize the Hamming weight of each column and the Hamming distance between columns may be obtained. The proposed generator matrix may always include a column vector consisting of only one, and the other column of the proposed generator matrix may be an arbitrary one column among the second to tenth columns (e.g., the second to tenth columns of Table 1). In addition, the proposed generator matrix may not include the eleventh column (e.g., the eleventh column of Table 1). Here, the presented order may mean the order of generator matrices presented in the 3GPP technical specification (e.g., NR technical specification). In the proposed generator matrix $\overline{G}$, a may be 1 and b may be 2.

When a part of the UCI is insufficient in the terminal, J may be greater than or equal to 1 and less than K. In this case, the permutation function J may be changed. If m(i+1) is not present, Equation 5 may be modified to Equation 6 below. When K is 2, Equation 6 may indicate a relationship between the information bits and the codeword including m(i). Since the base station knows m(i−1), the generator matrix $\overline{G}$ may be sufficient to optimize only $[g_b, g_a]^T$. In a proposed method, the column maximizing the Hamming distance may be a column satisfying "a=b=1".

$$\begin{pmatrix} x(i-1) \\ x(i) \end{pmatrix} = \underbrace{\begin{pmatrix} 0 & g_b & 0 \\ 0 & g_a & 0 \end{pmatrix}}_{\overline{G}} \begin{pmatrix} m(i-1) \\ m(i) \\ 0 \end{pmatrix}$$ [Equation 6]

In a proposed method, the first bit transmitted by the permutation function $f_J$ may correspond to a column vector consisting of only one. The bits transmitted second or later by the permutation function $f_J$ may have another column (e.g., one of the second to tenth columns). Also, the bits transmitted second or later by the permutation function $f_J$ may not include the eleventh column. Here, the presented order may be the order of generator matrices presented in the 3GPP specification (e.g., the order of Table 1).

When the proposed method is applied, codewords having a valid generator matrix $\overline{G}$ may have a large Hamming distance. The proposed method may be applied to a case where K is less than or equal to 10, and the terminal may generate the codeword through a simple multiplication using the Reed Muller generator matrix.

In a proposed method, when the size of the codebook is 12 bits or more, the bases of the generator matrix may be selected based on the reliability.

When the size of the codebook is 12 bits or more, the terminal may generate the information bits or the codebook. The terminal may apply a CRC code and may apply the polar code after applying the permutation function (e.g., interleaving).

According to the conventional method, the amount of parity bits of the CRC may vary according to the size of the codebook, and the location of the parity bits in the polarization procedure may vary. The codeword obtained as a result of the CRC may have a systematic form having the information bits and the parity bits. The codeword of the CRC may be mapped to a bit channel having high reliability. The parity bits may be further generated, and the generated additional parity bits may be mapped to a bit channel having higher reliability than the bit channel to which the previous parity bits are mapped.

The information bits and the parity bits may be concatenated and a matrix $G_N$ may be obtained by a Kronecker product of the polar coding generator matrices (e.g., base matrices defined in the 3GPP specification). The codeword may be obtained by multiplying the concatenation result between the information bits and the parity bits by the matrix $G_N$. The matrix $G_N$ obtained by the Kronecker product of the polar coding generator matrices may be defined as in Equation 7 below.

$$G_N \left( = \underbrace{G_2 \otimes G_2 \otimes \ldots \otimes G_2}_{n \text{ times}}, \ N = 2^n, \ G_2 = \begin{pmatrix} 1 & 0 \\ 1 & 1 \end{pmatrix} \right)$$ [Equation 7]

Thereafter, the codeword may be mapped to radio resources (e.g., resource elements (REs)) after a rate matching operation is performed. A problem of determining the location in the polar encoding procedure may be interpreted as a problem of designing the permutation function ($f_{i,J}$) when the size of the codebook or the size of the UCI is J.

The J bases may be selected by the permutation function ($f_{i,J}$), and each base may be multiplied to each bit of the UCI. The base station may indirectly inform the terminal of the size J of the codebook using a DAI in the DL control channel. Therefore, J may be the same value in the base station and the terminal. The 3GPP specification may define the size of the polar coding generator matrix in the encoding procedure. Accordingly, the terminal may generate a column vector having a required length by attaching 0s to the information bits composed of J bits, and may obtain the codeword by multiplying the generator matrix and the generated column vector.

In a proposed method, bases having high reliability may be selected from the vector multiplied by the polar coding generator matrix, and the selected bases may correspond to UCI having a small number of transmissions. The 3GPP specification defines the order of reliability according to the size of the polar coding generator matrix, and the proposed method may be implemented based on the order of reliability defined in the 3GPP specification.

In a proposed method, the basis or bases with a large Hamming distance may be selected from the vector multiplied to the polar coding generator matrix, a basis having the highest reliability among two or more selected bases when the number of selected bases is two or more, and the selected basis may correspond to UCI having a small number of transmissions. The 3GPP specification defines the order of reliabilities according to the size of the polar coding generator matrix, and the proposed method may be implemented based on the order of reliabilities defined in the 3GPP specification.

In a proposed method, a codebook may be defined that optimizes a free distance in the augmented generator matrix.

In the case of generating the codebook in the UCI repetitive transmission procedure, the UCI having a small number of transmissions may be mapped to a column having a good quality. The augmented generator matrix in Equation 3 may be defined as in Equation 8 below. Therefore, the augmented generator matrix of Equation 8 may be in form of a time-varying linear system, and may greatly affect the error rate of the information bits.

$$\begin{pmatrix} g_{i-1,0} & g_{i-1,1} & 0 \\ 0 & g_{i,0} & g_{i,1} \end{pmatrix}$$ [Equation 8]

The augmented generator matrix may be generalized to an arbitrary large matrix depending on the size of UCI under consideration. Since the size of the generalized augmented generator matrix depends on the size of UCI, it may be difficult to optimize the generalized augmented generator matrix. Thus, it may be desirable to give a structure to the augmented generator matrix, and the implementation may be simplified based on this.

For example, the augmented generator matrix may have time invariant characteristics. The augmented generator matrix may have a form $\overline{G}$ defined in Equation 4. $\overline{G}$ may be expressed as a block Toeplitz form generated as $[g_a, g_b]$ and may be interpreted as a convolutional code.

Figure 6:
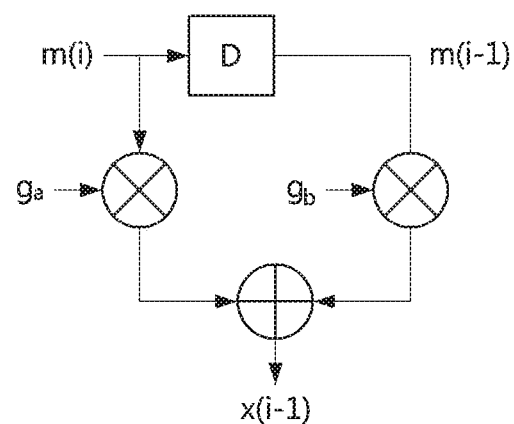
FIG. 6 is a conceptual diagram illustrating a third exemplary embodiment of an encoding method for generating UCI in a communication system.

FIG. 6 is a conceptual diagram illustrating a third exemplary embodiment of an encoding method for generating UCI in a communication system.

Referring to FIG. 6, a coding procedure for generating new UCI before completion of transmission of a UL control channel may be performed based on a convolutional coding scheme. Here, K may be 2. A vector may be generated according to the UCI, and the terminal may generate codewords x(i) and x(i−1) by combining the previously transmitted UCI with the generated vector. In the conventional convolutional coding scheme, a convolutional operation on the codeword may be performed on a bit basis. In the proposed convolutional coding scheme, a convolutional operation on the codeword may be performed on a vector basis. A constraint length of the convolutional code may be equal to the number of repetitive transmissions of the terminal.

Since the codeword is generated based on the convolutional coding scheme, a codeword having the maximum likelihood may be obtained based on a Viterbi decoding algorithm, and the error rate of the information bits is determined based on a free distance of the convolutional code. It may be desirable to obtain a codebook or [$g_a$, $g_b$] that maximizes the free distance. In the conventional UCI encoding method, the Reed Muller code or the polar code may be used according to the size of the UCI or the size of the codebook. In a proposed method, the code (e.g., Reed Muller code, polar code) may be used regardless of the size of the UCI or the size of the codebook. In the UCI repetitive transmission procedure, the size of the UCI may not be large. If the size of the UCI is large, a lot of power may be required for transmission of the UL control channel or the UL data channel for the corresponding UCI.

In a proposed method, a column vector constituting the generator matrix of the Reed Muller code may be used as a basis.

In a proposed method and the above-described proposed method, the error rate of UCI may be a performance criterion for designing $g_a$, $g_b$. An indicator for determining the error rate in a proposed method may be the free distance, and an indicator for determining the error rate in the above-described proposed method may be the Hamming distance. Since the code in a proposed method may have a form of the convolutional code rather than the block code, the proposed method may include a case where a=b. In the case where a≠b, the convolutional coding operation may be performed by multiplying the generator matrices of the Reed Muller code.

In a proposed method, the codebook may be generated in consideration of the number of repetitive transmissions of the UCI.

The terminal may repeatedly transmit the UCI. In a communication system supporting dynamic TDD, the terminal may operate based on an indication according to higher layer signaling or dynamic signaling (e.g., DCI) of the base station in order to use periodic UL symbols or in order to improve a received power of the UL.

In the conventional UCI repetitive transmission procedure, the terminal may map the codeword to a UL control channel or a UL data channel while maintaining the codebook in an existing state. Radio resources for the UL control channel may also be maintained. The base station may receive the UCI from the terminal, and a new transmission may not be instructed to the terminal before the terminal completes the transmission of the UL control channel or the UL data channel.

The base station may reduce a transmission delay time of DL data or UL data by minimizing the scheduling constraint. In the transmission procedure of the DL data, the base station may increase the size of the TB to quickly obtain the UCI. Since the DL data is transmitted through a small number of TBs, the number of transmissions of the DL data channel may be reduced. Thus, indirectly, the size of the UCI (e.g., HARQ response) may be reduced. If the size of the TB is large and the terminal fails to decode the corresponding TB, the size of the resource used by the base station for retransmission of the corresponding TB may increase. Therefore, increasing the size of TB may not be a good method.

The codebook may consist of UCIs mapped to the same UL control channel or UL data channel. The UCI indicated by the base station may be mapped one-to-one with radio resources of the UL control channel. The mapping relationship between the UCI and the radio resources of the UL control channel may be applied to the UCIs that are repeatedly transmitted. The UL control channel may be transmitted one or more times in a slot, and the UL control channel may be transmitted using the same radio resource or different radio resources. The terminal may repeatedly transmit the UCI as many times as indicated by the base station. Therefore, in a proposed method, the terminal may generate the codebook for all the UCIs multiplexed in the UL control channel or the UL data channel.

The order of UCIs (e.g., HARQ response bits) belonging to the HARQ response codebook may be configured in ascending or descending order of reception timing of the DL control channels or the DL data channels.

The base station may configure the terminal to perform the repetitive transmission procedure of the HARQ response using higher layer signaling. In order to minimize the scheduling constraint, the base station may schedule the terminal to transmit a new UL control channel even while the terminal transmits the UL control channel.

Figure 7:
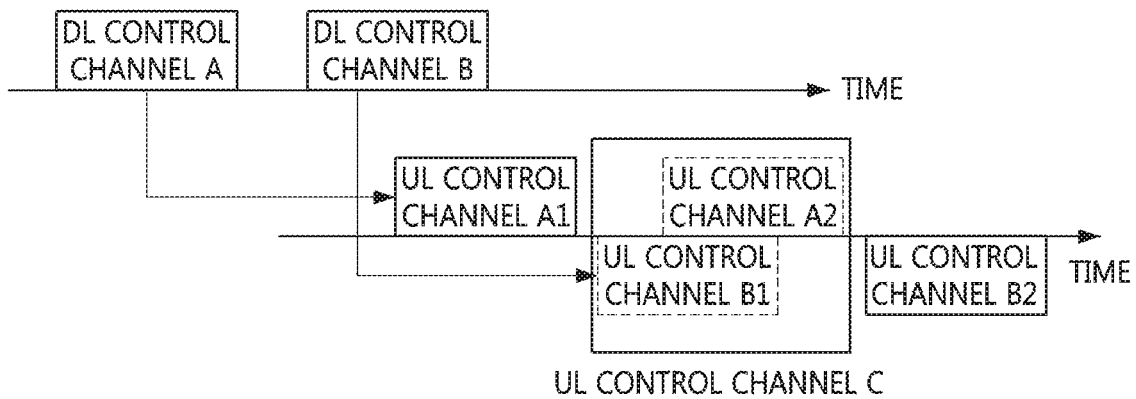
FIG. 7 is a timing diagram illustrating a first exemplary embodiment of a method of transmitting UCI in a communication system.

FIG. 7 is a timing diagram illustrating a first exemplary embodiment of a method of transmitting UCI in a communication system.

Referring to FIG. 7, the terminal may transmit a new UL control channel A2 before transmission of a UL control channel B1 is completed. Here, the base station may assign two DL control channels, and the terminal may feed back two UL control channels.

The base station may transmit a DL control channel A to the terminal, and may transmit a DL data channel A (not shown) scheduled by the DL control channel A to the terminal. The terminal may receive the DL control channel A from the base station, and may receive the DL data channel A from the base station based on scheduling information included in the DL control channel A. In addition, the base station may transmit a DL control channel B to the terminal, and may transmit a DL data channel B (not shown) scheduled by the DL control channel B to the terminal. The terminal may receive the DL control channel B from the base station, and may receive the DL data channel B from the base station based on scheduling information included in the DL control channel B. The terminal may receive the DL control channel A before the DL control channel B, and may receive the DL data channel A before the DL data channel B.

The terminal may generate an HARQ response for the DL data channel A scheduled by the DL control channel A, and determine radio resources of UL control channels (e.g., UL control channels A1 and A2) used for transmission of the HARQ response. The terminal may generate an HARQ response for the DL data channel B scheduled by the DL control channel B, and determine radio resources of the UL control channels (e.g., UL control channels B1 and B2) used for transmission of the HARQ response.

In the conventional method, the base station may not assign the DL control channel B to the terminal. In a proposed method, in order to reduce the transmission delay time of the UCI, the base station may assign the DL control channel B to the terminal. Since each of the time resources of the UL control channel A1 and the time resource of the UL control channel B2 does not overlap with a time resource of another UL control channel, the terminal may transmit the UCI using the UL control channel A1 and the UL control channel B2. Since the time resource of the UL control channel A2 overlaps with the time resource of the UL control channel B1, the terminal may transmit the UCI using a new UL control channel C. In the UL control channel C, the UL control channel B1 may be multiplexed with the UL control channel A2.

The terminal may generate three HARQ response codebooks having different sizes. The HARQ response codebook for the UL control channel A1 may include HARQ response bits for the DL data channel A scheduled by the DL control channel A. The terminal may identify the size of the HARQ response codebook based on a DAI included in the DL control channel A.

The terminal may generate a common HARQ response codebook for the UL control channel A1 and the UL control channel B1, and the common HARQ response codebook may include HARQ response bits for the DL data channel A scheduled by the DL control channel A and HARQ response bits for the DL data channel B scheduled by the DL control channel B. The terminal may identify the size of the HARQ response codebook for the UL control channel C based on a sum of the DAI included in the DL control channel A and the DAI included in the DL control channel B. The DAI included in the DL control channel B may indirectly indicate the size of the UCI (e.g., HARQ response codebook) indicated by the DL control channel B.

The UL control channel B2 may include HARQ response bits for the DL data channel B scheduled by the DL control channel B. The HARQ response codebook for the UL control channel B2 may include HARQ response bits for the DL data channel B scheduled by the DL control channel B. The terminal may identify the size of the HARQ response codebook based on the DAI included in the DL control channel B.

The terminal may regard the codebook as information bits and obtain the codeword by performing an encoding operation on the information bits. The codeword may be mapped to the UL control channel A1, the UL control channel C, and the UL control channel B2. Therefore, the size and/or order of the information bits of the UL control channel may vary for each transmission of the UL control channels of the terminal.

The radio resource of the UL control channel may be obtained from the last DL control channel received by the terminal among the DL control channels indicating the UCI belonging to the HARQ response codebook. Thus, the UL control channel A1 may be obtained from the DL control channel A. The terminal may select a set of UL control channels based on the size of the HARQ response codebook indicated by the DL control channel A, and may use a field or a resource unit index (e.g., control channel element (CCE) index) of the DL control channel A) to determine one radio resource of the UL control channel A1.

The UL control channel C may be obtained from the DL control channel B. The terminal may select a set of UL control channels based on the size of the newly derived HARQ response codebook, and use a field or a resource unit index (e.g., CCE index) of the DL control channel B to determine one radio resource of the UL control channel C. The terminal may select a set of UL control channels from the size of the HARQ response codebook indicated by the DL control channel B, and may use a field or a resource unit index (e.g., CCE index) of the DL control channel B to determine one radio resource of the UL control channel B2.

When the UCI is transmitted using a spreading code without a codebook, the terminal may transmit the UCI in the order of receiving the DL data channels.

The base station may assign a DL data channel to the terminal dynamically or semi-statically (or, semi-persistently). The base station may configure a reception periodicity of the DL data channel using higher layer signaling (e.g., RRC message), and may transmit DCI including frequency resource information and time resource information (e.g., information of time resources in a slot) of the DL data channel through a DL control channel. The terminal may receive the RRC message and the DCI (e.g., DL control channel) from the base station, and may identify the reception resource of the DL data channel based on the RRC message and the DCI. For example, the terminal may derive an offset from the slot in which the DL control channel is received to the slot in which the DL data channel is to be received, and may derive the reception resource of the DL data channel based on the offset.

The base station may configure a transmission periodicity of the DL data channel in units of a unit shorter than a slot. For example, the base station may configure the transmission periodicity of the DL data channel to two or seven symbols. The terminal may transmit an HARQ response for the DL data channel received from the base station to the base station.

In a proposed method, the terminal may transmit the UL control channel according to the reception periodicity of the DL data channel. When the DL data channel includes one TB, the terminal may transmit one HARQ response bit (e.g., HARQ-ACK bit) for one TB to the base station. The terminal may multiplex an HARQ response bit for the previously received DL data channel and an HARQ response bit for the last received DL data channel in the same UL control channel. The order of HARQ response bits multiplexed in the same UL control channel may follow an order of receiving the DL data channels or an inverse order to the order of receiving the DL data channels. For transmission of one or two UCI bits (e.g., HARQ response bits), the UL control channel may have the same format (e.g., format 0 or format 1). Even when the terminal multiplexes the HARQ response bits in the same UL control channel, there may be no change in the transmission of the UL control channel.

In addition, an HARQ response bit for another DL data channel (e.g., dynamically assigned DL data channel) may be multiplexed in the same UL control channel with the HARQ response bit for the semi-statically (or, semi-persistently) assigned DL data channel. That is, the terminal may transmit the HARQ response bit for another DL data channel and the HARQ response bit for the semi-statically (or, semi-persistently) assigned DL data channel through the same UL control channel.

In a proposed method, the UCI (e.g., HARQ response) may be mapped one-to-one to the resource of the UL control channel, and the terminal may multiplex the UCI according to the mapping relationship between the UCI and the resources of the UL control channel.

The base station may transmit DCI instructing to feed back the UCI to the terminal through a DL control channel. The UCI may include one or more of CSI, HARQ response, and scheduling request (SR). The terminal may transmit one or more UL control channels in one slot, and this operation may be configured by the base station.

In the conventional method, the HARQ response codebook (e.g., HARQ-ACK codebook) may correspond to the UL control channel. In a proposed method, the HARQ response may correspond to the UL control channel, and the terminal may generate the codebook based on a corresponding relationship between the HARQ response and the UL control channel.

Figure 8:
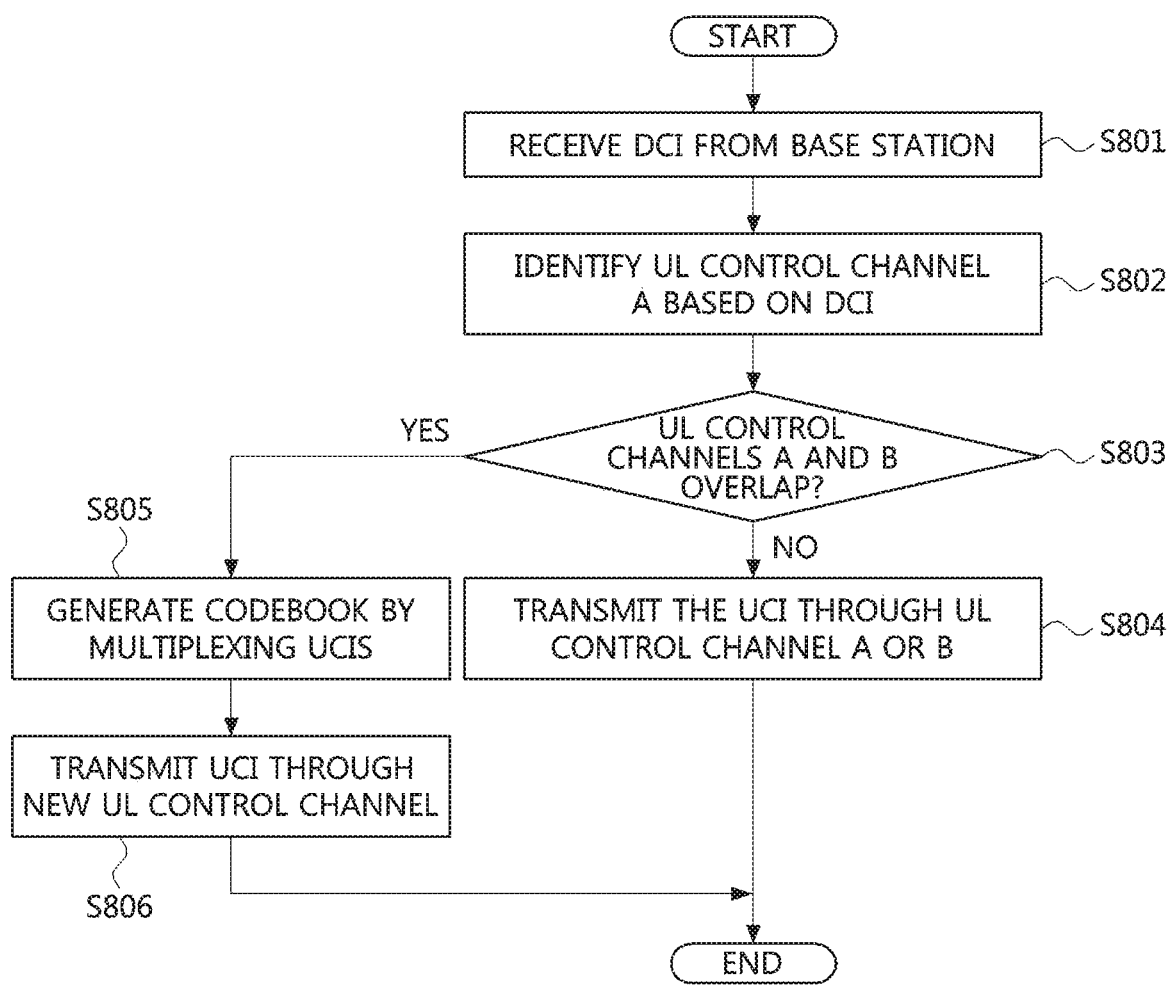
FIG. 8 is a timing diagram illustrating a second exemplary embodiment of a method of transmitting UCI in a communication system.

FIG. 8 is a timing diagram illustrating a second exemplary embodiment of a method of transmitting UCI in a communication system.

Referring to FIG. 8, the base station may transmit DCI to the terminal through a DL control channel. The terminal may receive the DCI from the base station (S801). The terminal may determine whether to transmit UCI based on information included in the DCI, and may identify the size of the UCI. In addition, the terminal may identify a resource of a UL control channel (e.g., UL control channel A) based on the information included in the DCI (S802). The terminal may identify whether UL control channels (e.g., UL control channels A and B) overlap in the time domain (S803). The UL control channel B may be a resource of a UL control channel configured before the UL control channel A.

When the UL control channel A overlaps with the UL control channel B in the time domain, the terminal may multiplex UCI bits, perform a concatenation operation on the multiplexed UCI bits, and perform the same encoding operation on the concatenated result. The multiplexing procedure may be shared between the base station and the terminal, and the resource of the UL control channel may be indicated by one DL control channel among the DL control channels received by the terminal.

When the UL control channels indicated by the DL control channels received at the terminal overlap in the time domain, the terminal may transmit the UL control channel based on the last DL control channel among the received DL control channels. A specific field included in the last DL control channel may explicitly indicate the UL control channel. Alternatively, the last DL control channel may indicate the UL control channel by an implicit signaling scheme (e.g., the smallest value among resource unit indexes (e.g., CCE indexes) of the DL control channel).

When one UL control channel is indicated or when the UL control channels do not overlap in the time domain, the terminal transmit the UCI using a UL control channel (e.g., UL control channel A or B) indicated by the base station (S804). For example, the terminal may generate two or more HARQ response codebooks (or two or more CSI codebooks), and may map each of the two or more HARQ response codebooks (or two or more CSI codebooks) to the UL control channel. The two or more HARQ response codebooks (or two or more CSI codebooks) may be transmitted in one slot. That is, the terminal may transmit a plurality of HARQ responses through one slot.

When two or more UL control channels (e.g., UL control channels A and B) overlap in the time domain, the terminal may generate a codebook by multiplexing a plurality of UCIs (S805). The terminal may derive a new resource for the UL control channel, and may transmit the UCI using the new resource (S806). Here, the terminal may not transmit two or more UL control channels in the same UL symbol due to the limitation of the transmission power.

Figure 9A:
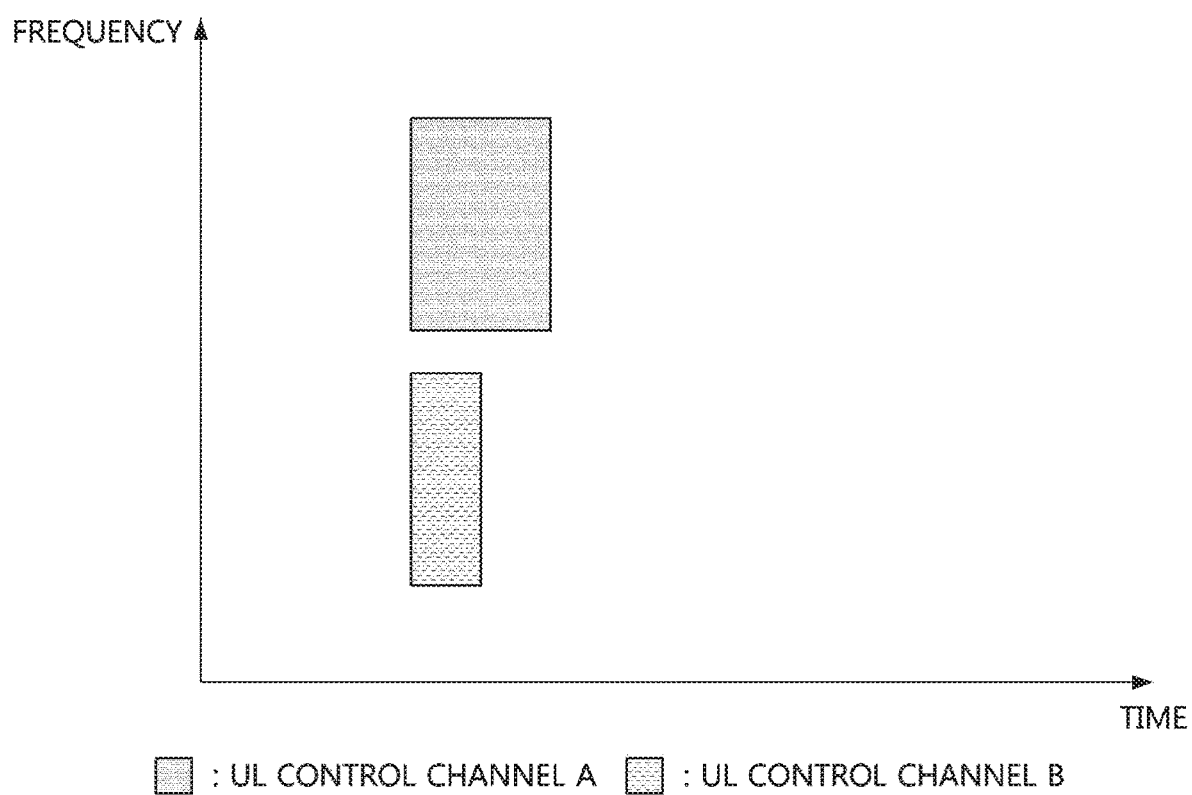
FIG. 9A is a conceptual diagram illustrating a first exemplary embodiment of UL control channels overlapping in the time domain.
Figure 9B:
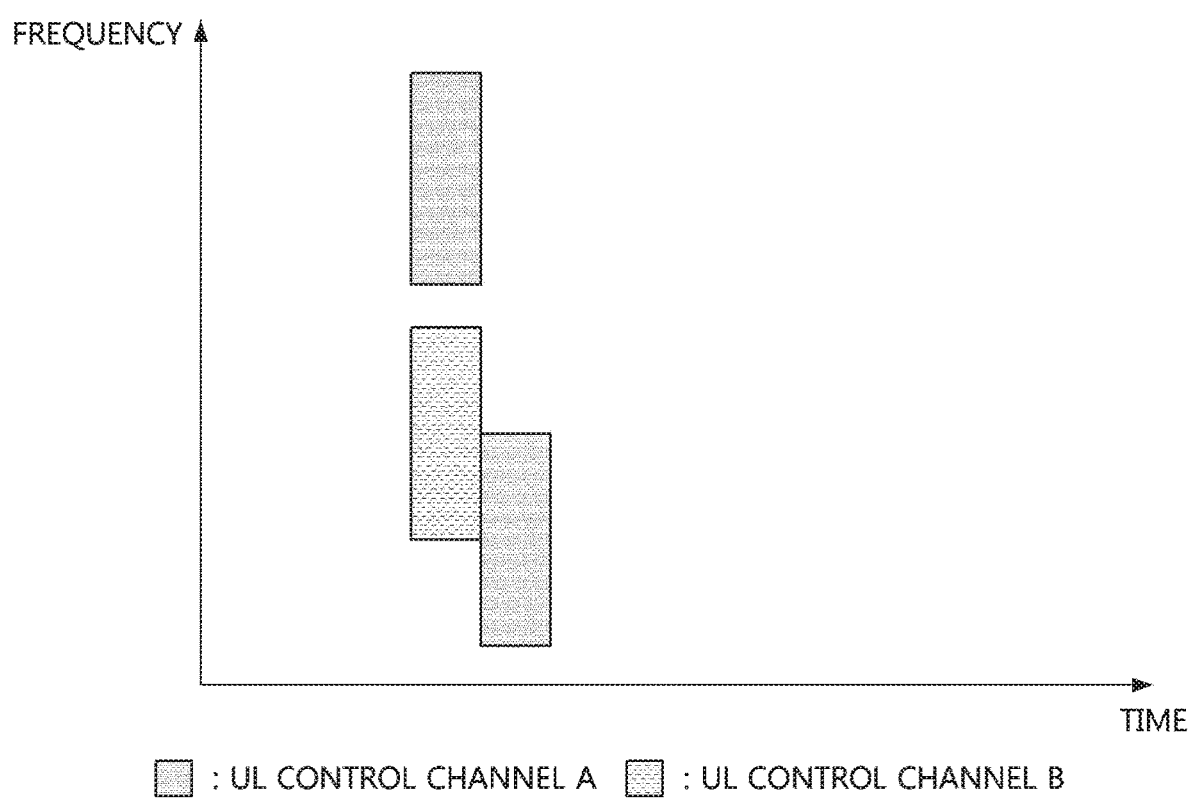
FIG. 9B is a conceptual diagram illustrating a second exemplary embodiment of UL control channels overlapping in the time domain.
Figure 9C:
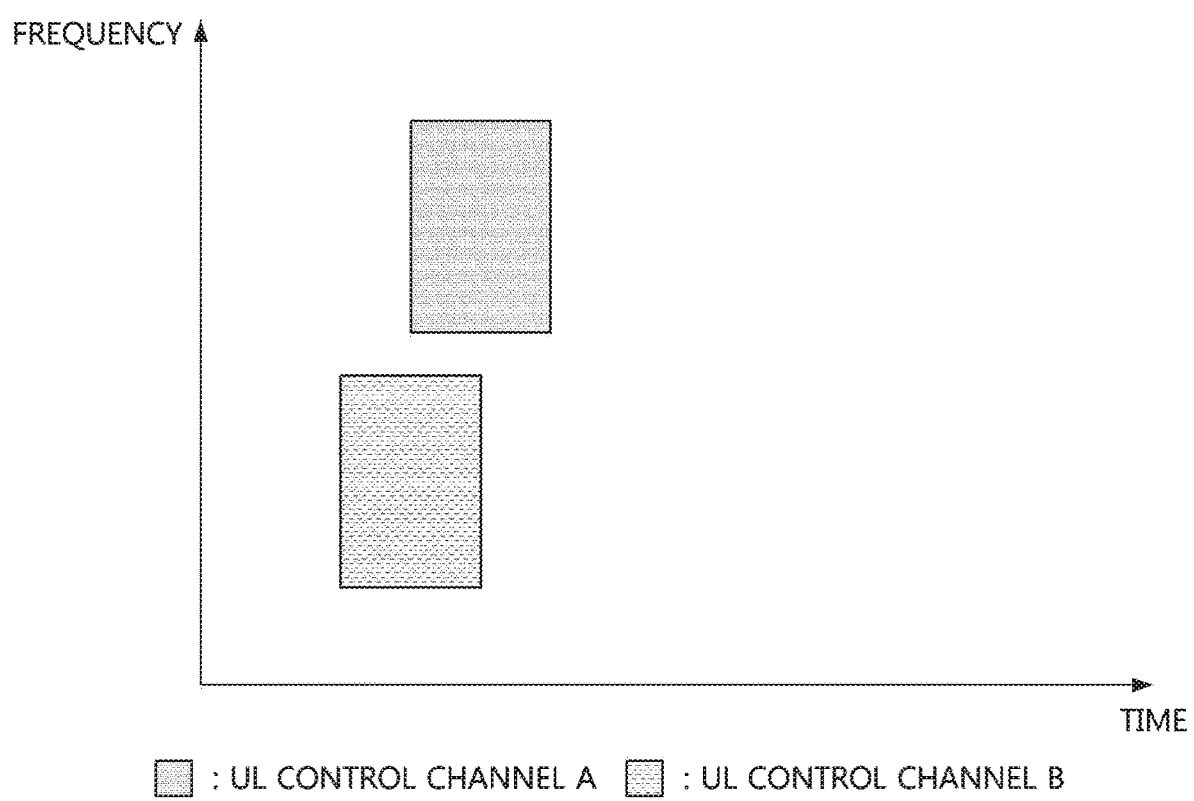
FIG. 9C is a conceptual diagram illustrating a third exemplary embodiment of UL control channels overlapping in the time domain.
Figure 9D:
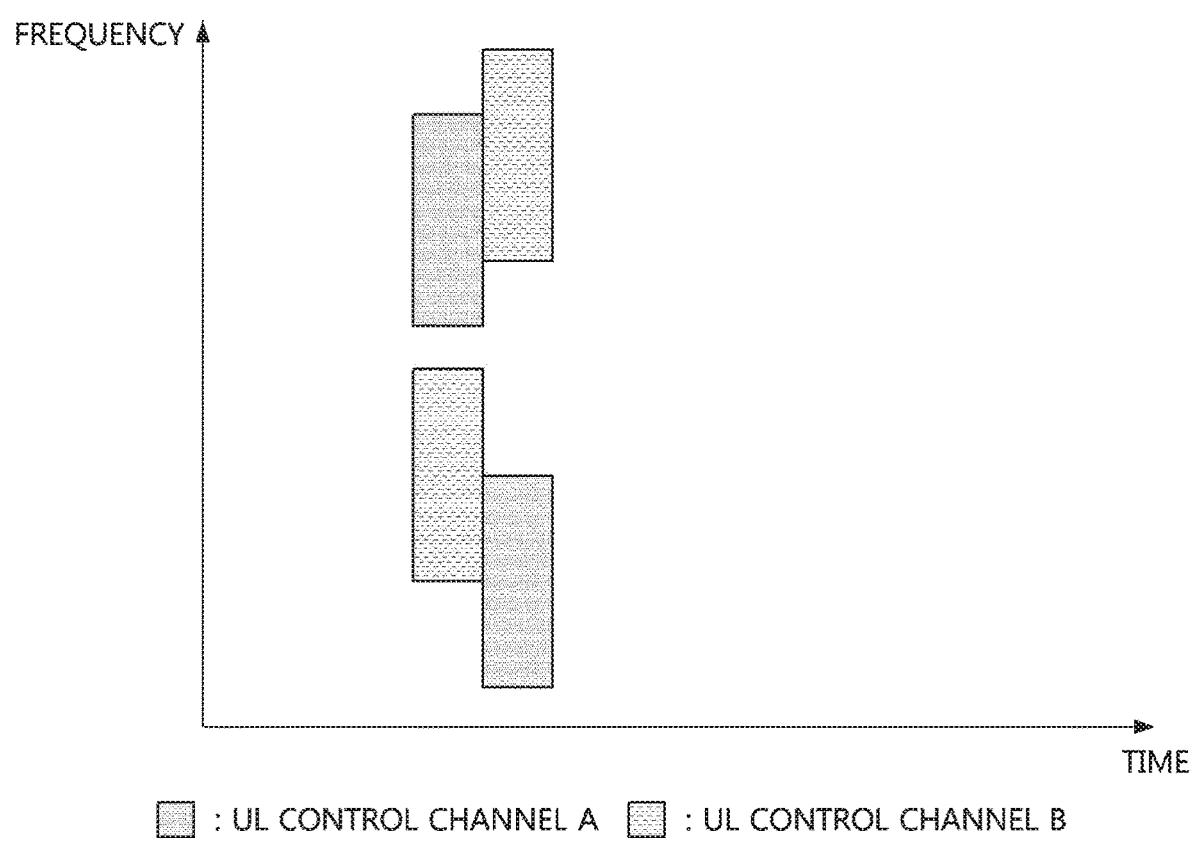
FIG. 9D is a conceptual diagram illustrating a fourth exemplary embodiment of UL control channels overlapping in the time domain.
Figure 9E:
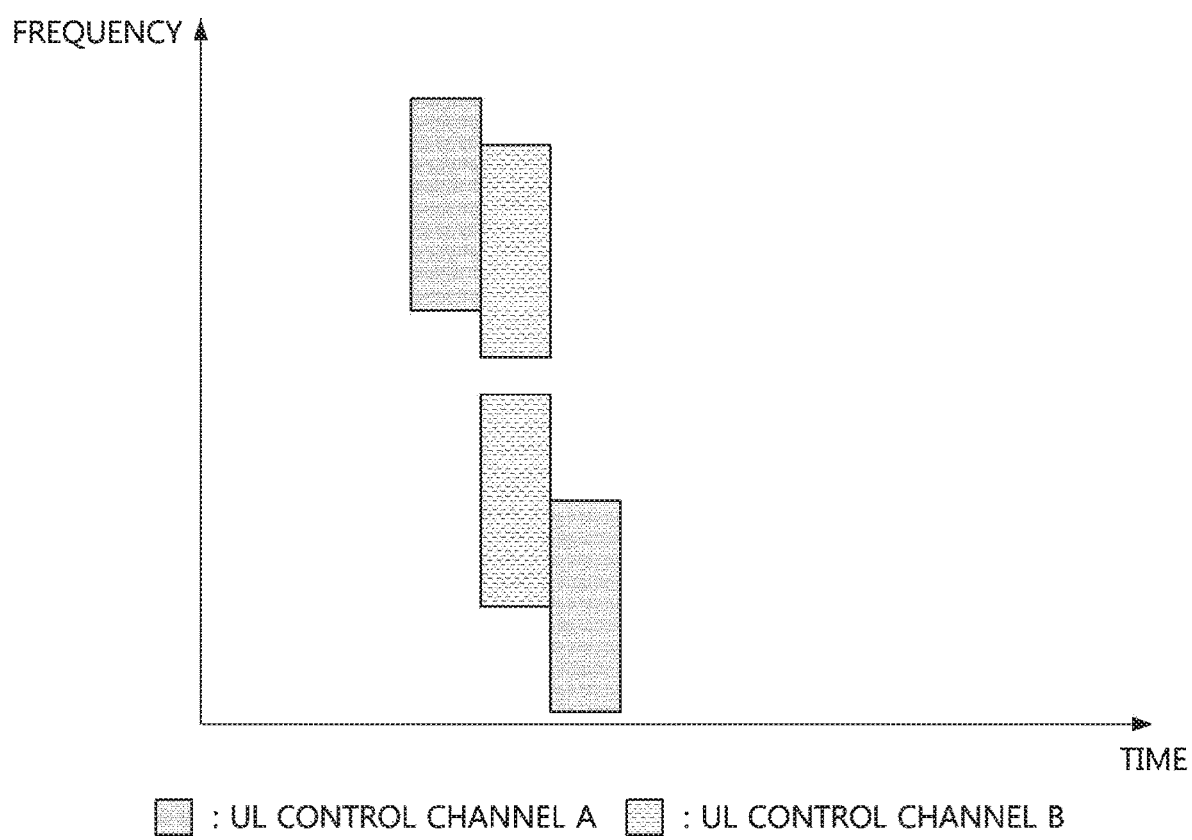
FIG. 9E is a conceptual diagram illustrating a fifth exemplary embodiment of UL control channels overlapping in the time domain.

FIG. 9A is a conceptual diagram illustrating a first exemplary embodiment of UL control channels overlapping in the time domain, FIG. 9B is a conceptual diagram illustrating a second exemplary embodiment of UL control channels overlapping in the time domain, FIG. 9C is a conceptual diagram illustrating a third exemplary embodiment of UL control channels overlapping in the time domain, FIG. 9D is a conceptual diagram illustrating a fourth exemplary embodiment of UL control channels overlapping in the time domain, and FIG. 9E is a conceptual diagram illustrating a fifth exemplary embodiment of UL control channels overlapping in the time domain.

Referring to FIGS. 9A to 9E, the UL control channel may consist of one or two symbols in the time domain. Alternatively, the UL control channel may consist of three or more symbols in the time domain. In the time domain, the UL control channel A may overlap with the UL control channel B. In addition, the UL control channel A may overlap with the UL control channel B in the frequency domain.

Referring back to FIG. 8, the terminal may generate a codebook for each type of UCI. If the UL control channels partially overlap in the time domain, the codebook may be applied to the UCI corresponding to each of the UL control channels.

When the UL control channels used for transmission of the HARQ responses overlap in the time domain, the terminal may generate the codebook after arranging the HARQ response bits in appropriate locations. The appropriate locations may be defined in the 3GPP technical specification. The locations of the HARQ response bits may be determined based on an ascending or descending order of reception timings of the DL data channels assigned by the DCI. The terminal may select the DL data channel(s) associated with the HARQ response(s) transmitted in the same UL symbol among the HARQ responses for the DL data channels, and generate the codebook for the selected DL data channel(s). This operation may be configured by the base station.

When UL control channels used for transmission of CSI overlap in the time domain, the terminal may select a part of the CSI according to the priority of the CSI, and generate a codebook for the selected CSI. The terminal may determine the priority of the CSI without additional signaling from the base station. For example, the terminal may determine the priority of the CSI based on the contents defined in the 3GPP technical specification.

When the UL control channels used for transmission of the HARQ response and the CSI overlap in the time domain, the terminal may generate an HARQ response codebook and a CSI codebook, and may concatenate the HARQ response codebook and the CSI codebook.

The terminal may generate a codebook for each type of UCI, and may concatenate the generated codebooks. The terminal may generate a codeword by performing the same channel encoding operation, and may map the codeword to a UL control channel or a UL data channel. The number of HARQ response codebooks (or the number of CSI codebooks) that can be generated in one slot and/or the number of UL control channels that can be transmitted in one slot may be limited according to the processing capability of the terminal. The terminal may inform its processing capability to the base station through higher layer signaling. Therefore, since the base station knows the processing capability of the terminal, the base station may perform a scheduling operation in consideration of the processing capability of the terminal. If a transmission procedure scheduled by the base station exceeds the processing capability of the terminal, the terminal may not perform a decoding operation on the last DL data channel assigned by the DCI. In addition, the terminal may not expect the base station to schedule a transmission procedure exceeding the processing capability of the terminal.

In a proposed method, the terminal may generate a codebook for a specific type of UCI. If the UL control channels for transmission of SR and CSI overlap (partially) in the time domain, the terminal may generate a codebook for the SR and may not generate a codebook for the CSI. When the UL control channels for transmission of the HARQ response and the CSI overlap (partially) in the time domain, the terminal may generate a codebook for the HARQ response and may not generate a codebook for the CSI. The terminal may map the generated codebook to the UL control channel. That is, the terminal may report the SR or HARQ response excluding the CSI to the base station.

In a proposed method, a PRI may correspond one-to-one with a time resource of the DL data channel, and the UCI may be multiplexed based on a correspondence relationship between the time resource of the DL data channel and the PRI. The PRI may mean a resource index of the UL control channel.

The terminal may receive a DL data channel scheduled by a DL control channel (e.g., DCI), and may feed back an HARQ response for the DL data channel to the base station. The HARQ response may be transmitted through a UL control channel, and the UL control channel may be indicated by the PRI included in the DCI scheduling the corresponding DL data channel or by the PRI and a resource unit index (e.g., CCE index) of the DL control channel.

Even in a situation in which the terminal does not receive the DL control channel (e.g., discontinuous transmission (DTX)), the number of UCIs determined by the base station may be the same as the number of UCIs determined by the terminal. If the number of UCIs determined by the base station is different from the number of UCIs determined by the terminal, the number of resources of the UL control channel, which is derived by the base station, may be different from the number of resources of the UL control channel, which is derived by the terminal. In this case, the base station should perform a detection operation of the UL control channel in consideration of various situations. Accordingly, the size of the HARQ response codebook may be indicated to the terminal by higher layer signaling as well as dynamic signaling (e.g., DCI).

Meanwhile, the DCI may include an offset of a slot for feedback of the HARQ response and a resource index (PRI) of the UL control channel. The resource to which the UL control channel is mapped may be indicated by the slot offset and the PRI included in the DCI. The terminal may apply a time window for generating an HARQ response codebook from the slot for transmitting the UL control channel. The time window may consist of slots according to a feedback timing of the HARQ response indicated by the DCI.

The terminal may generate an HARQ response bit in a preconfigured order for each location of DL data channel candidates that can be scheduled in the slot belonging to the time window. When the DL data channel is actually assigned to the terminal, the terminal may express a decoding result of the TB for the corresponding DL data channel as an HARQ response bit. If the DL data channel is not assigned to the terminal, the terminal may generate a NACK for the corresponding DL data channel (e.g., DL data channel candidate). The time window may be configured in units of slots, and the feedback timing of the HARQ response may be configured in units of slots. Since the terminal transmits the UL control channel once in the slot, the DL data channel candidates may be mapped to one UL control channel.

In order to reduce a time from the transmission of the DL control channel for scheduling the DL data channel to the reception of the HARQ response for the DL data channel in the URLLC service, the terminal may transmit the UL control channel two or more times in the slot.

Since the time window of the terminal is configured in units of slots, the DL data channel candidates may not correspond to one UL control channel. The DL data channel candidates may correspond to a plurality of HARQ response codebooks. Accordingly, when the size of the HARQ response codebook is semi-static, the size of the corresponding HARQ response codebook may increase, and accordingly, the size of the UL control channel may increase. If the base station does not perform a decoding operation (e.g., soft combining operation) on the UL control channel(s), the increase in the size of the UL control channel may cause the coverage of the UL control channel to decrease.

In order to solve this problem, a set of time domain resources of the DL data channel may be configured in a proposed method. The time domain resources of the DL data channel may be indicated by a slot offset $K_1$ and a time domain resource allocation (TDRA) for the HARQ response. The set of time domain resources of the DL data channel may be a subset of an entire set of time domain resources of the DL data channel (e.g., time resources of the DL data channel, which are indicated by pdsch-TimeDomainAllocationList) configured by higher layer signaling. In the following exemplary embodiments, "$K_1$+TDRA" may be referred to as KTDRA. That is, KTDRA may include $K_1$ and TDRA.

The serving base station may configure a subset of time domain resources of the DL data channel to the terminal using higher layer signaling. When the DL data channel is assigned, a subset to which the KTDRA that the corresponding DL data channel has belongs may be determined, and the size of the HARQ response codebook mapped to the UL control channel for the DCI scheduling the corresponding DL data channel may be determined.

The base station may transmit DCI including the KTDRA and the PRI to the terminal. The terminal may receive the DCI from the base station, and may identify the KTDRA and the PRI included in the DCI. The terminal may regard DL data channels belonging to the subset of KTDRA as the DL data channel candidates, and generate an HARQ response codebook. For example, the terminal may receive DL data through the DL data channels belonging to the subset of KTDRA, and generate an HARQ response codebook including HARQ responses for the DL data. The HARQ response codebook may be mapped to the UL control channel indicated by the PRI.

In order to configure the subset of DL data channels (e.g., set consisting of KTDRAs), the base station may configure the DL data channel(s) having the same or similar symbol as the last symbol belonging to the DL data channel indicated by the TDRA to belong to the same subset of KTDRA.

In a proposed method, the base station may configure DL data channel(s) belonging to a subset of KTDRA using higher layer signaling. The UL control channel may not be limited. Since an HARQ response codebook is generated for each subset of DL data channel(s), the base station may determine a feedback timing of the HARQ response in consideration of the processing capability of the terminal when assigning the UL control channel.

In a proposed method, PRI may correspond to KTDRA. That is, the subset consisting of the resources of the UL control channel may correspond one-to-one with the subset of the time domain resources of the DL data channel.

The base station may configure a subset for a set having resources of the UL control channel as elements, in which case all elements of the resources of the UL control channel may belong to the subset. In addition, the base station may configure a subset for a set having the time domain resources (e.g., KTDRA) of the DL data channel as elements, in which case all elements of the time domain resources of the DL data channel may belong to the subset.

The serving base station may inform the terminal of the mapping relationship between the subsets (e.g., the subset to which the KTDRA belongs and the subset to which the PRI belongs) using higher layer signaling. The terminal may know the mapping relationship between the subset to which the KTDRA belongs and the subset to which the PRI belongs through higher layer signaling. When the DCI including the KTDRA and the PRI is received from the base station, the terminal may derive a subset of the KTDRA corresponding to the PRI according to the mapping relationship configured by higher layer signaling. The derived subset of KTDRA may be the DL data channel candidates to which the HARQ response codebook is applied, and the size of the HARQ response codebook may be determined based on the number of elements belonging to the derived subset of KTDRA.

Since the coverage of the UL control channel is determined by the size of the HARQ response codebook, the base station may configure a subset by dividing a list of KTDRAs of the DL data channel as evenly as possible. In addition, the slot offset $K_1$ for feedback of the HARQ response may be configured in units of slots. This exemplary embodiment may be performed as follows. In the following exemplary embodiments, the TDRA may mean the DL data channel candidate and the PRI may mean the UL control channel candidate.

Figure 10:
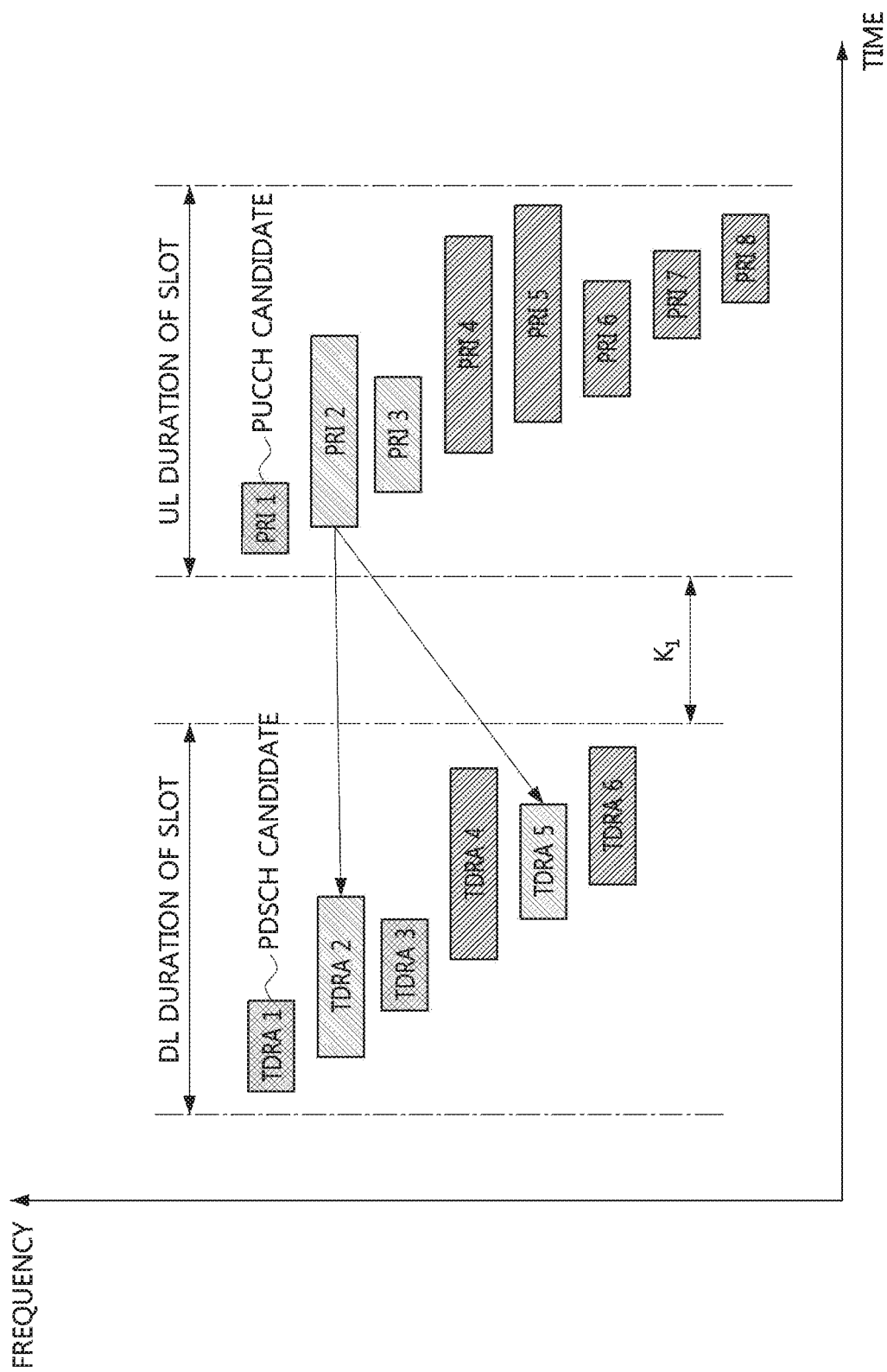
FIG. 10 is a conceptual diagram illustrating a first exemplary embodiment of a mapping relationship between a DL data channel and an UL control channel in a communication system.

FIG. 10 is a conceptual diagram illustrating a first exemplary embodiment of a mapping relationship between a DL data channel and an UL control channel in a communication system.

Referring to FIG. 10, the base station may configure TDRAs for a DL data channel (e.g., DL data channel candidate) to the terminal using higher layer signaling. For example, six TDRAs may be configured within a DL duration of one slot. In addition, the base station may inform the terminal of a slot offset ($K_1$), a PRI, and the like for feedback of an HARQ response. For example, DCI including $K_1$ and PRI may be transmitted from the base station to the terminal. Nine PRIs may be configured within a UL duration of one slot. In this case, a TDRA subset may be considered instead of a KTDRA subset.

The base station may classify the TDRAs into one or more subsets. For example, a subset 1 may comprise TDRA1 and TDRA3, a subset 2 may comprise TDRA2 and TDRA5, and a subset 3 may comprise TDRA4 and TDRA6. The base station may also classify the PRIs into one or more subsets. For example, a subset 1 may comprise PRI1, a subset 2 may comprise PRI2 and PRI3, and a subset 3 may comprise PRI4 to PRI8. The subsets of DL data channel candidates may correspond to the subsets of UL control channel candidates. The base station may inform the terminal of the mapping relationship between the subsets of DL data channel candidates (e.g., TDRAs) and the subsets of UL control channel candidates (e.g., PRIs) through a combination of one or more of higher layer signaling, MAC control element (MAC), and DCI.

The terminal may receive the DCI from the base station, and may obtain $K_1$ and PRI included in the DCI. When the DCI includes PRI2, the terminal may generate an HARQ response codebook for TDRA2 and TDRA5 corresponding to PRI2. For example, since the HARQ response codebook includes an HARQ response bit for TDRA2 and an HARQ response bit for TDRA5, the size of the HARQ response codebook may be 2 bits. The terminal may map the HARQ response codebook to a UL control channel. The UL control channel used for transmission of the HARQ response codebook may be determined by $K_1$ and PRI2 included in the DCI.

Meanwhile, the slot may be divided into a plurality of sub-slots, and one slot may be configured to correspond to the PRI. The boundary of the sub-slot may be indicated to the terminal by higher layer signaling. Alternatively, the boundary of the sub-slot may be defined in the 3GPP technical specification. The DL data channel assigned by the base station may be located in one or more sub-slots. Therefore, the first sub-slot or the last sub-slot to which the TDRA of the DL data channel belongs may be a reference sub-slot. In this case, an HARQ response codebook for all DL data channel candidates belonging to the reference sub-slot may be generated. The terminal may transmit the HARQ response codebook through the PRI indicated by the DCI within a UL duration after the slot offset (or sub-slot offset) indicated by the DCI from the slot (or sub-slot) in which the DL data channel is received.

The terminal may determine the size (e.g., the number of UCIs) of the HARQ response codebook according to the exemplary embodiment shown in FIG. 10. For example, the terminal may determine the size of the HARQ response codebook based on the mapping relationship between the subset of DL data channel candidates and the subset of UL control channel candidates.

Figure 11A:
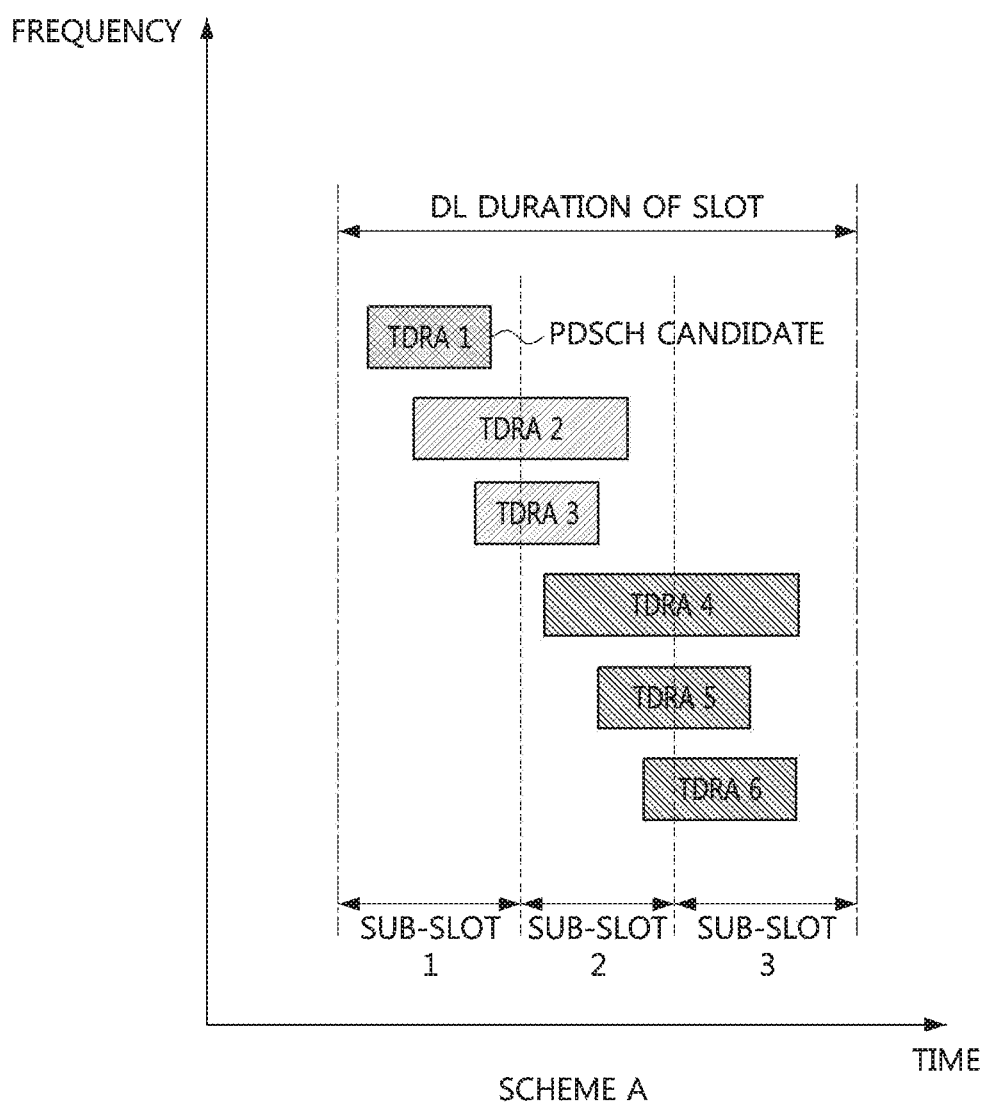
FIG. 11A is a conceptual diagram illustrating a first exemplary embodiment of a method of configuring a DL data channel in a communication system.
Figure 11B:
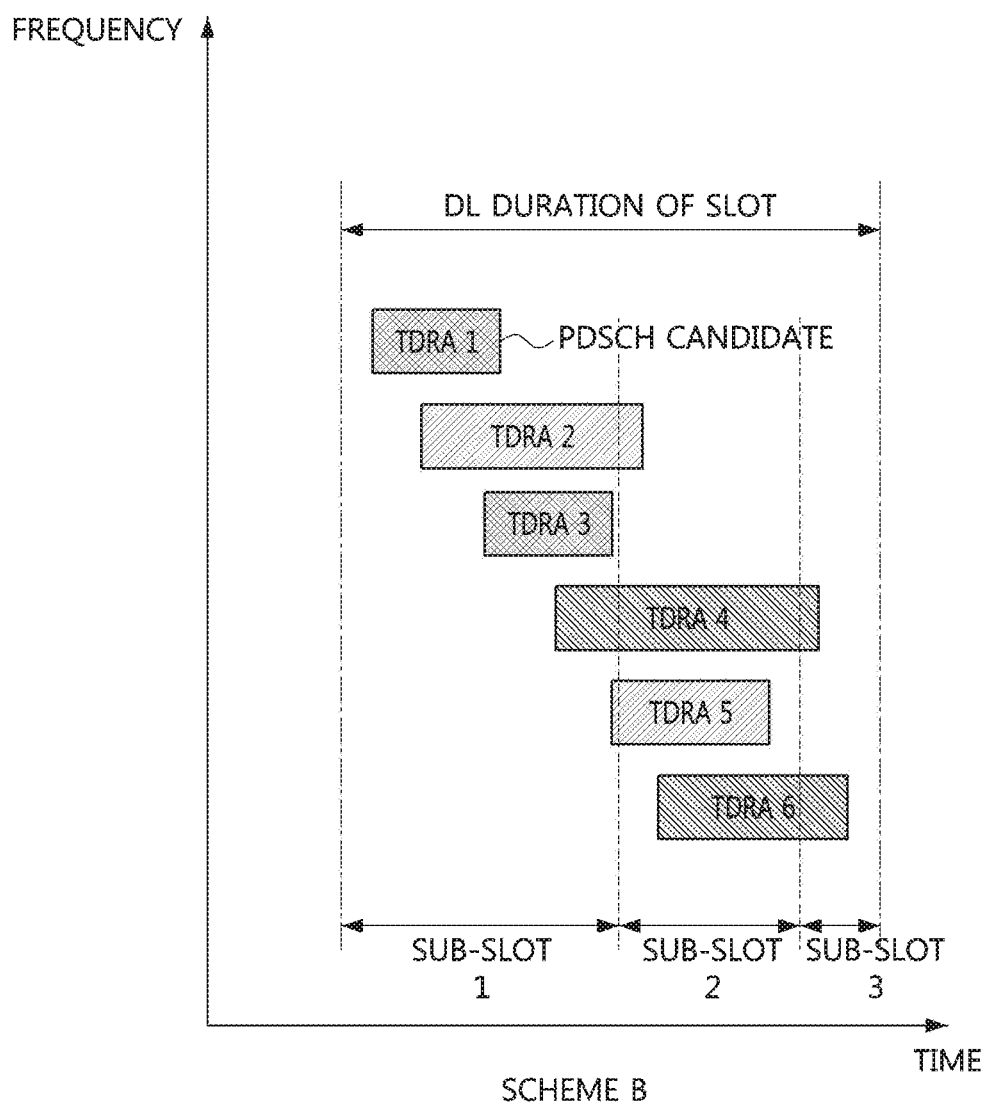
FIG. 11B is a conceptual diagram illustrating a second exemplary embodiment of a method of configuring a DL data channel in a communication system.

FIG. 11A is a conceptual diagram illustrating a first exemplary embodiment of a method of configuring a DL data channel in a communication system, and FIG. 11B is a conceptual diagram illustrating a second exemplary embodiment of a method of configuring a DL data channel in a communication system.

Referring to FIGS. 11A and 11B, in a scheme A, the size of the HARQ response codebook may be different for each sub-slot to which the DL data channel candidate belongs. In a scheme B, the size of the HARQ response codebook may be the same in the sub-slots to which the DL data channel candidates belongs. In the scheme A, a subset 1 may comprise TDRA1, a subset 2 may comprise TDRA2 and TDRA3, and a subset 3 may comprise TDRA4 to TDRA6. In the scheme B, a subset 1 may include TDRA1 and TDRA3, a subset 2 may include TDRA2 and TDRA5, and a subset 3 may include TDRA4 and TDRA6.

In the schemes A and B, one $K_1$ may be used. The terminal may use one $K_1$ indicated by the base station among a plurality of $K_1$s. The exemplary embodiment shown in FIG. 11 may also be applied to an exemplary embodiment using KTDRA. A DL slot may be divided into three sub-slots, and the sub-slot to which the last symbol of the DL data channel candidate belongs may be determined as the sub-slot to which the corresponding DL data channel candidate belongs.

In the scheme A, the lengths of the sub-slots may be the same in the time domain. In the scheme A, TDRA1 (e.g., DL data channel candidate corresponding to TDRA1) may belong to the sub-slot 1, and TDRA2 and TDRA3 (e.g., DL data channel candidates corresponding to TDRA2 and TDRA3) may belong to the sub-slot 2, and TDRA4 to TDRA6 (e.g., DL data channel candidates corresponding to TDRA4 to TDRA6) may belong to the sub-slot 3. In this case, the size of HARQ response codebook for the sub-slot 1 may be 1 bit, the size of HARQ response codebook for the sub-slot 2 may be 2 bits, and the size of HARQ response codebook for the sub-slot 3 may be 3 bits. Accordingly, the base station may receive a UL control channel having a different quality for each sub-slot to which the DL data channel belongs.

In the scheme B, the lengths of the sub-slots may be different in the time domain. For example, the lengths of the sub-slots may be configured such that the number of TDRAs belonging to one sub-slot is the same. In the scheme B, TDRA1 and TDRA3 (e.g., DL data channel candidates corresponding to TDRA1 and TDRA3) may belong to the sub-slot 1, and TDRA2 and TDRA5 (e.g., DL data channel candidates corresponding to TDRA2 and TDRA5) may belong to the sub-slot 2, and TDRA4 and TDRA6 (e.g., DL data channel candidates corresponding to TDRA4 and TDRA6) may belong to the sub-slot 3. Accordingly, the size of the HARQ response codebook may be 2 bits regardless of the TDRA of the DL data channel candidate.

The exemplary embodiments illustrated in FIGS. 11A and 11B may be applied when the DCI indicates one $K_1$. Even when the communication system supporting the URLLC service operates in the FDD scheme or the TDD scheme, a plurality of $K_1$s need not be configured by frequently changing the UL-DL configuration. However, if the DL resource is allocated more than the UL resource when the size of the DL data is larger than the size of the UL data, the set of $K_1$ may include a plurality of values. The above-described exemplary embodiment (e.g., the extended scheme of the above-described exemplary embodiment) may be applied to the generation operation of the HARQ response codebook.

The KTDRA may indicate a time domain resource. The KTDRAs may be classified into a plurality of subsets, each of which may correspond to an HARQ response codebook. When the set of $K_1$ includes two or more values, the DL data channel may be configured as follows.

FIG. 12 is a conceptual diagram illustrating a third exemplary embodiment of a method of configuring a DL data channel in a communication system.

Referring to FIG. 12, a plurality of TDRAs may be configured in DL durations of slots 1 to 2. The slot 1 may be contiguous with the slot 2. Alternatively, the slot 1 may be discontinuous with the slot 2. $K_1$ and TDRA included in DCI may indicate a time resource of a DL data channel, and TDRAs (e.g., KTDRAs) may be divided into a plurality of subsets. The set of $K_1$ may comprise a first value and a second value. The first value of the set of $K_1$ may be applied to the TDRAs included in the slot 1, and the second value of the set of $K_1$ may be applied to the TDRAs included in the slot 2.

The subset 1 may include TDRA5 in the slot 1, TDRA6 in the slot 1, and TDRA1 in the slot 2. The subset 2 may include TDRA2 in the slot 2, TDRA3 in the slot 2, and TDRA4 in the slot 2. The base station may configure the subset(s) to the terminal using higher layer signaling, and may transmit DCI including $K_1$ and TDRA to the terminal. The terminal may identify the subset indicated by the DCI (e.g., $K_1$ and TDRA) among the subset(s) configured by higher layer signaling, and may identify the size of the HARQ response codebook for the identified subset. Accordingly, the terminal may generate the HARQ response codebook for the subset.

The base station may configure the subsets of TDRAs (e.g., KTDRAs) such that decoding end timings of DL data channels are the same or similar. The mapping relationship between the DL data channel and the UL control channel and the correspondence relationship between the DL data channel and the sub-slot may be the same as or similar to those of the above-described exemplary embodiment.

In a proposed method, in order to semi-statically signal the size of the HARQ response codebook, the slot may be divided into a plurality of sub-slots. The number of symbols included in the DL sub-slot may be different from the number of symbols included in the UL sub-slot. The first sub-slot or the last sub-slot to which the KTDRA of the DL data channel belongs may be a reference sub slot, and a time window of the HARQ response codebook may be configured based on the reference sub-slot.

The slot in which the UL control channel is transmitted (or the first sub-slot or the last sub-slot) may be derived by applying the feedback timing of the HARQ response included in the DCI. The feedback timing of the HARQ response may be configured in units of slots or sub-slots. The resource through which the UL control channel is transmitted may be indicated by the PRI included in the DCI.

According to the definition of the sub-slot, the size of the HARQ response codebook for the DL data channel may be different depending on the sub-slot to which the DL data channel is allocated and the sub-slot in which the UL control channel is transmitted. When the terminal receives the DCI, the size of the HARQ response codebook may be identical (i.e., one type). Alternatively, since the size of the HARQ response codebook may vary according to the DCI, the reception quality (e.g., error rate) of the UL control channel at the base station may be different. Therefore, it is preferable that the lengths of the sub-slots are not configured to be equal so that the size of the HARQ response codebook is uniform.

In a proposed method, the DL data channel(s) may correspond to a UL sub-slot (e.g., a UL sub-slot indicated by the base station for feedback), and the UCI may be multiplexed based on a correspondence relationship between the DL data channel(s) and the UL sub-slot.

The terminal may receive the DL data channel scheduled by the DL control channel (e.g., DCI) from the base station, and may feed back an HARQ response for the DL data channel to the base station through the UL control channel. The UL control channel used for feedback of the HARQ response may be indicated by the PRI included in the DCI scheduling the corresponding DL data channel or by the PRI and the resource unit index (e.g., CCE index) of the DL control channel.

In the communication system supporting the URLLC service, a time (e.g., dl-DataToUL-ACK of the 3GPP specification) for transmitting the DL data channel and receiving the HARQ response of the DL data channel should be short. In order to satisfy the requirements of the URLLC service, a signaling operation requiring a fast HARQ response transmission at the base station may be necessary, and an operation for the terminal to transmit two or more UL control channels in one UL slot may be necessary.

To support these functions, a sub-slot having a length shorter than a slot may be introduced into the communication system. $K_1$ and/or dl-DataToUL-ACK may be configured in units of sub-slots. A time (e.g., $K_1$) required for feedback included in the DCI scheduling the DL data channel may be configured in units of sub-slots. The base station may inform the terminal of the boundary of the sub-slot, and the terminal may identify the sub-slot used for feedback of the HARQ response for the DL data channel based on the boundary of the sub-slot. The PRI or DAI indicated by the DCI may be defined for each sub-slot.

In a proposed method, the base station may inform the terminal of a pattern of sub-slots belonging to one UL slot by using higher layer signaling. The number of sub-slots constituting the slot may be the same or different, and the length of each of the sub-slots may be the same or different. For example, the length of each of the sub-slots may vary depending on the configuration of the base station.

In a proposed method, when the slot includes a DL symbol, a UL symbol, and/or a flexible (FL) symbol, or even when the slot is configured as a DL slot, a UL slot, or an FL slot, the above-described concept of the sub-slot may be applied. The base station may inform the terminal of a pattern of a DL sub-slot or a UL sub-slot belonging to one slot. The DL sub-slot may comprise DL symbols or 'DL symbol(s)+FL symbol(s)', and the length of each of the DL sub-slots may be different. The UL sub-slot may be composed of UL symbols or 'UL symbol(s)+FL symbol(s)', and the length of each of the UL sub-slots may be different.

Hereinafter, methods of assigning a DL data channel using DCI and transmitting an HARQ response for the corresponding DL data channel through a UL control channel will be described. A slot may be divided into a DL (sub)slot for transmitting the DL data channel and a UL (sub)slot for transmitting the UL control channel. The DL sub-slot may be configured to be distinguished from the UL sub-slot. Alternatively, the sub-slot may be configured without discrimination between DL and UL.

The sub-slots may be classified based on the following methods. The DL sub-slot may mean a sub-slot to which the last symbol of the DL data channel belongs. The UL sub-slot may mean a sub-slot to which the first symbol of the UL control channel belongs. The base station may inform the terminal of the boundary of the sub-slot using higher layer signaling. Alternatively, the base station may inform the terminal of the number of sub-slots or a pattern of the sub-slots (e.g., an index indicating the pattern of the sub-slots) using higher layer signaling.

In a proposed method, the base station may configure a set or a list including resources of UL control channels to the terminal using higher layer signaling. The set or list including the resources of the UL control channels may be configured on a (UL) sub-slot basis.

In a proposed method, the base station may configure resources of UL control channels to the terminal using higher layer signaling regardless of the (UL) sub-slot and may configure the (UL) sub-slot to the terminal using higher layer signaling. The terminal may derive the boundary of the (UL) sub-slot based on the information obtained through higher layer signaling, and may distinguish the resources of the UL control channels based on the boundary of the (UL) sub-slot. Accordingly, the terminal may configure the set of the UL control channels belonging to the (UL) sub-slot.

The resources of UL control channels belonging to different (UL) sub-slots may be different. For example, the resource of the UL control channel belonging to the (UL) sub-slot 1 may be different from the resource of the UL control channel belonging to the (UL) sub-slot 2. Therefore, the DAI included in the DCI may be calculated for each (UL) sub-slot.

The DCI (e.g., for dynamically assigned PDSCH) and/or the RRC message (e.g., for semi-statically assigned PDSCH (i.e., semi-persistent scheduling (SPS) PDSCH)) may indicate a resource of one UL control channel used for feedback of an HARQ response. In addition, the terminal may identify a resource of one UL control channel based on a combination of a PRI included in the DCI and an index of a CCE (e.g., DL control channel element) to which h the corresponding DCI is mapped.

Meanwhile, in the communication system supporting the URLLC service, the resource of the UL control channel may be indicated only by the PRI included in the DCI. Alternatively, if the DCI does not include the PRI, the terminal may identify a resource of one UL control channel based on the index of the CCE to which the DCI is mapped. The resource of the UL control channel may be located in a UL slot or UL sub-slot(s) for feedback of the HARQ response.

The DCI may include a slot offset or sub-slot offset for feedback of the HARQ response. The (sub)slot offset may indicate a gap between the DL (sub)slot and the UL (sub) slot. For example, the offset included in the DCI may be a gap between the DL slot and the UL slot. Alternatively, the offset included in the DCI may be a gap between the DL slot and the UL sub-slot. Alternatively, the offset included in the DCI may be a gap between the DL sub-slot and the UL sub-slot. Alternatively, the offset included in the DCI may be a gap between the DL sub-slot and the UL slot.

A time interval for multiplexing the HARQ response may be configured in units of sub-slots. Even when two or more UL control channels do not overlap in the time domain, if the first symbols of the two or more UL control channels belong to the same UL sub-slot, HARQ responses to be transmitted through the two or more UL control channels may be multiplexed. Alternatively, when two or more UL control channels overlap in the time domain, the HARQ responses to be transmitted through the two or more UL control channels may be multiplexed, and when two or more UL control channels do not overlap in the time domain, the HARQ responses to be transmitted through the two or more UL control channels may not be multiplexed.

When the size of the HARQ response codebook is semi-statically configured (e.g., when a codebook type 1 defined in the 3GPP technical specification is used), the HARQ response codebook may be generated in units of sub-slots.

The DCI may include resources of a DL data channel, a slot offset or sub-slot offset (e.g., HARQ response timing) for feedback of an HARQ response for the DL data channel, and a PRI. The terminal may identify a UL (sub)slot in which the UL control channel is to be transmitted based on the HARQ response timing, and may identify a resource of the UL control channel based on the PRI. The HARQ response codebook may include all HARQ response(s) transmitted in the UL (sub)slot indicated by the DCI.

The terminal may encode the HARQ response codebook using the PRI included in the last received DCI, and may map a codeword to the resource of the UL control channel. When the UL control channels indicated by the PRIs included in the respective DCIs do not overlap in the time domain, the HARQ responses associated with the corresponding UL control channels may be multiplexed in the same HARQ response codebook if the first symbols of the UL control channels belong to the same UL (sub)slot.

When the size of the HARQ response codebook is dynamically indicated (e.g., when a codebook type 2 defined in the 3GPP technical specification is used), the HARQ response codebook may be generated in units of sub-slots.

The DCI may include resources of a DL data channel, a slot offset or sub-slot offset (e.g., HARQ response timing) for feedback of an HARQ response for the DL data channel, and a PRI. Also, the DCI may include at least one DAI. The DAI may be classified into a counter DAI and a total DAI.

The terminal may identify a UL (sub)slot in which the UL control channel is to be transmitted based on the HARQ response timing, and may identify a resource of the UL control channel based on the PRI. The HARQ response codebook may include HARQ response(s) for DL data channels indicated by the DAI among HARQ responses that can be transmitted in the UL (sub)slot indicated by the DCI. The DAI may be defined for each UL (sub)slot.

The terminal may encode the HARQ response codebook using the PRI included in the last received DCI, and may map a codeword to the resource of the UL control channel. When the UL control channels indicated by the PRIs included in the respective DCIs do not overlap in the time domain, the HARQ responses associated with the corresponding UL control channels may be multiplexed in the same HARQ response codebook if the first symbols of the UL control channels belong to the same UL (sub)slot.

In a proposed method, the base station may inform the terminal of the number of valid sets of DL data channel candidates, and the terminal may derive the valid DL data channel candidates based on the number of valid sets.

In a proposed method, the base station may inform the terminal of the number of sets of DL data channels belonging to one slot using higher layer signaling, a MAC CE, and/or a DCI. Some indexes in a TDRA table configured by higher layer signaling may not be valid depending on a slot format. This is because the DL data channel candidate (e.g., TDRA) may include an UL symbol. The invalid TDRA indexes may be excluded from the set. The terminal may identify a set(s) of valid TDRA indexes, and the number of set(s) of valid TDRA indexes may be indicated by higher layer signaling.

The valid TDRA indexes may have a specific order. The valid TDRA indexes may be located in the specific order within the set. When the number of set(s) including the valid TDRA indexes is L, the terminal may classify M valid TDRA indexes into L sets. Since the valid TDRA index(es) belonging to one set correspond to the same HARQ response codebook, the size of the HARQ response codebook may be determined based on the number of elements belonging to the set. Since the number of elements belonging to the set depends on the number of TDRA indexes, the format of the slot, and the number of sets, the size of the HARQ response codebook may be determined by semi-static signaling.

For example, the set may include $\lfloor M/L \rfloor$ or $\lceil M/L \rceil$ valid TDRA indexes. In this case, the number of the valid TDRA indexes included in the sets may be even. The M set may include $\lfloor M/L \rfloor$ valid TDRA indexes, and the $M-(\lfloor M/L \rfloor \times L)$ sets may include $\lceil M/L \rceil$ valid TDRA indexes. The sets may be sorted in ascending or descending order according to the number of valid TDRA indexes included in the sets.

When the number of valid TDRA indexes belonging to the set is determined, the terminal may configure valid TDRA indexes having the same or similar characteristics to the same set.

In a proposed method, an arrangement order of the HARQ responses for the DL data channels corresponding to the valid TDRA indexes belonging to the set may be determined in ascending or descending order according to the indexes of the first symbols of the corresponding DL data channels in the HARQ response codebook. For example, the terminal may select a DL data channel having the earliest last symbol in the time domain among the DL data channels corresponding to the valid TDRA indexes belonging to the set, and may sequentially map HARQ response(s) for DL data channel(s) having a start symbol earlier than the last symbol of the selected DL data channel within the HARQ response codebook.

Figure 13:
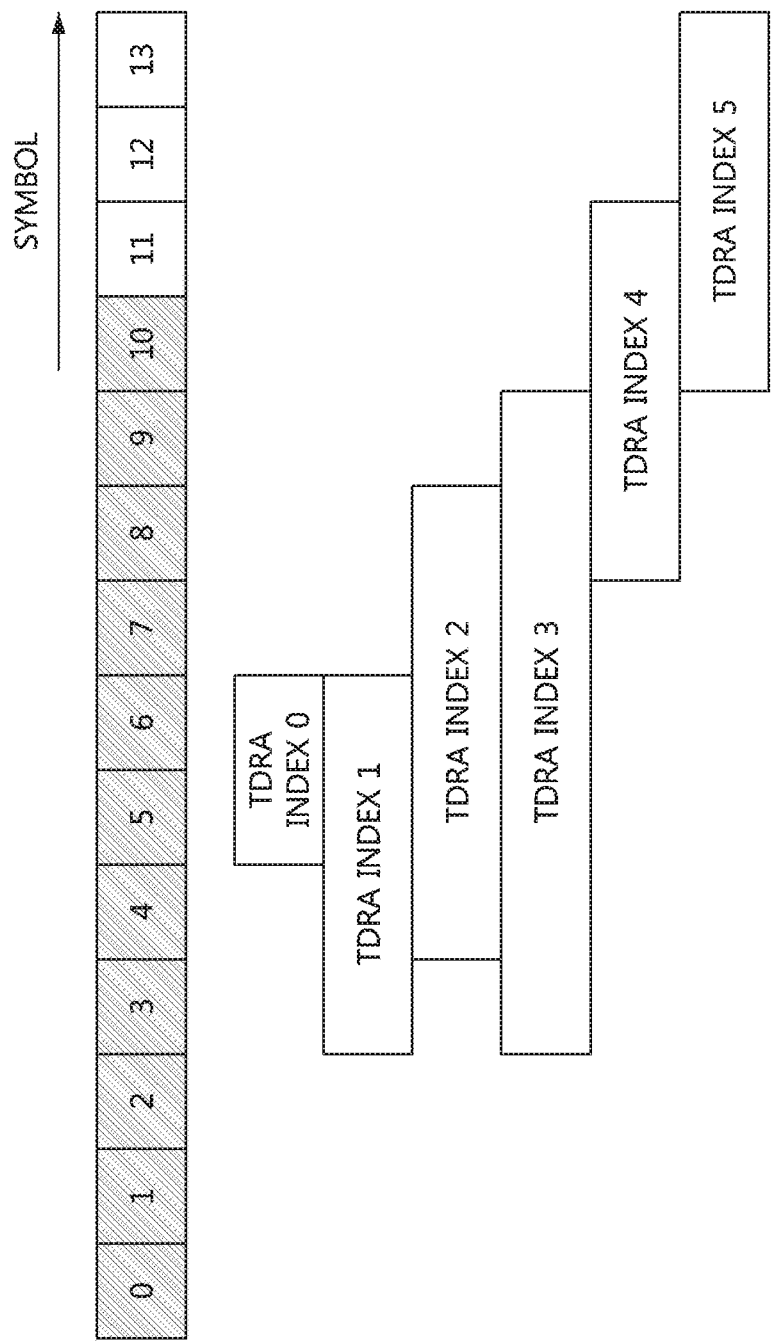
FIG. 13 is a conceptual diagram illustrating a first exemplary embodiment of a set including valid TDRA indexes in a communication system.

FIG. 13 is a conceptual diagram illustrating a first exemplary embodiment of a set including valid TDRA indexes in a communication system.

Referring to FIG. 13, since resources according to TDRA indexes 4 and 5 include UL symbols, TDRA indexes 4 and 5 may not be valid. When L (e.g., the number of sets) is 3, the first set may include TDRA indexes 1 and 0, the second set may include TDRA index 3, and the third set may include TDRA index 2. Alternatively, the first set may include TDRA index 1, the second set may include TDRA index 0, and the third set may include TDRA indexes 2 and 3.

In a proposed method, the HARQ response for the DL data channel having the last symbol preceding in time among the last symbols of the DL data channels corresponding to the valid TDRA indexes included in the set may be located first in the HARQ response codebook. For example, if the last symbol of a DL data channel n is located earlier than the last symbol of a DL data channel p in the time domain, the HARQ response for the DL data channel n may be located earlier than the HARQ response for the DL data channel p within the HARQ response codebook. n and p may be different natural numbers.

For example, the terminal may select a DL data channel having the earliest last symbol in the time domain among the DL data channels corresponding to the valid TDRA indexes belonging to the set, and may configure the valid TDRA indexes corresponding to L DL data channels from the last symbol of the selected DL data channel to the same set. When the number of DL data channels having the earliest last symbol is two or more, a DL data channel having the earliest first symbol in the time domain among the first symbols of the corresponding DL data channels may be included in the set.

According to the slot format, TDRA indexes 4 and 5 may not be valid. When L=3, the first set may include TDRA indexes 1 and 0, the second set may include TDRA index 2, and the third set may include TDRA index 3. Alternatively, the first set may include TDRA index 1, the second set may include TDRA index 0, and the third set may include TDRA indexes 2 and 3.

In the communication system supporting the URLLC service, the DL data channels may be configured not to overlap in the time domain. In this case, some TDRA indexes may not be valid. The invalid TDRA indexes may be excluded from the classification procedure of DL data channel candidates. Therefore, the number of sets including valid TDRA indexes may be reduced.

In a proposed method, the base station may inform the terminal of a BWP(s) for deriving the boundary of the sub-slot.

The number of sub-slots constituting one slot and the number of symbols included in each sub-slot may correspond to a different time duration according to the BWP. The time duration may be a time required for the terminal to decode the DL data channel and transmit the UL control channel. The length of the sub-slot may be defined by the number of symbols, and the sub-slot may be associated with the time duration.

In a proposed method, sub-slots may be defined within a reference BWP. Since an operating state (e.g., active or inactive) of the BWP to which the UL control channel belongs may be dynamically changed, a process of converting a sub-slot defined in the reference BWP into a sub-slot to be defined within an active BWP may be performed. The reference BWP for configuring the sub-slot may be a BWP having a specific index among BWPs configured in the terminal. For example, a BWP with an index 0 may be considered as the reference BWP. The base station may inform the terminal only of sub-slots associated with one BWP. The configuration of sub-slots associated with one BWP may be applied to all BWPs. Therefore, the amount of signaling of configuration information of the sub-slots associated with the BWP may be reduced.

In a proposed method, sub-slots may be defined within all BWPs. The base station may configure a plurality of BWPs in a carrier to the terminal, and may independently configure the boundary of the sub-slot in each of the plurality of BWPs. In this case, the boundary of the sub-slot may be flexibly indicated in all BWPs.

In a proposed method, a pattern of the sub-slot (e.g., the number of symbols included in the sub-slot) may be configured uniformly. In this case, the pattern of the sub-slot may be configured as follows.

Figure 14:
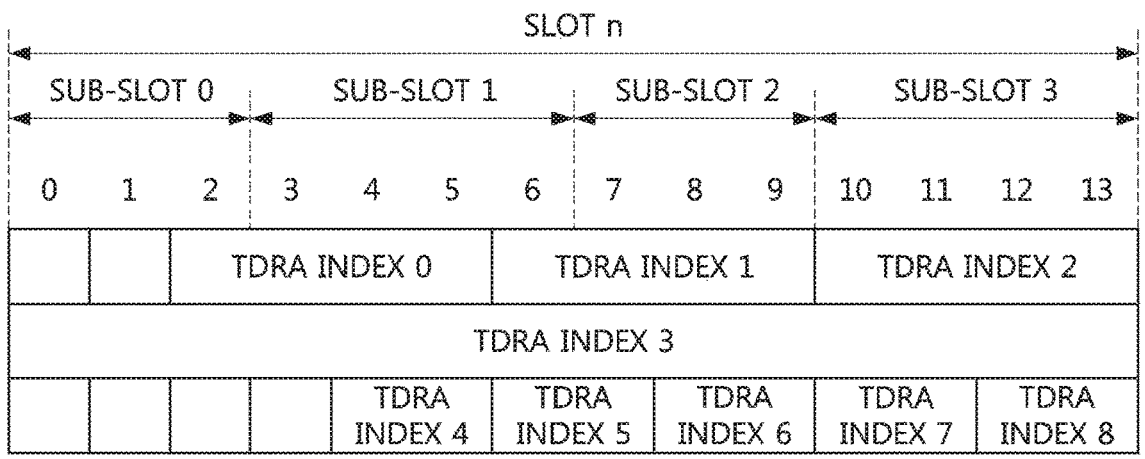
FIG. 14 is a conceptual diagram illustrating a first exemplary embodiment of a sub-slot pattern in a communication system.

FIG. 14 is a conceptual diagram illustrating a first exemplary embodiment of a sub-slot pattern in a communication system.

Referring to FIG. 14, one slot may include 14 symbols, and one slot may be divided into four sub-slots. Each of the sub-slots 0 and 2 may include three symbols, and each of the sub-slots 1 and 3 may include four symbols. The base station may inform the terminal of DL data channel candidates (e.g., TDRAs) using higher layer signaling. The number of the DL data channel candidates configured by higher layer signaling may be 9, and the base station may transmit DCI including a TDRA index indicating one DL data channel candidate among the 9 DL data channel candidates.

A sub-slot to which the last symbol of the DL data channel candidate belongs may be a sub-slot to which the corresponding DL data channel candidate belongs. In this case, a DL data channel candidate belonging to the sub-slot 0 may not exist. The sub-slot 1 may include TDRA indexes 0 and 4, the sub-slot 2 may include TDRA indexes 1, 5, and 6, and the sub-slot 3 may include TDRA indexes 2, 3, 7, and 8. When a sub-slot pattern is defined without distribution of TDRA indexes, the sizes of sets of TDRA indexes may not be uniform. That is, since the number of bits of the UCI transmitted through the UL control channel is not uniform, a reception quality of the UCI may be different at the base station. Therefore, it is preferable to configure the boundary of the sub-slot in consideration of the distribution of the TDRA indexes. Alternatively, it is preferable to directly configure DL data channels as a set.

Figure 15:
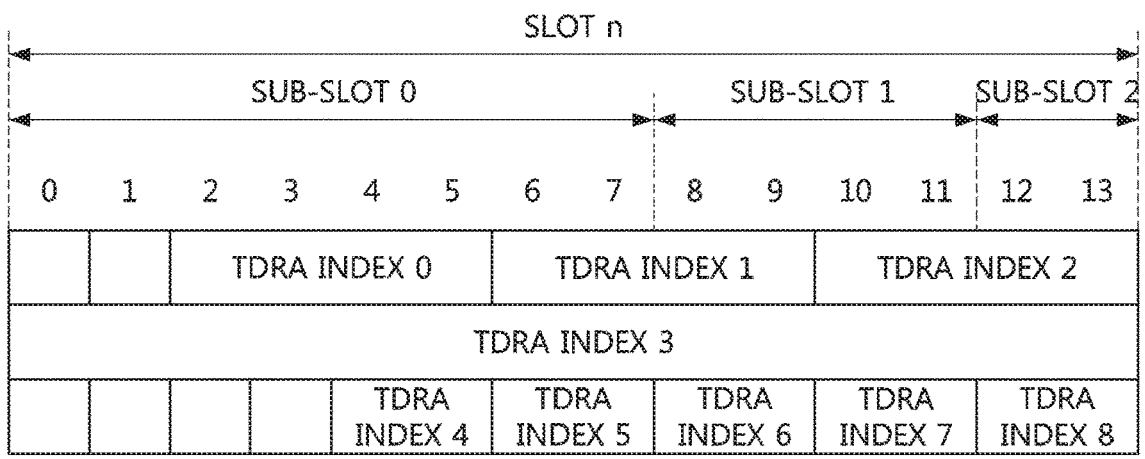
FIG. 15 is a conceptual diagram illustrating a second exemplary embodiment of a sub-slot pattern in a communication system.

FIG. 15 is a conceptual diagram illustrating a second exemplary embodiment of a sub-slot pattern in a communication system.

Referring to FIG. 15, sub-slot patterns may be configured not to be uniform. One slot may include 14 symbols, and one slot may be divided into three sub-slots. The number of TDRA indexes included in each of the sub-slots may be the same. The sub-slot 0 may include TDRA indexes 0, 4, and 5, the sub-slot 1 may include TDRA indexes 1, 6, and 7, and the sub-slot 2 may include TDRA indexes 2, 3, and 8. In this case, each of the sub-slots may include three TDRA indexes.

The HARQ responses for the DL data channels belonging to the same sub-slot may be mapped to the same UL control channel. For example, the base station may inform the terminal of L (e.g., the number of sets) and TDRA indexes (e.g., DL data channel candidates) using higher layer signaling. The base station may configure the number of TDRA indexes (e.g., the number of DL data channel candidates) to be a multiple of L. The terminal may divide a slot into L sub-slots, and configure boundaries of the sub-slots such that the number of TDRA indexes included in each of the L sub-slots is the same. The boundaries of the sub-slots may not be uniquely divided, but the sets including the TDRA indexes may be uniquely determined.

The base station may inform the terminal of the non-uniform sub-slot patterns using higher layer signaling. The sub-slot may be composed of consecutive symbols, and one slot may be divided into two or more sub-slots. The lengths of the sub-slots may be configured to be the same or different. In the following, a method for configuring the boundaries of the L sub-slots when the number of (FL symbols+UL symbols) included in the slot is N or when the number of (FL symbols+DL symbols) included in the slot is N will be described.

In a proposed method, the numbers of symbols included in the remaining sub-slots except the first sub-slot in one slot may be the same. The number of symbols included in the first sub-slot may be greater than the numbers of symbols included in the other sub-slots. For example, a sub-slot n may include $\lfloor N/L \rfloor$ symbols. Here, n may be a natural number of 2 or more and L or less. The sub-slot 1 may include $N-(L-1)\times\lfloor N/L \rfloor$ symbols. A case where N=14 and L=4 may correspond to an index 5 of Tables 2 and 3.

In Table 2, a sub-slot pattern may be defined based on a start symbol of the sub-slot, and in Table 3, a sub-slot pattern may be defined based on the number of symbols included in the sub-slot. In Table 2, $S_1$ may indicate a start symbol index of the sub-slot 1, $S_2$ may indicate a start symbol index of the sub-slot 2, $S_3$ may indicate a start symbol index of the sub-slot 3, and $S_4$ may indicate a start symbol index of the sub-slot 4. In Table 3, $L_1$ may indicate the number of symbols included in sub-slot 1, $L_2$ may indicate the number of symbols included in the sub-slot 2, $L_3$ indicates the number of symbols included in the sub-slot 3, and $L_4$ may indicate the number of symbols included in the sub-slot 4.

TABLE 2

| Index | Number (L) | $S_1$ | $S_2$ | $S_3$ | $S_4$ | ... |
|---|---|---|---|---|---|---|
| 1 | 2 | 0 | 7 | N/A | N/A | N/A |
| 2 | 4 | 0 | 3 | 6 | 11 | N/A |
| 3 | 4 | 0 | 4 | 8 | 11 | N/A |
| 4 | 4 | 0 | 3 | 7 | 10 | N/A |
| 5 | 4 | 0 | 5 | 8 | 11 | N/A |
| 6 | 4 | 0 | 4 | 7 | 11 | N/A |
| 7 | 7 | 0 | 2 | 4 | 6 | ... |
| ... | ... | ... | ... | ... | ... | ... |

TABLE 3

| Index | Number (L) | $L_1$ | $L_2$ | $L_3$ | $L_4$ | ... |
|---|---|---|---|---|---|---|
| 1 | 2 | 7 | 7 | N/A | N/A | N/A |
| 2 | 4 | 3 | 3 | 4 | 4 | N/A |
| 3 | 4 | 4 | 4 | 3 | 3 | N/A |
| 4 | 4 | 3 | 4 | 3 | 4 | N/A |
| 5 | 4 | 5 | 3 | 3 | 3 | N/A |
| 6 | 4 | 4 | 3 | 4 | 3 | N/A |
| 7 | 7 | 2 | 2 | 2 | 2 | ... |
| ... | ... | ... | ... | ... | ... | ... |

In a proposed method, the numbers of symbols included in the remaining sub-slots except the last sub-slot in one slot may be the same. The number of symbols included in the last sub-slot may be greater than the number of symbols included in the other sub-slot. For example, a sub-slot n may include $\lfloor N/L \rfloor$ symbols. Here, n may be a natural number equal to or greater than 1 and equal to or less than L-1. A sub-slot L may include $N-(L-1)\times\lfloor N/L \rfloor$ symbols.

In a proposed method, the above exemplary embodiment may be applied when a half slot (e.g., a half of a slot) is used.

The numbers of symbols included in the two sub-slots among the sub-slots may be greater than the numbers of symbols included in the remaining sub-slots. In this case, the sub-slots may be the last sub-slot in the first half slot and the last sub-slot in the second half slot. This exemplary embodiment may be well applied when the number L of sub-slots is even. For example, to divide N into L sub-slots (e.g., even sub-slots), a sub-slot n may include $\lfloor N/L \rfloor$ symbols. Here, n may be one of 2, . . . , L/2−2, L/2+1, . . . , and L−1.

A sum of the number of symbols included in the sub-slot L/2 and the number of symbols included in the sub-slot L may be $N-(L-2)\times \lfloor N/L \rfloor$. The number of symbols included in the sub-slot L/2 may be the same as the number of symbols included in the sub-slot L. Alternatively, the number of symbols included in the sub-slot L/2 may be different from the number of symbols included in the sub slot L. When N=14 and L=4, the index 4 of Tables 2 and 3 may correspond to a case where the number of symbols included in the sub-slot L/2 is the same as the number of symbols included in the sub-slot L.

In a proposed method, some sub-slots may include the same number of symbols, other sub-slots may include the same number of symbols, and a difference between the number of symbols included in each of the some sub-slots and the number of symbols included in each of the other sub-slots may be 1. The number of symbols included in M sub-slots in one slot may be $\lfloor N/L \rfloor$ and the number of symbols included in each of the remaining L-M sub-slots may be $(N-M\times \lfloor N/L \rfloor)/(L-M)$. When N=14 and L=4, if the index 2 or 3 of Tables 2 and 3 are used, each of the sub-slots 1 and 2 may include three symbols, and each of the sub-slots 3 and 4 may include four symbols.

Meanwhile, a method for feeding back an HARQ response without configuring sub-slots may be used. In a proposed method, DL data channel candidates may be configured as a set without configuring sub-slots. For example, the TDRA indexes shown in FIG. 14 or 15 may be divided into L sets. The base station may inform the terminal of L sets including the TDRA indexes using higher layer signaling.

For example, the base station may configure TDRA indexes 0, 4, and 5 to a set 1, configure TDRA indexes 1, 6, and 7 to a set 2, and configure TDRA indexes 2, 3, and 8 to a set 3. The base station may inform the terminal of configuration information of the sets 1 to 3 (e.g., the TDRA index included in each of the sets) using higher layer signaling.

This scheme may be interpreted as configuring a TDRA sub-table from the TDRA table including the TDRA indexes. The terminal may multiplex HARQ responses for TDRA indexes (e.g., DL data channel candidates) belonging to the same set in the same HARQ response codebook, perform an encoding operation on the HARQ response codebook, and map a codeword to the UL control channel.

In a proposed method, a different boundary of sub-slot may be derived according to a slot format.

In a proposed method, all symbols (e.g., 14 symbols) included in the slot may be configured as sub-slots. When the sub-slot is configured regardless of the format of the slot, the signaling operation for informing the pattern of the sub-slot may be simply performed.

For example, in the communication system supporting the FDD scheme, since no DL symbol exists in a slot in which a UL channel is transmitted, all symbols included in the slot may be configured as sub-slots. In the communication system supporting the TDD scheme, all symbols included in the slot may be configured as sub-slots. Among the symbols included in the slot, FL symbols and UL symbols other than DL symbols may be configured as sub-slots. Alternatively, all symbols included in a slot in which a DL channel is transmitted may be configured as sub-slots. Alternatively, FL symbols and DL symbols other than UL symbols among the symbols included in the slot may be configured as sub-slots. The FL symbols may mean all FL symbols belonging to the slot. Alternatively, the FL symbols may mean some FL symbols among successive FL symbols.

In a proposed method, some symbols (e.g., less than 14 symbols) included in the slot may be configured as sub-slots. This exemplary embodiment may be applied to the communication system supporting the TDD scheme. The base station may inform the terminal of a slot pattern using a combination of one or more among higher layer signaling, MAC CE, and DCI. The boundary of the sub-slot may be determined by higher layer signaling. The terminal may determine the symbols included in the sub-slots based on the slot pattern configured by higher layer signaling. The DL symbol(s) included in the slot in which the UL channel is transmitted may not be configured as sub-slots. In this case, less than 14 symbols may be configured as sub-slots. In addition, the UL symbol(s) included in the slot in which the DL channel is transmitted may not be configured as sub-slots. In this case, less than 14 symbols may be configured as sub-slots. The base station may inform the terminal of the number of sub-slots (e.g., L) by using higher layer signaling. In this case, the terminal may classify (FL symbols+UL symbols) or (DL symbols+FL symbols) included in the slot into L sub-slots.

In a proposed method, the FL symbol may belong to a DL sub-slot or a UL sub-slot.

When the slot includes DL symbol, FL symbol, and UL symbol, a method of configuring a DL sub-slot with only DL symbols may be considered to determine a sub-slot pattern. When a DL data channel is assigned by DCI, FL symbols may be configured as a DL sub-slot. When a DL data channel (e.g. SPS PDSCH) is assigned by an RRC message, FL symbols may not be used as a DL sub-slot. When an HARQ response for the DL data channel assigned by the DCI and an HARQ response for the DL data channel assigned by the RRC message are multiplexed in the same HARQ response codebook, the DL sub-slot may be preferably composed of DL symbols and FL symbols.

Figure 16:
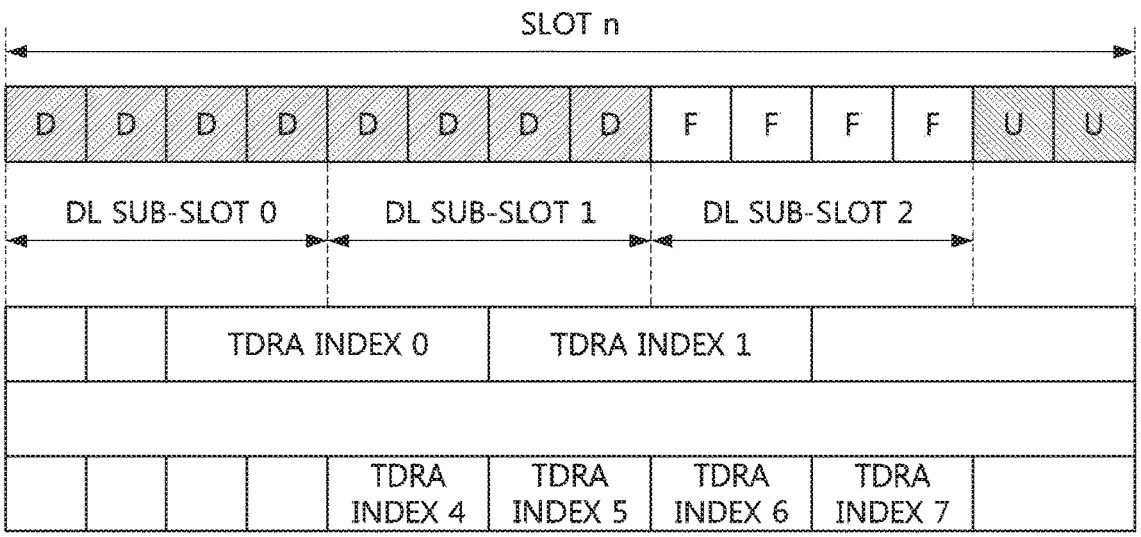
FIG. 16 is a conceptual diagram illustrating a third exemplary embodiment of a sub-slot pattern in a communication system.

FIG. 16 is a conceptual diagram illustrating a third exemplary embodiment of a sub-slot pattern in a communication system.

Referring to FIG. 16, a slot may include eight DL symbols, four FL symbols, and two UL symbols. A DL sub-slot may be composed of DL symbols and FL symbols. A TDRA index may mean a DL data channel candidate. A TDRA table used in the exemplary embodiment shown in FIG. 16 may be the same as the TDRA tables used in the exemplary embodiments shown in FIG. 14 or FIG. 15.

A DL data channel may be assigned to the terminal using TDRA indexes 0, 1, 4, 5, 6, and/or 7. A TDRA index corresponding to the DL sub-slot 0 may not exist, the DL sub-slot 1 may include TDRA indexes 0, 4, and 5, and the DL sub-slot 2 may include TDRA indexes 1, 6, and 7. When an HARQ response codebook with a semi-static size is used, three HARQ responses may be generated if the DL data channel belongs to the DL sub-slot 1, and three HARQ responses may be generated if the DL data channel belongs to the DL sub-slot 2.

In the communication system supporting the TDD scheme, a DL duration and a UL duration may be divided by FL symbol(s). There may be an FL symbol to which data is not allocated in consideration of a delay arrival time. In this case, since the base station should not assign the DL data channel having the corresponding FL symbol to the terminal, the DL data channel having the semi-static size may be configured without the corresponding FL symbol.

In a proposed method, the serving base station may inform the terminal of the type of the FL symbol using higher layer signaling. An FL symbol having a type A may be included in a DL sub-slot, and an FL symbol having a type B (e.g., FL symbol to which no data is allocated) may not be included in a DL sub-slot. In the time domain, the FL symbol having type A may be contiguous with the FL symbol having type B. In this case, the types of FL symbols located before a specific timing may be different from the types of FL symbols located after the specific timing, and the FL symbols located before the specific timing may be distinguished from the FL symbols located after the specific timing. The FL symbols having type B located before or after the specific timing may not be included in the DL sub-slot. The FL symbols having type B may be configured as a guard period or a UL transmission period.

Figure 17:
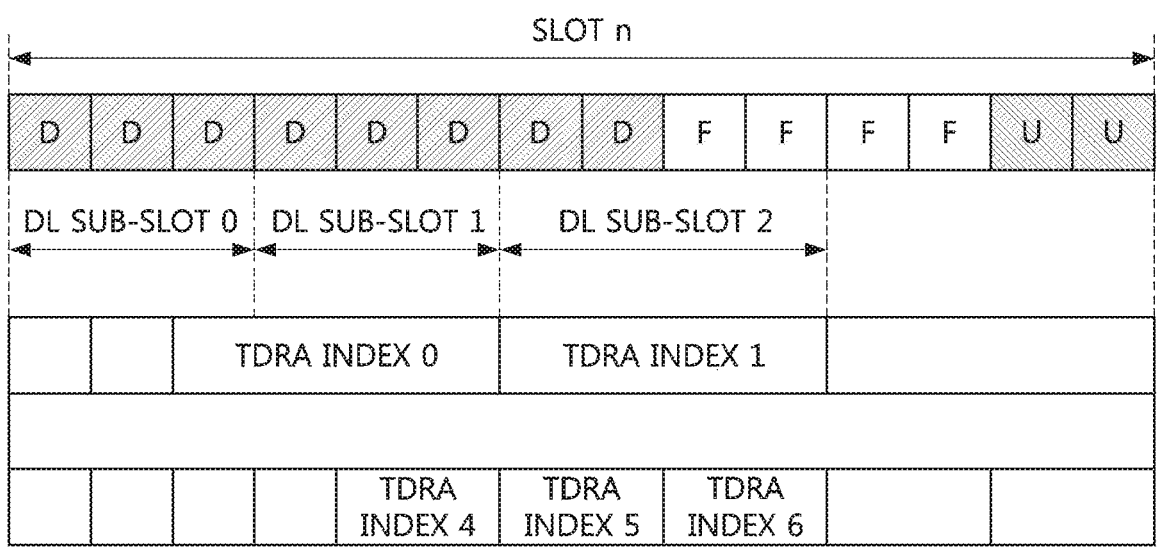
FIG. 17 is a conceptual diagram illustrating a fourth exemplary embodiment of a sub-slot pattern in a communication system.

FIG. 17 is a conceptual diagram illustrating a fourth exemplary embodiment of a sub-slot pattern in a communication system.

Referring to FIG. 17, a slot may include eight DL symbols, four FL symbols, and two UL symbols. Two consecutive FL symbols located after the DL symbols may be FL symbols having type A, and two consecutive FL symbols located before the UL symbols may be FL symbols having type B. Ten symbols included in the slot (e.g., eight DL symbols and two FL symbols) may be used to configure three DL sub-slots. Each of the DL sub-slots 0 and 1 may include three symbols, and the DL sub-slot 2 may include four symbols.

The TDRA index corresponding to the DL sub-slot 0 may not exist, the DL sub-slot 1 may include TDRA indexes 0 and 4, and the DL sub-slot 2 may include TDRA indexes 1, 5, and 6. When the patterns of DL sub-slots are configured differently (e.g., when the DL sub-slot 0 is not configured), two DL sub-slots may be configured, one DL sub-slot may correspond to two TDRA indexes, and the remaining DL sub-slot may correspond to three TDRA indexes.

In a proposed method, FL symbol(s) may belong to both a DL sub-slot and a UL sub-slot.

The FL symbol(s) belonging to the slot may be included in only a DL sub-slot, only a UL sub-slot, or both the DL and UL sub-slots. A DL data channel and a UL control channel assigned by DCI may be transmitted through the FL symbols. When the size of an HARQ response codebook is determined by an RRC message, one or more FL symbols may be included in a DL sub-slot and/or a UL sub-slot.

When one or more FL symbols are included in only a DL sub-slot or only a UL sub-slot, the base station may inform the terminal of configuring information of FL symbols constituting the DL sub-slot (e.g., an index of an FL symbol located at a boundary of the DL sub-slot, an index of an FL symbol that is not included in the DL sub-slot) and/or configuration information of FL symbols constituting the UL sub-slot (e.g., an index of an FL symbol located at a boundary of the UL sub-slot, an index of an FL symbol that is not included in the UL sub-slot).

Figure 18:
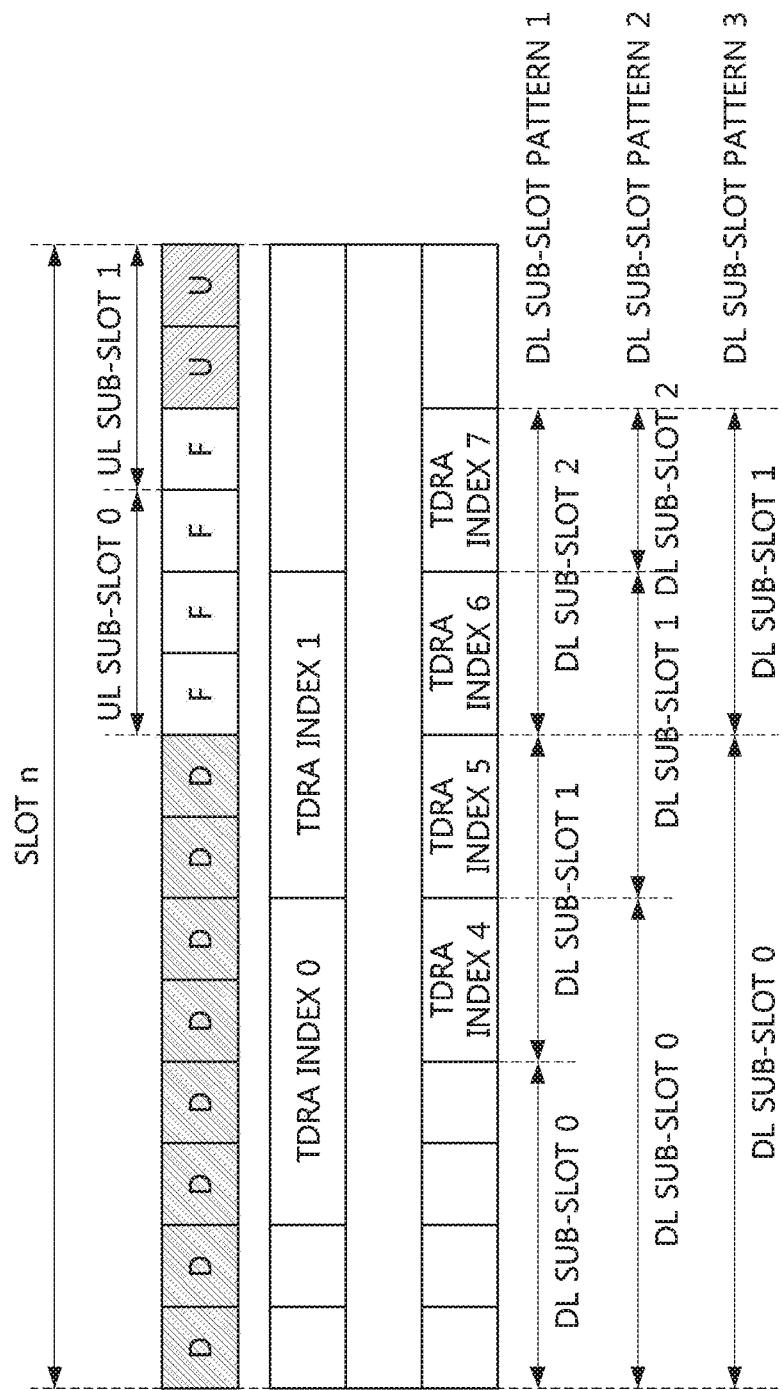
FIG. 18 is a conceptual diagram illustrating a fifth exemplary embodiment of a sub-slot pattern in a communication system.

FIG. 18 is a conceptual diagram illustrating a fifth exemplary embodiment of a sub-slot pattern in a communication system.

Referring to FIG. 18, a slot may include eight DL symbols, four FL symbols, and two UL symbols. Four FL symbols may be included in a DL sub-slot and a UL sub-slot. Twelve or fewer symbols may be used to configure DL sub-slots.

When a DL sub-slot pattern 1 is used, the DL sub-slot 0 may include four symbols, the DL sub-slot 1 may include four symbols, and the DL sub-slot 2 may include four symbols. When a DL sub-slot pattern 2 is used, the DL sub-slot 0 may include six symbols, the DL sub-slot 1 may include four symbols, and the DL sub-slot 2 may include two symbols. When a DL sub-slot pattern 3 is used, the DL sub-slot 0 may include eight symbols and the DL sub-slot 1 may include four symbols.

A DL data channel candidate corresponding to TDRA index 7 may not be allocated to secure a UL-DL switching time in a slot n. The DL data channel candidate corresponding to TDRA index 7 may be considered when configuring a DL sub-slot pattern. Six or fewer symbols may be used to configure a UL sub-slot. The UL sub-slot 0 may include three symbols, and the UL sub-slot 1 may include three symbols.

Figure 19:
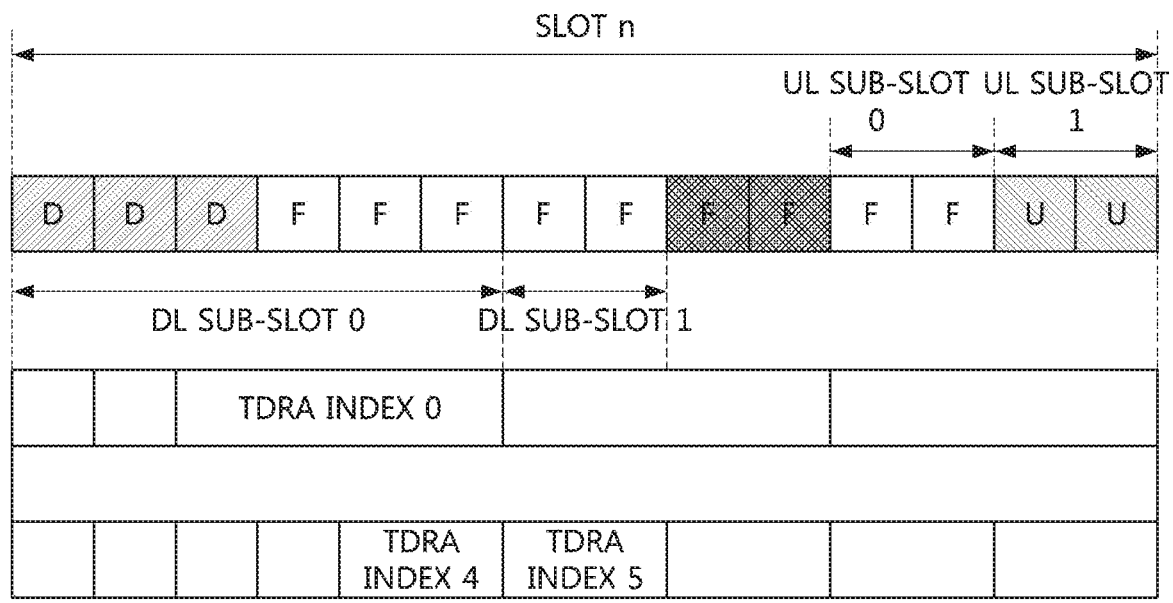
FIG. 19 is a conceptual diagram illustrating a sixth exemplary embodiment of a sub-slot pattern in a communication system.

FIG. 19 is a conceptual diagram illustrating a sixth exemplary embodiment of a sub-slot pattern in a communication system.

Referring to FIG. 19, a slot may include three DL symbols, nine FL symbols, and two UL symbols. The base station may inform the terminal of configuration information of FL symbols used for DL sub-slots and configuration information of FL symbols used for UL sub-slots using higher layer signaling. Consecutive five FL symbols after the DL symbols may be used to configure DL sub-slots. Accordingly, eight symbols may be used to configure DL sub-slots. Consecutive two FL symbols before the UL symbols may be used to configure UL sub-slots. Accordingly, four symbols may be used to configure UL sub-slots. DL data channel candidates belonging to the DL sub-slots may be considered valid.

In a proposed method, boundaries of sub-slots may be derived based on the number of sub-slots or the sub-slot pattern.

In a proposed method, the base station may transmit information indicating the boundaries of the sub-slots to the terminal through a combination of one or more among higher layer signaling, MAC CE, and DCI. When L sub-slots (e.g., sub-slots 1 to L) are configured in one slot, since the sub-slot 1 is configured in the first symbol (e.g. symbol 0, the first symbol other than the DL symbols, or an arbitrary symbol of the FL symbols) of the slot, a signaling operation indicating the sub-slot 1 may be unnecessary. The signaling operation of a start symbol index of the sub-slots 2 to L may be necessary.

For example, the base station may inform the terminal of $(S_1, S_2, \ldots, S_L)$ or $(S_1, S_2, \ldots, S_{L-1})$. Alternatively, the base station may inform the terminal of $(L, S_1, S_2, \ldots, S_L)$ or $(L, S_1, S_2, \ldots, S_{L-1})$. Alternatively, the base station may inform the terminal of end symbol indexes of the sub-slots. Alternatively, the base station may inform the terminal of the lengths of the sub-slots (e.g., the numbers of symbols included in the sub-slots). In the above exemplary embodiments, L−1 or more symbol indexes may be signaled from the base station to the terminal.

Meanwhile, the complexity of implementation may be increased at the base station and the terminal by the signaling operations of the L−1 or L symbol indexes. In a proposed method, the sub-slot patterns may be indicated in form of indexes. When the sub-slot patterns are predefined, the base station may transmit an index of the sub-slot pattern to the terminal through a combination of one or more among higher layer signaling, MAC CE, and DCI. The index of the sub-slot pattern may indicate the number of sub-slots included in the slot, the numbers of symbols included in the sub-slots, and/or the boundaries of the sub-slots. Even when the number of sub-slots included in the slot is the same, if the numbers of symbols included in the sub-slots are different, the arrangement of the sub-slots within the slot may be different.

For example, in Table 2, a sub-slot pattern may be defined based on a start symbol of the sub-slot, and in Table 3, a sub-slot pattern may be defined based on the number of symbols included in the sub-slot. In Table 3, when the number of (FL symbols+UL symbols) included in the slot is less than 14, the number of sub-slots may be counted from an end of the slot toward a start of the slot. In this case, the start symbol of the sub-slot 1 may not be the symbol 0 of the slot.

In Table 3, when the number of (DL symbols+FL symbols) included in the slot is less than 14, the number of sub-slots may be counted from the start of the slot toward the end of the slot. In this case, the end symbol of the sub-slot L may not be the symbol 13 of the slot. Even when the number of sub-slots is the same in Tables 2 and 3, the number of symbols included in each of the sub-slots may be different. The base station may inform the terminal of the index of the sub-slot pattern to reduce the signaling overhead of the sub-slot pattern.

In Tables 2 and 3, the indexes 2, 3, and 4 may indicate different sub-slot patterns. In the sub-slot pattern indicated by the index 2, the numbers of symbols included in sub-slots 3 and 4 may be greater than the numbers of symbols included in other sub-slots. In this case, the number of DL data channel candidates to be mapped to the sub-slots 3 and 4 may be larger than the number of DL data channel candidates to be mapped to the sub-slots 1 and 2. The number of HARQ responses in the sub-slots 3 and 4 may be greater than the number of HARQ responses in the sub-slots 1 and 2, and if the UL control channels use the same bandwidth, the length of the UL control channel corresponding to the sub-slots 3 and 4 may be longer than the length of the UL control channel corresponding to the sub-slots 1 and 2.

In the sub-slot pattern indicated by the index 3 of Table 2 and Table 3, the numbers of symbols included in the sub-slots 1 and 2 may be larger than the numbers of symbols included in other sub-slots. In this case, the number of DL data channel candidates to be mapped to the sub-slots 1 and 2 may be larger than the number of DL data channel candidates to be mapped to the sub-slots 3 and 4. A time required for feedback of an HARQ response in the sub-slots 3 and 4 may be secured.

In the sub-slot pattern indicated by the index 4 of Tables 2 and 3, the numbers of symbols included in the sub-slots 2 and 4 may be greater than the numbers of symbols included in other sub-slots. In this case, the sub-slot pattern may have a symmetrical characteristic. When a subcarrier spacing (e.g., 15 kHz or 30 kHz) of the DL data channel is different from a subcarrier spacing (e.g., 30 kHz or 60 kHz) of the UL control channel, in order to indicate a time unit for feeding back an HARQ response, it is preferable that the boundary of the sub-slot belongs to the boundary of the symbol.

In addition to the subcarrier spacing, the number of symbols included in the slot may vary according to the type of a cyclic prefix (e.g., a normal CP or an extended CP). When the normal CP is used, the number of symbols included in the slot may be fourteen. When the extended CP is used, the number of symbols included in the slot may be twelve. In this case, the corresponding sub-slot pattern may be derived from the sub-slot pattern for the reference BWP. Alternatively, indexes indicating sub-slot patterns to which the extended CP is applied may be further defined.

In the sub-slot pattern indicated by the index 5 of Tables 2 and 3, the number of symbols included in the sub-slot 1 may be greater than the numbers of symbols included in other sub-slots. In this case, in the procedure of assigning DL data channels, the processing time of the terminal may be secured based on the last symbol of the DL data channel and the start symbol of the UL control channel for feedback of the HARQ response for the DL data channel.

The last symbol of the TDRA may typically be located in a back region rather than a front region of the slot. In this case, the number of DL data channels corresponding to the sub-slot for the feedback of the HARQ response may be large in the sub-slot located in the back region of the slot. In this case, the size (e.g., number of bits) of the HARQ response included in the UL control channel may be asymmetric, and the reception quality of the HARQ response at the base station may vary depending on the TDRA. To solve this problem, the number of symbols belonging to the sub-slot 1 may be increased. Alternatively, the length of symbols belonging to the sub-slot 1 may be increased.

In the sub-slot pattern indicated by the index 6 of Tables 2 and 3, four sub-slots may be configured in one slot. $(L_1+L_2)$ may be the same as $(L_3+L_4)$. That is, each of $(L_1+L_2)$ and $(L_3+L_4)$ may be seven. This is because BWPs with different subcarrier spacing (e.g., BWP with 15 kHz subcarrier spacing and BWP with 30 kHz subcarrier spacing, or BWP with 30 kHz subcarrier spacing and BWP with 60 kHz subcarrier spacing) may be multiplexed in the frequency domain or time domain. The boundary of the sub-slot(s) may be configured to be the boundary of half of the slot.

In the sub-slot pattern indicated by the index 7 of Table 2 and Table 3, seven sub-slots may be configured in one slot. Each of the seven sub-slots may include two symbols.

In a proposed method, a DL sub-slot pattern may be configured to be equal to a UL sub-slot pattern. Alternatively, the DL sub-slot pattern may be configured independently of the UL sub-slot pattern. For example, the DL sub-slot pattern may be different from the UL sub-slot pattern.

Figure 20:
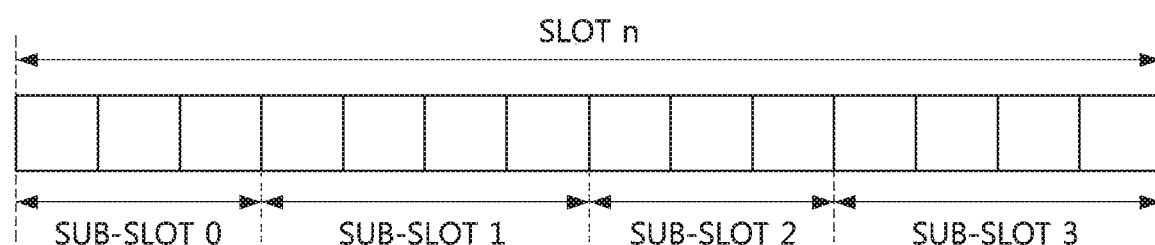
FIG. 20 is a conceptual diagram illustrating a seventh exemplary embodiment of a sub-slot pattern in a communication system.

FIG. 20 is a conceptual diagram illustrating a seventh exemplary embodiment of a sub-slot pattern in a communication system.

Referring to FIG. 20, a sub-slot pattern may be defined, a DL sub-slot comprising DL symbols and FL symbols may be configured based on a sub-slot pattern, and a UL sub-slot comprising UL symbols and FL symbols may be configured based on a sub-slot pattern. If a sub-slot pattern according to the numerology of the reference BWP is defined, the sub-slot pattern may be applied to both the DL sub-slot and the UL sub-slot.

For example, a slot n may include four sub-slots. The base station may inform the terminal of the sub-slot pattern through a combination of one or more among higher layer signaling, MAC CE, and DCI, regardless of transmission of a DL data channel or transmission of a UL control channel. The sub-slot pattern may be applied to the communication system supporting the FDD scheme. The DL sub-slot pattern applied to the DL slot may be the same as the UL sub-slot pattern applied to the UL slot. This pattern may be preferably applicable in systems operating in the FDD scheme.

That is, the pattern of the DL sub-slot applied to the DL slot may be the same as the pattern of the UL sub-slot applied to the UL slot.

However, in the communication system supporting the TDD scheme, the DL sub-slot pattern applied to the DL data channel may be configured differently from the UL sub-slot pattern applied to the UL control channel. This is because DL data channel candidates and UL control channel candidates may be valid only in a specific sub-slot. If an HARQ response codebook with a semi-static size is used, the size of the HARQ response codebook may not be uniform according to the number of TDRA indexes, the slot offset (or, sub-slot offset) of the HARQ response, and the format of the slot to which the DL data channel is allocated.

In a proposed method, the slot offset (or, sub-slot offset) for the HARQ response may be calculated based on the last UL sub-slot among UL sub-slots located at the same timing as the DL sub-slot to which the DL data channel belongs. The base station may inform the terminal of the slot offset (or, sub-slot offset) for the HARQ response through a combination of one or more among higher layer signaling, MAC CE, and DCI.

Referring back to FIG. 18, FL symbols may be included in a DL sub-slot and/or a UL sub-slot. A specific DL data channel (e.g., DL data channel corresponding to TDRA index 7) may belong to the DL sub-slot 2, and a timing (e.g., start timing) of the DL sub-slot 2 is the same as a timing (e.g., start timing) of the UL sub-slot 0. When the slot includes a large number of FL symbols, some DL sub-slots may be located after the UL sub-slot. In this case, a reference sub-slot for calculating a slot offset (or sub-slot offset) for an HARQ response may be needed.

Figure 21:
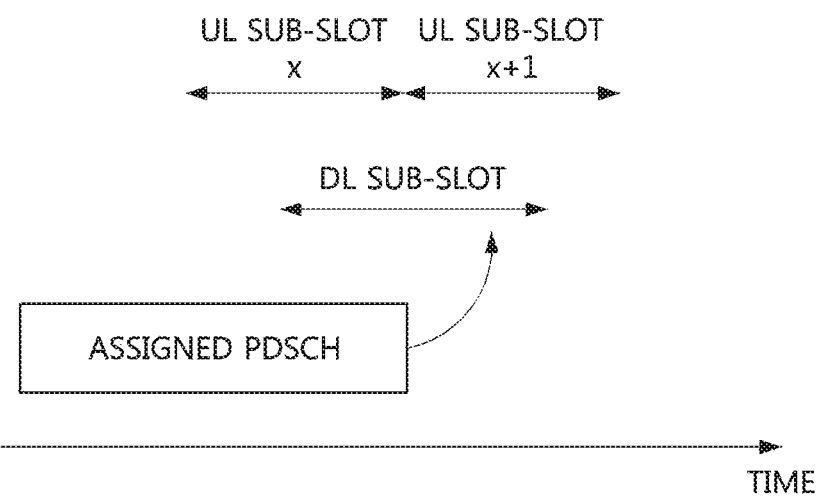
FIG. 21 is a conceptual diagram illustrating an eighth exemplary embodiment of a sub-slot pattern in a communication system.

FIG. 21 is a conceptual diagram illustrating an eighth exemplary embodiment of a sub-slot pattern in a communication system.

Referring to FIG. 21, a reference DL sub-slot may be a DL sub-slot to which a DL data channel is assigned, and a reference UL sub-slot may be derived from the reference DL sub-slot. When the length of the DL sub-slot is different from the length of the UL sub-slot or when the start timing of the DL sub-slot is different from the start timing of the UL sub-slot, the reference DL sub-slot may correspond to a plurality of UL sub-slots. In this case, a slot offset (or sub-slot offset) for an HARQ response may be determined based on the last UL sub-slot among the plurality of UL sub-slots. The time resource for feedback of the HARQ response to the PDSCH may be determined based on the UL sub-slot x+1. That is, the UL sub-slot x+1 may be the reference UL sub-slot. When the slot offset or sub-slot offset configured by the base station is K, the terminal may transmit a UL control channel or a UL data channel including the HARQ response in the UL sub-slot x+1+K.

When one sub-slot pattern is configured without distinguishing the DL sub-slot and the UL sub-slot, the time resource for feedback of the HARQ response may be derived based on the sub-slot to which the DL data channel belongs.

In a proposed method, a UCI piggyback timing may be limited to a portion or instance of a PUSCH.

An HARQ response codebook may correspond one-to-one with a resource of one PUCCH. The priority of the HARQ response codebook may be the same as the priority of the PDSCH. The HARQ response codebook may be generated in consideration of PDSCHs having the same priority. For example, if the PDSCH is dynamically assigned and the HARQ response codebook for the URLLC PDSCH (or eMBB PDSCH) is transmitted on the PUSCH or the PUCCH, the priority of the HARQ response codebook (or PDSCH) may be considered as the priority of URLLC (or eMBB). The URLLC PDSCH may be a PDSCH transmitted according to the requirements of the URLLC service, and the eMBB PDSCH may be a PDSCH transmitted according to the requirements of the eMBB service.

When a feedback resource of the HARQ response (e.g., URLLC PUCCH) for the URLLC PDSCH overlaps with the URLLC PUSCH in the time domain, the HARQ response may be transmitted as multiplexed with the URLLC PUSCH. When the URLLC PUCCH is configured in a sub-slot and the URLLC PUSCH is configured in a time duration longer than the sub-slot, the URLLC PUSCH may overlap two or more URLLC PUCCHs. When the HARQ response codebook is generated on a slot basis, if the PUSCH overlaps with one PUCCH in the time domain, the UCI may be multiplexed in the PUSCH. This method may not be applied when the HARQ response codebook is generated on a sub-slot basis.

In a proposed method, HARQ response codebooks corresponding to two or more sub-slots may be concatenated in order of the sub-slots (e.g., the order of the PDSCHs associated with the HARQ response codebook or the order of the PDCCHs scheduling the PDSCHs associated with the HARQ response codebook), and the concatenated HARQ response codebooks may be an HARQ response bit string. The HARQ response bit string may be mapped to the PUSCH.

Here, the PDSCHs associated with the HARQ response codebook and the PDCCHs scheduling the PDSCHs associated with the HARQ response codebook may be configured on a sub-slot basis, and the PUSCH to which the HARQ response bit string is mapped may be configured in units of a slot comprising two or more sub-slots. The base station may know in advance the HARQ response bit string to be generated by the terminal. Accordingly, the base station may determine one or more of the size of the uplink-shared channel (UL-SCH), the size of the aperiodic CSI, and the resource size of the PUSCH in consideration of the size of the HARQ response bit string (or, the number of HARQ response bit strings). The base station may transmit a UL grant indicating one or more of the size of the UL-SCH, the size of the aperiodic CSI, and the resource size of the PUSCH to the terminal. The terminal may receive the UL grant from the base station, and may identify a DAI and a beta offset used for UCI multiplexing from the UL grant.

Figure 22:
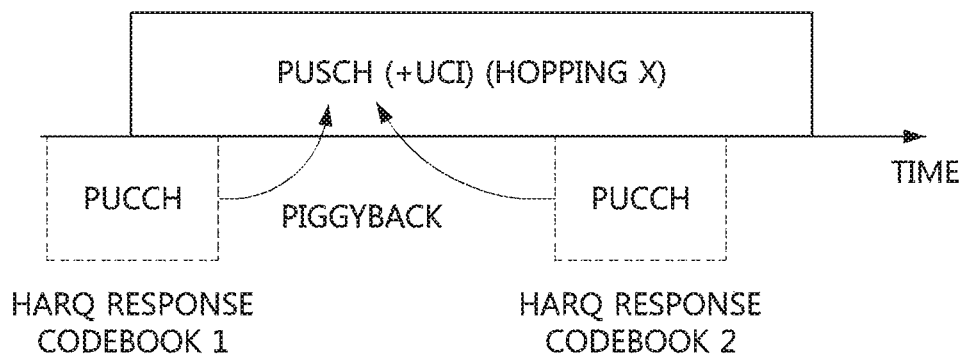
FIG. 22 is a conceptual diagram illustrating a first exemplary embodiment of a feedback method of an HARQ response in a communication system.

FIG. 22 is a conceptual diagram illustrating a first exemplary embodiment of a feedback method of an HARQ response in a communication system.

Referring to FIG. 22, one PUSCH may be transmitted through two or more sub-slots. In this case, the terminal may configure two HARQ response codebooks into one HARQ response bit string and multiplex the HARQ response bit string with the PUSCH.

An HARQ response codebook 1 may be encoded at the same timing with an HARQ response codebook 2 generated after the HARQ response codebook 1. Therefore, the terminal should decode the PDSCH corresponding to the HARQ response codebook 2 quickly. In order to support the encoding operation of the HARQ response codebooks 1 and 2 at the same time as the fast decoding operation of the PDSCH corresponding to the HARQ response codebook 2, the base station may perform a scheduling operation for the PDSCH and the PUSCH. When the PUSCH is transmitted according to a frequency hopping scheme, the HARQ response bit string may be multiplexed at every hop of the PUSCH. Accordingly, the base station may perform a decoding operation on the HARQ response bit string after receiving the PUSCH (e.g., part of the PUSCH) in the second hop.

Meanwhile, when a large amount of time is required for the decoding operation of the PDSCH, it may be difficult to simultaneously schedule the PDSCH and the PUSCH. Therefore, instead of making HARQ response codebooks into one HARQ response bit string, each HARQ response codebook may be multiplexed with the PUSCH in a time resource adjacent to a sub-slot in which the corresponding HARQ response codebook is to be transmitted. For example, the HARQ response codebook 1 may be multiplexed in the radio resource overlapping or adjacent to the PUCCH associated with the HARQ response codebook 1 among the radio resources occupied by the PUSCH. The HARQ response codebook 2 may be multiplexed in the radio resource overlapping or adjacent to the PUCCH associated with the HARQ response codebook 2 among the radio resources occupied by the PUSCH FIG. 23 is a conceptual diagram illustrating a second exemplary embodiment of a feedback method of an HARQ response in a communication system.

Figure 23:
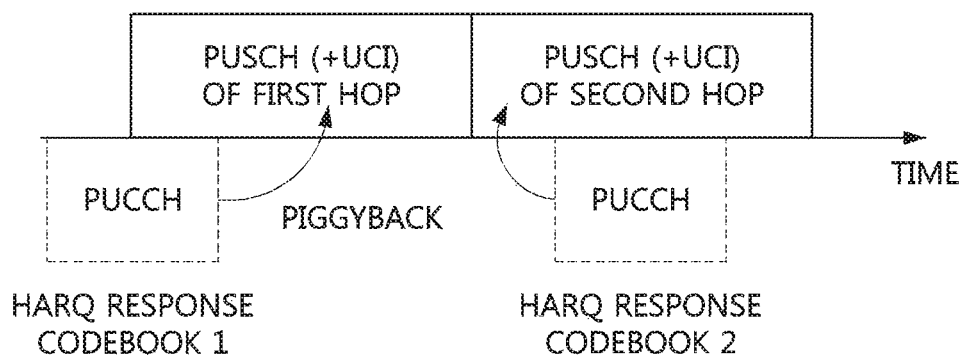
FIG. 23 is a conceptual diagram illustrating a second exemplary embodiment of a feedback method of an HARQ response in a communication system.

Referring to FIG. 23, when a PUSCH is transmitted in a frequency hopping scheme, an HARQ response codebook may be multiplexed with the PUSCH on a frequency hop basis. When the PUSCH belongs to a different sub-slot per frequency hop, the HARQ response codebook may be mapped differently for each frequency hop. In this case, the HARQ response codebook 1 may be multiplexed in the PUSCH of the first hop, and the HARQ response codebook 2 may be multiplexed in the PUSCH of the second hop. When two or more HARQ response codebooks are multiplexed in the PUSCH of one hop, the terminal may concatenate the HARQ response codebooks based on the order of the sub-slots (e.g., the sub-slots associated with the HARQ response codebooks) to generate the HARQ response bit string. The terminal may multiplex the HARQ response bit string in the PUSCH of one hop.

Multi-Reception Point (RxP)

In a communication scenario in which the terminal transmits PUSCHs through different RxPs, a PUSCH occasion may be configured. One PUSCH occasion may be indicated by one UL grant. The PUSCH occasion may be PUSCH instances consecutive in the time domain. A TB and a demodulation-reference signal (DM-RS) may be mapped to the PUSCH instance. The same TB may be mapped to PUSCH instances. Alternatively, a different TB may be mapped to each of the PUSCH instances. When the same TB is mapped to the PUSCH instances, a redundancy version (RV) may be configured differently for each PUSCH instance.

In this case, the base station may instruct the terminal to perform a transmission operation of a PUCCH. In a proposed method, each of the PUSCH instances may be regarded as an independent UL transmission, and UCI may be multiplexed in each of the PUSCH instances. If the mini-slot(s) in which the PUSCH instance is transmitted belongs to a specific sub-slot(s), the UCI may be multiplexed in the corresponding PUSCH instance.

Figure 24:
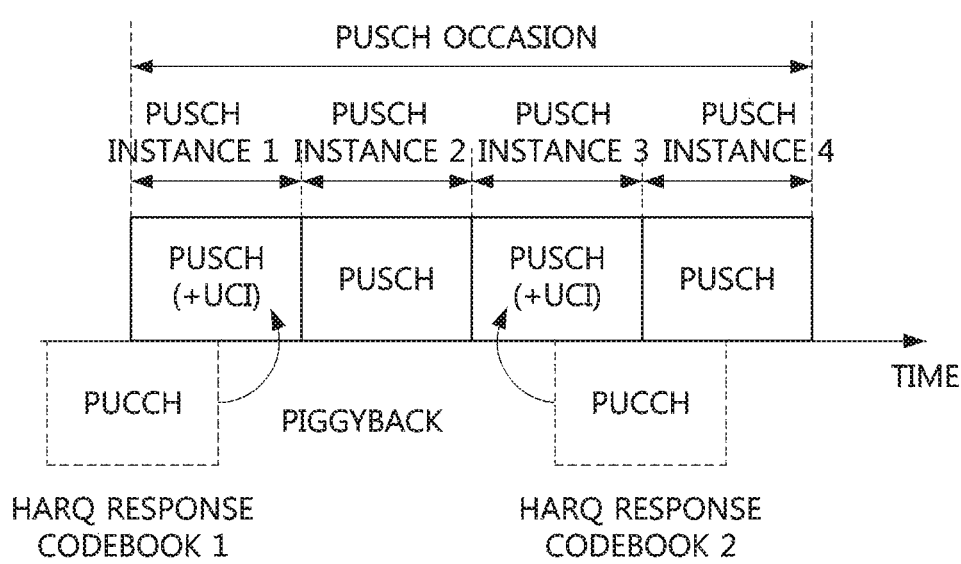
FIG. 24 is a conceptual diagram illustrating a third exemplary embodiment of a feedback method of an HARQ response in a communication system.

FIG. 24 is a conceptual diagram illustrating a third exemplary embodiment of a feedback method of an HARQ response in a communication system.

Referring to FIG. 24, one PUSCH occasion may include four PUSCH instances. The UCI may be multiplexed in the PUSCH instance 1 and the PUSCH instance 3. The HARQ response codebook 1 may be multiplexed in the PUSCH instance 1, and the HARQ response codebook 2 may be multiplexed in the PUSCH instance 3.

The PUCCH on which the HARQ response codebook 2 is to be transmitted may overlap with the PUSCH instances 3 and 4 in the time domain. Since the PUSCH instance 3 is located first in time among the PUSCH instances 3 and 4 overlapping with the PUCCH, the terminal may multiplex the HARQ response codebook 2 in the PUSCH instance 3. When a frequency hopping scheme is applied to the PUSCH instance, the UCI (e.g., HARQ response codebook) may be multiplexed in the corresponding frequency hop. Alternatively, the UCI (e.g., HARQ response codebook) may be multiplexed regardless of frequency hopping.

In a proposed method, a reference of the processing time for the UCI multiplexing may be the first symbol of the PUSCH (e.g., PUSCH in which the UCI is multiplexed). The terminal may transmit the PUSCH using only information included in the UL grant. Accordingly, the terminal may generate the PUSCH based on the size of the UL-SCH/CSI indicated by the UL grant without considering the slot format and/or the UCI multiplexing operation.

When the UCI is multiplexed in the PUSCH, it may be assumed that the terminal does not receive DL assignment information (e.g., DAI) after receiving the UL grant. The terminal may estimate the size of the UCI based on a field included in the UL grant, and may perform a puncturing operation or a rate matching operation on the UL-SCH based on the size of the UCI.

In order for the UCI to be multiplexed with the PUSCH, the processing time of the terminal should be sufficiently secured. When the UCI is an HARQ response, an interval between the last symbol of the PDSCH dynamically assigned by the DCI and the start symbol of the PUSCH may be equal to or longer than a time interval proportional to the predefined number of symbols (e.g., $N_1+d_{1,1}+1$). An interval between the last symbol of the SPS PDSCH semi-statically assigned and the start symbol of the PUSCH may be equal to or longer than a time interval proportional to the predefined number of symbols (e.g., $N+1$).

An interval between the last symbol of the PDSCH and the start symbol of the PUSCH (e.g., UL-SCH) dynamically assigned by the DCI may be equal to or longer than a time interval proportional to the predefined number of symbols (e.g., $N_2+d_2,1+1$). An interval between the last symbol of the PDSCH and the start symbol of the PUSCH (e.g., CSI) dynamically assigned by the DCI may be equal to or longer than a time interval proportional to the number of predefined symbols (e.g., $Z+d$).

$N$, $N_1$, $N_2$, $d_{1,1}$, and $d_{2,1}$ may be defined in the 3GPP technical specification. The base station may inform the terminal of $N$, $N_1$, $N_2$, $d_{1,1}$, and $d_{2,1}$ through a combination of one or more among higher layer signaling, MAC CE, and DCI. In the above-described exemplary embodiments, the time required to generate the PUSCH may be as follows. The UCI processing operation of the terminal before the required time may be distinguished from the UCI processing operation of the terminal after the required time.

Figure 25:
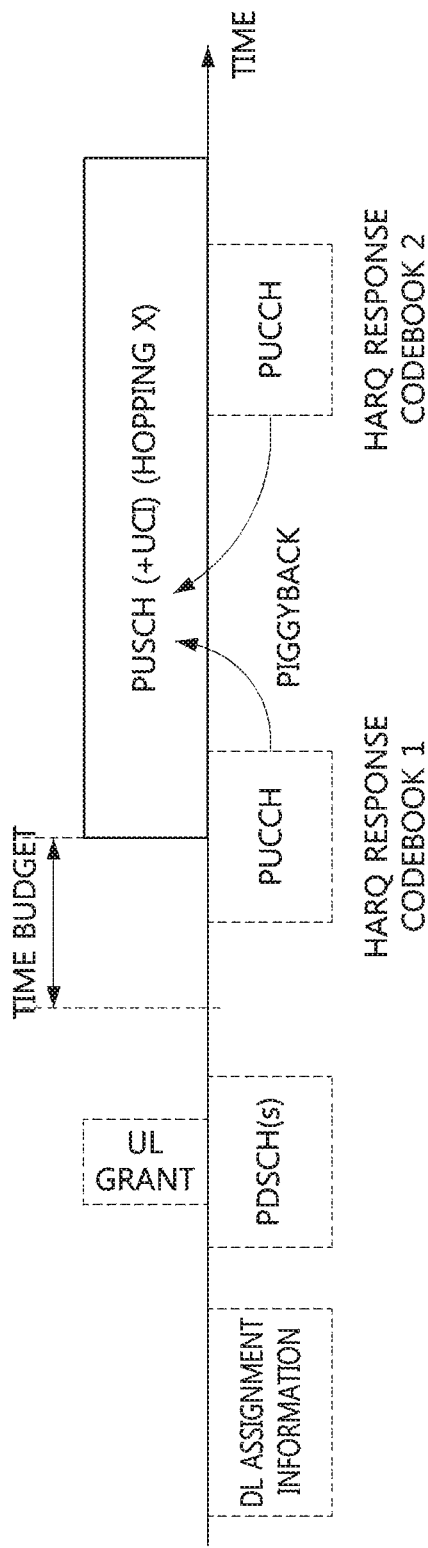
FIG. 25 is a conceptual diagram illustrating a fourth exemplary embodiment of a feedback method of an HARQ response in a communication system.

FIG. 25 is a conceptual diagram illustrating a fourth exemplary embodiment of a feedback method of an HARQ response in a communication system.

Referring to FIG. 25, PUSCH transmission may be performed without frequency hopping, and one PUSCH may overlap with a plurality of PUCCHs. In this case, the HARQ response codebooks 1 and 2 may be multiplexed in the PUSCH. A time budget may be a time required at the terminal for the UCI processing (e.g., UCI transmission).

Figure 26:
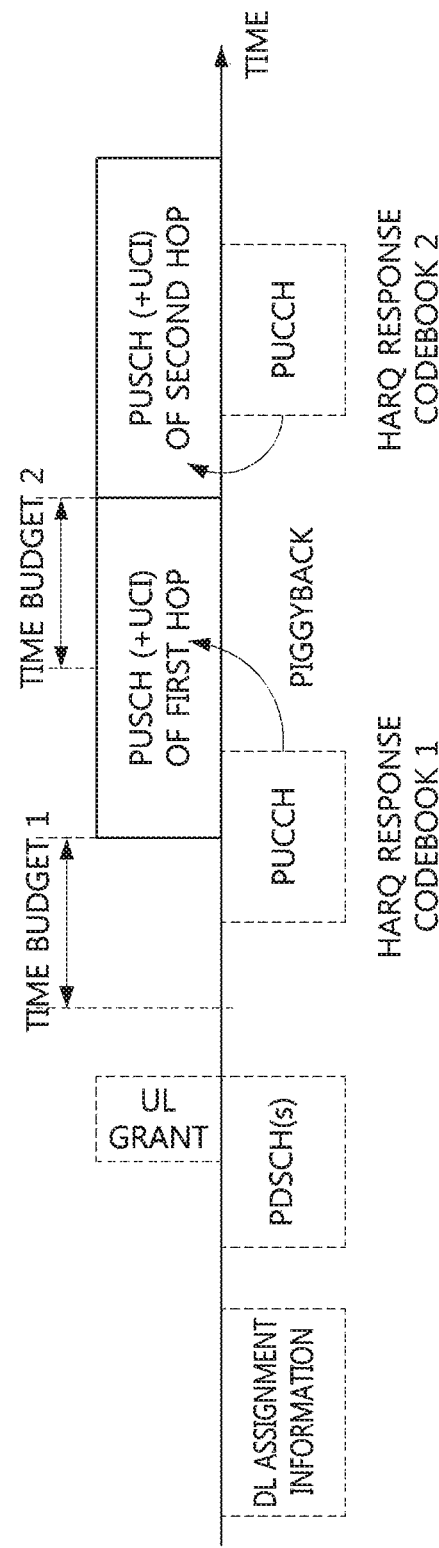
FIG. 26 is a conceptual diagram illustrating a fifth exemplary embodiment of a feedback method of an HARQ response in a communication system.

FIG. 26 is a conceptual diagram illustrating a fifth exemplary embodiment of a feedback method of an HARQ response in a communication system.

Referring to FIG. 26, PUSCH transmission may be performed based on a frequency hopping scheme, and the PUSCH may overlap with a PUCCH. In this case, the HARQ response codebook 1 may be multiplexed in the PUSCH of the first hop, and the HARQ response codebook 2 may be multiplexed in the PUSCH of the second hop. A time budget 1 may be a time required at the terminal for processing UCI 1 (e.g., HARQ response codebook 1), and a time budget 2 may be a time required at the terminal for processing UCI 2 (e.g., HARQ response codebook 2).

Figure 27:
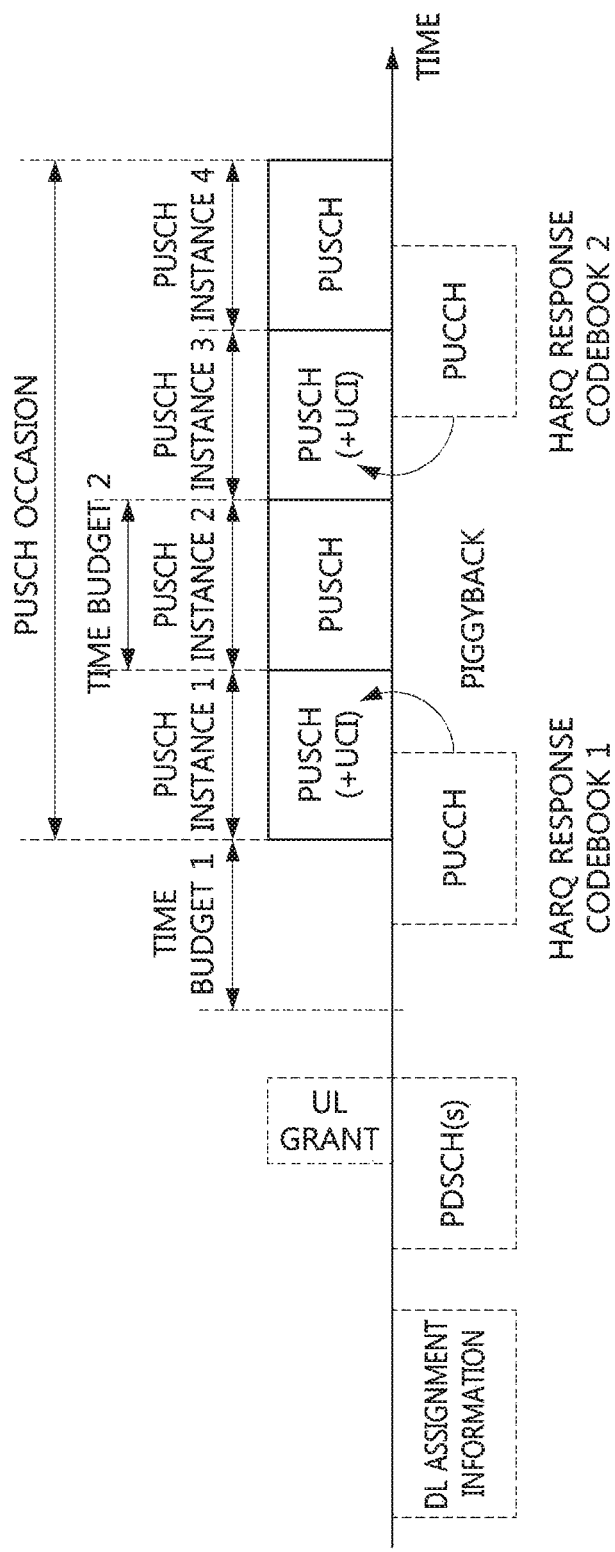
FIG. 27 is a conceptual diagram illustrating a sixth exemplary embodiment of a feedback method of an HARQ response in a communication system.

FIG. 27 is a conceptual diagram illustrating a sixth exemplary embodiment of a feedback method of an HARQ response in a communication system.

Referring to FIG. 27, one PUSCH occasion may include four PUSCH instances. The HARQ response codebook 1 may be multiplexed in the PUSCH instance 1, and the HARQ response codebook 2 may be multiplexed in the PUSCH instance 3. A time budget 1 may be a time required at the terminal for processing UCI 1 (e.g., HARQ response codebook 1), and a time budget 2 may be a time required at the terminal for processing UCI 2 (e.g., HARQ response codebook 2).

In order to apply the above-described methods, the start symbol of the PUSCH and the last symbol of the PDSCH, which the terminal interprets, should be changed. For example, the terminal may calculate a processing time (e.g., time budget) based on a frequency hop or PUSCH instance of the PUSCH in which the UCI is multiplexed. In the exemplary embodiment shown in FIG. 26, a processing time (e.g., time budget) may be calculated based on a frequency hop of a PUSCH on one HARQ response codebook basis. In the exemplary embodiment shown in FIG. 27, a processing time (e.g., time budget) may be calculated based on a PUSCH instance on one HARQ response codebook basis. These methods differ from the method of calculating the processing time based on the first symbol of the PUSCH.

Since the references (e.g., frequency hop or PUSCH instance) for calculating the processing time (e.g., time budget) are different in the exemplary embodiments illustrated in FIGS. 25 to 27, a timing of generating the UCI multiplexed in the PUSCH may also be changed. For example, the last symbol of the PDSCH may be located before the time budget from the first symbol of the PUSCH in which the UCI is multiplexed. In the exemplary embodiments shown in FIGS. 25 to 27, the UL grant is received after the DL assignment information, but the UL grant may be received before the DL assignment information.

In a proposed method, when the processing time is insufficient in the terminal or when DL assignment information is received after the UL grant, the terminal may select on UL channel, and then transmit the UCI in the selected UL channel.

The priority of the UL-SCH may be different from the priority of the DL-SCH. The priority of the DL-SCH/UL-SCH may be dynamically indicated. Alternatively, the priority of DL-SCH/UL-SCH may be indicated by higher layer signaling. The priority of DL-SCH/UL-SCH may be dynamically indicated by a PDCCH (e.g., DCI) assigning the DL-SCH/UL-SCH or an RNTI. The priority of the DL-SCH may be the priority of the PDSCH, and the priority of the UL-SCH may be the priority of the PUSCH.

The terminal may identify the priority of the DL-SCH/UL-SCH based on a search space or a control resource set (CORESET) in which the corresponding PDCCH is detected. The terminal may identify the priority of the DL-SCH/UL-SCH based on a specific field of the DCI. The terminal may identify the priority of the DL-SCH/UL-SCH based on the characteristics of the PDCCH (e.g., DCI format, DCI size). Two or more priorities may be defined. If two priorities are defined, the two priorities may be referred to as a low priority and a high priority.

The above-described method of multiplexing UCI (e.g., HARQ response, CSI) and PUSCH may be applied when the priority of UCI (e.g., DL-SCH associated with UCI) is the same as that of UL-SCH. When the priority of the DL-SCH is lower than the priority of the UL-SCH, an HARQ response for the DL-SCH may not be multiplexed in the UL-SCH. Regardless of the reception timing of the DL assignment information and the UL grant, the multiplexing operation of the UCI may not be performed when the priority of the DL-SCH associated with the UCI is different from the priority of the UL-SCH. When the priority of the DL-SCH is lower than the priority of the UL-SCH, the terminal may transmit the PUSCH according to the UL grant, and the HARQ response may not be multiplexed in the corresponding PUSCH. When the PUCCH overlaps with the PUSCH in the time domain, the PUCCH may not be transmitted. In this case, since the HARQ response is not received from the terminal, the base station may retransmit the DL-SCH using the new DL assignment information.

When the priority of the DL-SCH is higher than the priority of the UL-SCH, the terminal may transmit a PUCCH including an HARQ response associated with the DL-SCH. Regardless of the reception timing of the DL assignment information and the UL grant, the multiplexing operation of the UCI may not be performed when the priority of the DL-SCH associated with the UCI is different from the priority of the UL-SCH. Accordingly, the terminal may transmit the PUCCH based on the DL assignment information. When the PUCCH overlaps with the PUSCH in the time domain, the PUSCH may not be transmitted. In this case, since the PUSCH is not received from the terminal, the base station may trigger a retransmission operation of the UL-SCH using a new UL grant.

When the priority of the DL-SCH is the same as that of the UL-SCH, and the processing time (e.g., time budget) is satisfied at the terminal, the UCI associated with the DL-SCH may be multiplexed with the UL-SCH. However, the base station cannot request transmission of the HARQ response for the DL-SCH after allocating a UL-SCH transmission resource to the terminal.

Therefore, the scheduling operation of the DL-SCH may be limited. In order to support the URLLC services, this limitation needs to be relaxed.

The base station may transmit DL assignment information for the PDSCH associated with the HARQ response to the terminal so that the PUCCH for feedback of the HARQ response does not overlap the PUSCH. Alternatively, the assignment timing of the PDSCH may be delayed.

Since the transmission of the DL-SCH is delayed according to these operations, the requirements of the URLLC service may not be satisfied.

The operation of generating the PUSCH based on the information indicated after the UL grant may be difficult to be implemented in the terminal. Therefore, methods that satisfy the following conditions are needed.

Condition 1: Easy to implement in terminal
Condition 2: Terminal can generate a PUSCH only with a UL grant
Condition 3: Base station can perform flexible scheduling for a PDSCH In a proposed method, it may be allowed that the transmission timing of the UL grant is changed with the transmission timing of the DL assignment information. When the priority of the DL-SCH is the same as the priority of the UL-SCH, the terminal may perform communication based on the DL assignment information received after the UL grant. For example, the terminal may receive the UL grant and may receive the DL assignment information after the UL grant. When the PUCCH associated with the DL assignment information overlaps with the PUSCH indicated by the UL grant in the time domain, the terminal may transmit the PUCCH or the PUSCH to the base station. Therefore, there may be no transmission restriction of the DL assignment information at the base station.

In a proposed method, the terminal may select a UL channel(s) before the last UL channel among the plurality of UL channels, and perform uplink communication using the selected UL channel(s). That is, the terminal may not use the last UL channel. The terminal may compare the position of the first symbol in the resources to which the DL assignment information assigning the PDSCH is mapped with the positions of the first symbols in the resources to which the UL grant is mapped, and based on the comparison result, the terminal may select a UL channel the is temporally advanced among the UL channels (e.g., PUCCH and PUSCH associated with the PDSCH). The UL channel selected by the terminal may be a PUCCH or a PUSCH.

Figure 28:
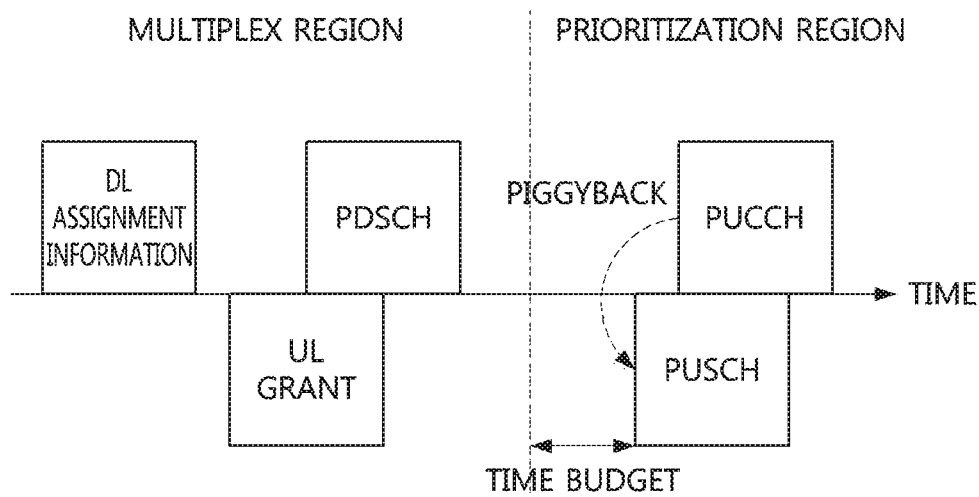
FIG. 28 is a conceptual diagram illustrating a seventh exemplary embodiment of a feedback method of an HARQ response in a communication system.

FIG. 28 is a conceptual diagram illustrating a seventh exemplary embodiment of a feedback method of an HARQ response in a communication system.

Referring to FIG. 28, the base station may transmit a UL grant after transmitting DL assignment information for a PDSCH. The terminal may receive the DL assignment information from the base station, and may receive the PDSCH based on the DL assignment information. In addition, the terminal may receive the UL grant from the base station, and may identify a PUSCH indicated by the UL grant. Here, a PUCCH on which an HARQ response for the PDSCH is to be transmitted may overlap with the PUSCH in the time domain. When the UL grant is received before the PDSCH, the terminal may multiplex the HARQ response for the PDSCH with the PUSCH.

Figure 29:
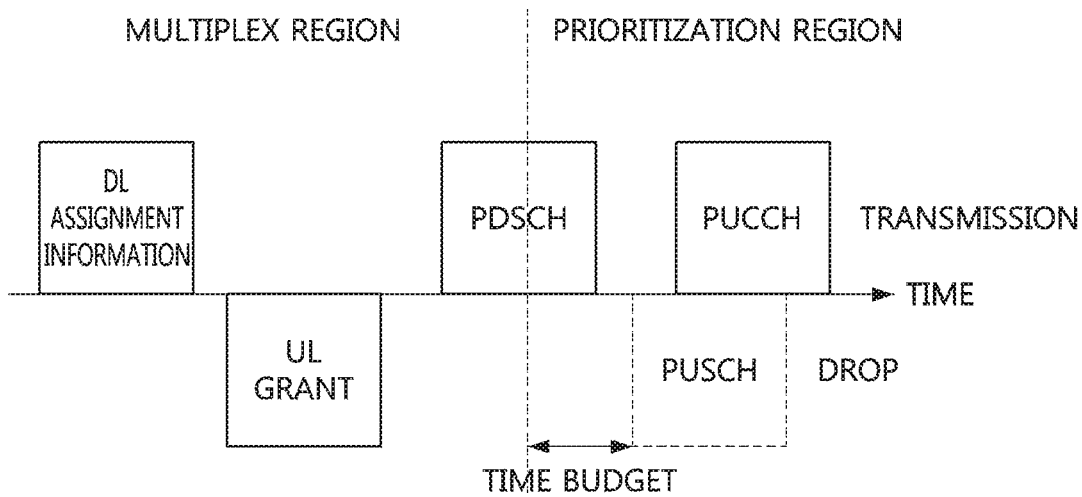
FIG. 29 is a conceptual diagram illustrating an eighth exemplary embodiment of a feedback method of an HARQ response in a communication system.

FIG. 29 is a conceptual diagram illustrating an eighth exemplary embodiment of a feedback method of an HARQ response in a communication system.

Referring to FIG. 29, the base station may transmit a UL grant after transmitting DL assignment information for a PDSCH. The terminal may receive DL assignment information from the base station, and may receive the PDSCH based on the DL assignment information. In addition, the terminal may receive the UL grant from the base station, and may identify a PUSCH indicated by the UL grant. Here, a PUCCH on which an HARQ response for the PDSCH is to be transmitted may overlap with the PUSCH in the time domain. When the DL assignment information is received before the UL grant, the terminal may drop the PUSCH transmission scheduled by the UL grant, and transmit the PUCCH including the HARQ response to the PDSCH to the base station.

Figure 30:
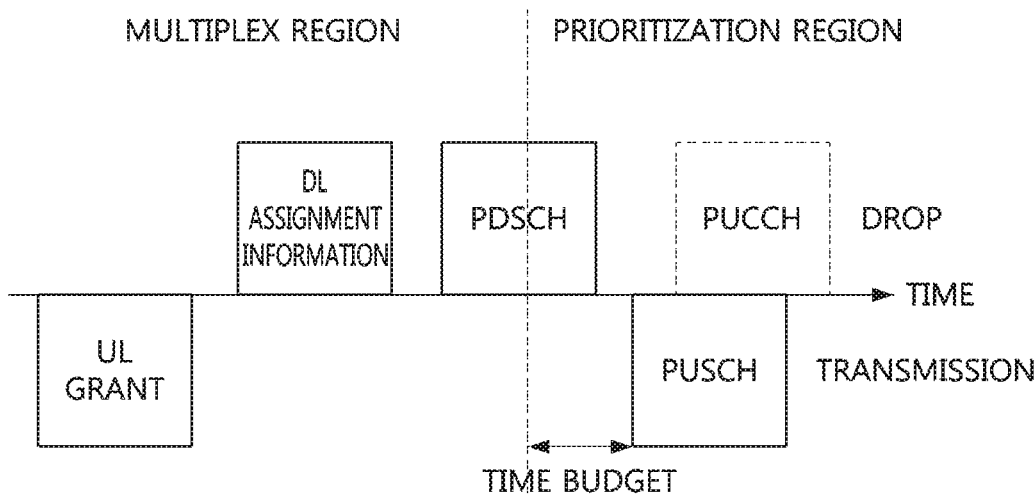
FIG. 30 is a conceptual diagram illustrating a ninth exemplary embodiment of a feedback method of an HARQ response in a communication system.

FIG. 30 is a conceptual diagram illustrating a ninth exemplary embodiment of a feedback method of an HARQ response in a communication system.

Referring to FIG. 30, the base station may transmit DL assignment information for a PDSCH after transmitting a UL grant. The terminal may receive the UL grant from the base station, and may identify a PUSCH indicated by the UL grant. In addition, the terminal may receive the DL assignment information from the base station, and receive the PDSCH based on the DL assignment information. Here, a PUCCH on which an HARQ response for the PDSCH is to be transmitted may overlap with the PUSCH in the time domain. When the UL grant is received before the DL assignment information, the terminal may transmit the PUSCH scheduled by the UL grant, and may drop transmission of the PUCCH. The HARQ response for the PDSCH may be multiplexed in the PUSCH.

Here, the base station may know in advance that the terminal does not transmit the PUCCH including the HARQ response for the PDSCH. In this case, since the terminal performs a decoding operation on the PDSCH (e.g., DL-SCH), when the base station transmits DL assignment information for triggering retransmission of the PDSCH, the terminal may expect that the error rate of the PDSCH is reduced.

In another proposed method, the terminal may transmit the last UL channel among the plurality of UL channels, and the transmission of the UL channel before the last UL channel among the plurality of UL channels may be cancelled.

The terminal may compare the position of the first symbol in the resources to which the DL assignment assigning the PDSCH is mapped with the position of the first symbols in the resources to which the UL grant assigning the PUSCH is mapped, and based on the comparison result, the terminal may select the last UL channel in the time domain among the UL channel (e.g., PUCCH and PUSCH associated with PDSCH). The UL channel selected by the terminal may be a PUCCH or a PUSCH.

The UL channel assigned by the base station may be a UL channel that should be urgently transmitted. Therefore, according to the proposed method, the terminal may transmit the last UL channel in the time domain. The transmission of the UL channel before the last UL channel in the time domain may be canceled.

Figure 31:
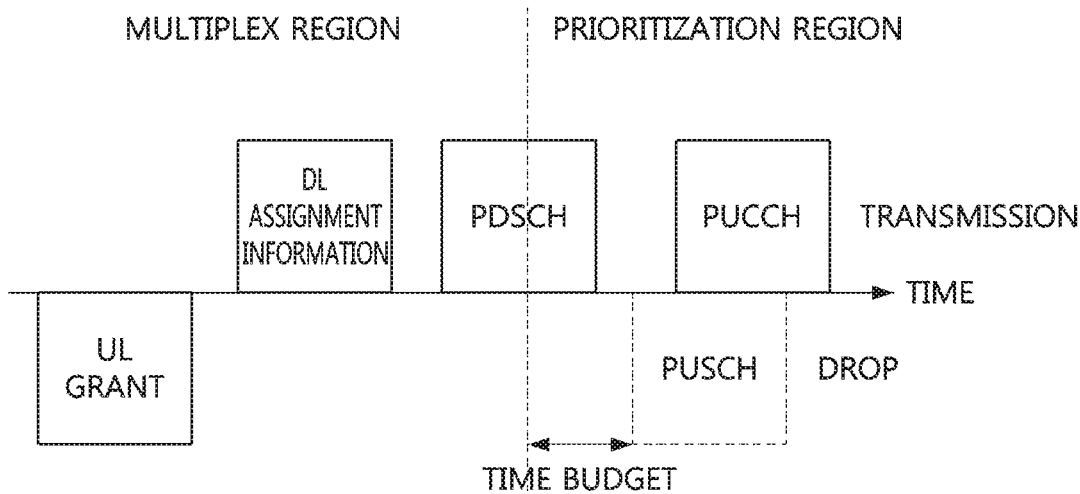
FIG. 31 is a conceptual diagram illustrating a tenth exemplary embodiment of a feedback method of an HARQ response in a communication system.

FIG. 31 is a conceptual diagram illustrating a tenth exemplary embodiment of a feedback method of an HARQ response in a communication system.

Referring to FIG. 31, the base station may transmit DL assignment information for a PDSCH after transmitting a UL grant. The terminal may receive the UL grant from the base station, and may identify the PUSCH indicated by the UL grant. In addition, the terminal may receive the DL assignment information from the base station, and may receive the PDSCH based on the DL assignment information. Here, a PUCCH on which an HARQ response for the PDSCH is to be transmitted may overlap with the PUSCH in the time domain. When the UL grant is received before the DL assignment information, the terminal may transmit the PUCCH including the HARQ response for the PDSCH scheduled by the DL assignment information. That is, the transmission of the PUSCH scheduled by the UL grant may be dropped.

Figure 32:
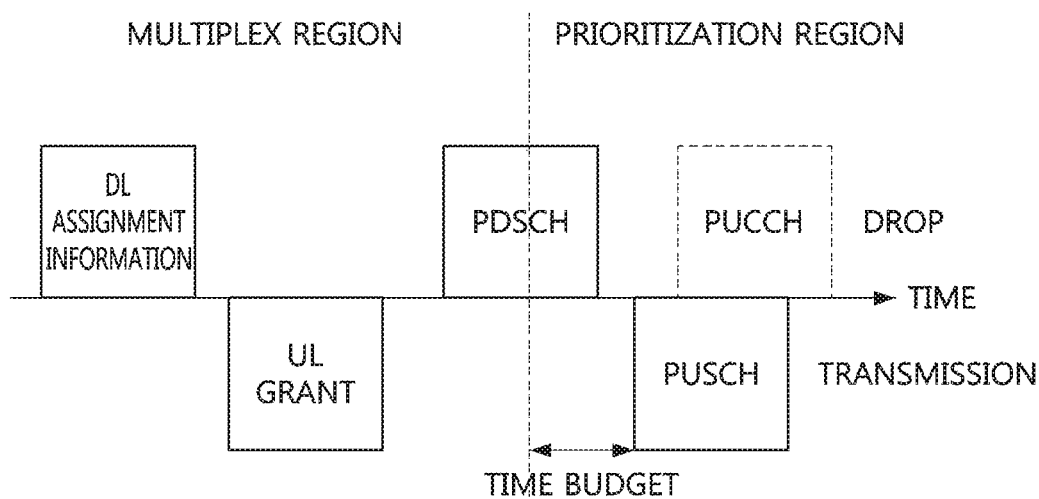
FIG. 32 is a conceptual diagram illustrating an eleventh exemplary embodiment of a feedback method of an HARQ response in a communication system.

FIG. 32 is a conceptual diagram illustrating an eleventh exemplary embodiment of a feedback method of an HARQ response in a communication system.

Referring to FIG. 32, the base station may transmit a UL grant after transmitting DL assignment information for a PDSCH. The terminal may receive the DL assignment information from the base station, and may receive the PDSCH based on the DL assignment information. In addition, the terminal may receive the UL grant from the base station, and may identify a PUSCH indicated by the UL grant. Here, a PUCCH on which an HARQ response for the PDSCH is to be transmitted may overlap with the PUSCH in the time domain. When the DL assignment information is received before the UL grant, the terminal may transmit the PUSCH scheduled by the UL grant. That is, the transmission of the PUCCH including the HARQ response for the PDSCH scheduled by the DL assignment information may be dropped. The HARQ response for the PDSCH may be multiplexed in the PUSCH.

When the PUSCH is assigned after the PUCCH is assigned, the terminal may not transmit the PUCCH and may transmit the PUSCH. If the HARQ response for the PDSCH is not received from the terminal, the base station cannot confirm whether the PDSCH has been successfully received at the terminal. Accordingly, the base station may regard the case in which the HARQ response for the PDSCH is not received as a case where a NACK is received, and may transmit DL assignment information for the PDSCH again.

In a proposed method, an HARQ response codebook may be generated considering different RxPs.

The terminal may generate an HARQ response codebook based on the 3GPP technical specification. The base station may transmit to the terminal DL-DCIs instructing to transmit PUCCHs in the same time resources. The DL-DCI may include scheduling information of the PDSCH. The DL-DCI may be distinguished from the UL-DCI including the UL grant.

The terminal may receive the DL-DCIs from the base station, and may arrange HARQ response bits based on the reception order of the DL-DCIs. The terminal may generate an HARQ response codebook by concatenating the HARQ response bits.

One HARQ response codebook may include the HARQ response bits to be transmitted on the PUCCH of the same sub-slot. One HARQ response codebook may have a form of a bitmap. The HARQ response codebook may correspond one-to-one with the sub-slot.

The PUCCHs corresponding to the HARQ response codebook may have the same transmission configuration indicator (TCI) or the same scheduling request indicator (SRI). Alternatively, the PUCCHs corresponding to the HARQ response codebook may have different TCIs or different SRIs. The TCI may be used for the DL transmissions as well as the UL transmissions. The TCI may mean information of a preprocessing and/or beamforming for transmissions (e.g., DL transmission, UL transmissions). The SRI may mean a sounding reference signal resource indicator. The TCI and SRI may be used interchangeably. Alternatively, other term may be used instead of the TCI and SRI.

The terminal may assume that HARQ response codebooks having the same TCI (or SRI) are received at the same RxP (e.g., base station). The terminal may assume that HARQ response codebooks having different TCIs (or SRIs) are received at different RxPs (e.g., base stations). The TCI may be obtained from configuration information of the CORESET in which the DL-DCI scheduling the PDSCH is received. The base station may transmit the configuration information of the CORESET to the terminal using higher layer signaling. The configuration information of the CORESET may include one or more of TCI, SRI used for PUCCH transmission, and information indicating a preprocessing scheme. Accordingly, the PUCCH may have a TCI of the CORESET associated with the corresponding PUCCH.

The base station may perform a PDSCH scheduling operation so that the PUCCHs having the same TCI are located in the same sub-slot. Arranging the RxPs in order may be equivalent to arranging the CORESET indexes in order. If there is only one sub-slot, an algorithm defined in Table 4 below may be used.

TABLE 4

For CORESET index
   For Serving cell index
      For scheduling DL-DCI order
         Place the HARQ-ACK bit.
      End scheduling DL-DCI index
   End Serving cell index
End CORESET index If a reception timing of DL-DCI 1 is earlier than a reception timing of DL-DCI 2, an HARQ response bit associated with DL-DCI 1 in the HARQ response codebook may be located before an HARQ response bit associated with DL-DCI 2. If there are two or more sub-slots, the following methods may be considered.

In a proposed method, sub-slots may be considered first, and RxPs may be considered later. The terminal may generate an HARQ response codebook based on the 3GPP technical specification. The terminal may receive DL-DCIs indicating that PUCCHs are transmitted in the same time resources, and may arrange HARQ response bits based on the order of receiving the DL-DCIs. The terminal may generate the HARQ response codebook by concatenating the HARQ response bits in the order of the serving cells.

When the PUCCHs corresponding to the HARQ response codebook have the same TCI, the terminal may generate an HARQ response bit string A by concatenating the HARQ response codebooks in the order of sub-slots. The terminal may generate an HARQ response bit string B by concatenating a plurality of HARQ response bit string A in the order of the serving cells. The terminal may map the HARQ response bit string B to a PUSCH or a PUCCH.

When the PUCCHs corresponding to the HARQ response codebook have different TCIs, the HARQ response codebooks may not be concatenated regardless of the sub-slots. The terminal may generate an HARQ response bit string A by concatenating the HARQ response codebooks in the order of the serving cells. The terminal may generate an HARQ response bit string B by concatenating a plurality of HARQ response bit string A in the order of TCIs (e.g., in the order of CORESETs). The HARQ response bit string B may be mapped to a PUSCH or a PUCCH.

When the above-described procedure is used, the terminal may generate the HARQ response codebook by arranging HARQ responses fed back in the same sub-slot. Thereafter, the terminal may generate an HARQ response bit string A by concatenating the HARQ response codebooks having the same TCI in the order of sub-slots. Thereafter, the terminal may generate an HARQ response bit string B by concatenating a plurality of HARQ response bit string A in the order of the serving cells. Thereafter, the terminal may generate an HARQ response bit string C by concatenating a plurality of HARQ response bit string B in the order of CORESETs. Thereafter, the terminal may map the HARQ response bit string C to a PUSCH or a PUCCH. This procedure may be performed based on an algorithm defined in Table 5 below.

TABLE 5

For CORESET index
   For Sub-slot index
      For Serving cell index
         For scheduling DL-DCI order
            Place the HARQ-ACK bit.

TABLE 5-continued

End scheduling DL-DCI index
End Serving cell index
End Sub-slot index
End CORESET index In a proposed method, the time order may be considered first, then the frequency order may be considered, and finally the RxP order may be considered. The terminal may generate the HARQ response codebook in consideration of the time order and the frequency order. If the RxP is further considered in the generation procedure of the HARQ response codebook, the HARQ response codebooks may be concatenated in the order of CORESETs.

The HARQ response bit string A may be generated according to a concept extended based on the time order. For example, the order of the PDSCH may be determined by the reception order of the DL-DCI scheduling the PDSCH. Here, the DL-DCI may be limited to a DL-DCI indicating a transmission timing of the same PUCCH. The terminal may generate the HARQ response bit string B by concatenating a plurality of HARQ response bit string A according to the transmission order of the PUCCHs (e.g., the order of sub-slots). Thereafter, the terminal may generate the HARQ response bit string C by concatenating a plurality of HARQ response bit string B in the order of the serving cells. Thereafter, the terminal may generate an HARQ response bit string D by concatenating a plurality of HARQ response bit strings C in the order of CORESETs. The HARQ response bit string D may be multiplexed in a PUCCH or a PUSCH. This procedure may be performed based on an algorithm defined in Table 6 below.

TABLE 6

For CORESET index
    For Serving cell index
        For Sub-slot index
            For scheduling DL-DCI order
                Place the HARQ-ACK bit.
            End scheduling DL-DCI index
        End Sub-slot index
    End Serving cell index
End CORESET index According to a proposed method, since the last concatenation operation is performed in the order of CORESETs, when different PUCCHs are transmitted to different RxPs in a communication scenario using a plurality of RxPs, each of the PUCCHs may have a different TCI.

In a proposed method, in case that the last concatenation operation is not defined, the required HARQ response bit string may be obtained. When all HARQ response bits are to be transmitted through one PUCCH or PUSCH, the required HARQ response bit strings may be obtained by performing the last concatenation operation.

In a proposed method, the RxP order may be considered first, and then the order of sub-slots may be considered.

The terminal may generate the HARQ response codebook based on the 3GPP technical specification. The terminal may generate the HARQ response codebook by concatenating HARQ response bits according to the order of reception timings of DL-DCIs, and generate an HARQ response bit string by concatenating the HARQ response codebooks according to the order of the serving cells.

Since the PUCCHs corresponding to the HARQ response codebook may have different TCIs, the HARQ response codebook may be transmitted on different PUCCHs. The HARQ response codebooks may be generated by arranging the HARQ responses for the PDSCHs associated with the PUCCHs to be transmitted in the same sub-slot in a predefined order.

Thereafter, the terminal may generate HARQ response bit strings A by concatenating the HARQ response codebooks in the order of the serving cells. Thereafter, the terminal may generate HARQ response bit strings B by concatenating a plurality of HARQ response bit string A in the order of CORESETs. Thereafter, the terminal may generate the HARQ response bit string C by concatenating a plurality of HARQ response bit string B in the order of the sub-slots. The HARQ response bit string C may be transmitted on a PUCCH or a PUSCH. This procedure may be performed based on an algorithm defined in Table 7 below.

TABLE 7

For Sub-slot index
    For CORESET index
        For Serving cell index
            For scheduling DL-DCI order
                Place the HARQ-ACK bit.
            End scheduling DL-DCI index
        End Serving cell index
    End CORESET index
End Sub-slot index According to a proposed method, the last concatenation operation may be performed in the order of the sub-slots. In order to quickly perform the feedback operation, one HARQ response bit string may include HARQ responses to be transmitted to different RxPs. In order to support HARQ response transmission for the URLLC PDSCH, the PUCCH may be transmitted on a sub-slot basis, and the HARQ response may be multiplexed in the PUSCH on a sub-slot basis.

In a proposed method, in case that the last concatenation operation is not defined, the required HARQ response bit string may be transmitted through a PUCCH or a PUSCH on a sub-slot basis. When the delay time required for the HARQ response transmission procedure is satisfied, the required HARQ response bit string may be obtained by performing the last concatenation operation.

Method of Generating CSI Reports Considering Different RxPs

The priority of RxP may be considered in the CSI reporting procedure. The CSI report may be triggered by DCI. Alternatively, the CSI report may be activated semi-persistent. Depending on the triggering method (e.g., activation method) of the CSI report, the CSI report may be classified into a periodic CSI report, a semi-persistent CSI report, and a triggered CSI report. The transmission of the CSI report may be indicated by one transmission point (TxP) (e.g., base station), and the terminal may transmit the CSI report for one TxP to an RxP (e.g., base station). When two or more DL carriers are configured and two or more DL carriers are activated, the terminal may generate CSI reports for all or part of DL BWPs. The CSI report may be mapped to a PUCCH or a PUSCH.

If there are many DL BWPs, all CSI reports may not be transmitted on a PUCCH or a PUSCH configured to the terminal. This is because the terminal cannot transmit the encoded CSI reports through the resources configured by the base station. In this case, the terminal may transmit a portion of the CSI reports according to the priorities (e.g., priorities defined in 3GPP technical specification) among all the CSI reports, and may not transmit the remaining CSI reports.

In order to consider the CSI reports for one or more TxPs and one or more RxPs receiving the corresponding CSI reports, the priorities of the CSI reports defined in the 3GPP specification should be modified.

The base station may configure J PUCCH resources (e.g., multi-CSI-PUCCH-Resource-List) in the terminal using higher layer signaling. J may be 1 or 2. When the terminal desires to transmit a plurality of CSI reports on a PUCCH configured in one slot, the terminal may select one of a PUCCH resource 0 and a PUCCH resource J−1. In the procedure of defining the PUCCH resource 0 and the PUCCH resource J−1, the base station may define the PUCCH resources such that the size of the PUCCH resource (e.g., the number of REs×code rate×modulation rate) increases. Accordingly, the PUCCH resource 1 may be greater than the PUCCH resource 0.

"CSI report(s)+other UCI (e.g., SR, HARQ response)+CRC" may be represented in bits, and the corresponding bits may be encoded. When a codeword for the "CSI report(s)+other UCI (e.g., SR, HARQ response)+CRC" can be transmitted in the PUCCH resource 0, the terminal may transmit the corresponding codeword using the PUCCH resource 0. When the codeword for "CSI report(s)+other UCI (e.g., SR, HARQ response)+CRC" can be transmitted in the PUCCH resource 1, the terminal may transmit the corresponding codeword using the PUCCH resource 1. When the codeword for "CSI report(s)+other UCI (e.g., SR, HARQ response)+CRC" cannot be transmitted in the PUCCH resources 0 and 1, the terminal may not transmit some CSI report(s) from the entire CSI report(s). Alternatively, the terminal may transmit the CSI report(s) using a PUSCH. The CSI report not transmitted may be determined based on an equation defined in the 3GPP technical specification.

The priority of each of the CSI reports may be determined by the following function. y may indicate a CSI reporting scheme (e.g., periodic CSI reporting, semi-static CSI reporting, or triggered CSI reporting). k may indicate the type of CSI (e.g., L-refernece signal received power (L1-RSRP) or CSI other than L1-RSRP). c may be an index of a serving cell. s may be an index of the CSI report.

The function for determining the priority of each of the CSI reports may be defined as in Equation 9 below.

$$pri(y,k,c,s) = 2 \cdot N_{cells} \cdot M_s \cdot y + N_{cells} \cdot M_s \cdot k + M_s \cdot c + s \quad \text{[Equation 9]}$$

$N_{cells}$ may indicate the maximum number of serving cells and may be configured by higher layer signaling. $M_s$ may indicate the maximum number of CSI reports and may be configured by higher layer signaling.

When the CSI report is an aperiodic CSI report transmitted on a PUSCH, y may be 0. When the CSI report is a semi-static CSI report transmitted on a PUSCH, y may be 1. When the CSI report is a semi-static CSI report transmitted on a PUCCH, y may be 2. When the CSI report is a periodic CSI report transmitted on a PUCCH, y may be 3. When the CSI report includes L1-RSRP, k may be 0. When the CSI report does not include L1-RSRP, k may be 1. The terminal may determine that the smaller the pri(y, k, c, s), the higher the priority.

The base station may instruct the terminal to transmit the CSI report on a PUSCH. Here, y may be set to 0 or 1. In this case, transmission of two CSI reports may collide with each other. When the terminal is instructed to transmit CSI reports on PUSCHs, the PUSCHs may overlap in the time domain. In this case, the terminal may transmit a CSI report having a high priority (e.g., a CSI report having a low pri(y, k, c, s)) on a PUSCH associated with the corresponding CSI.

When a CSI report 1 is instructed to be transmitted on a PUCCH (e.g., when y is 2 or 3), a CSI report 2 is instructed to be transmitted on a PUSCH (e.g., when y is 0 or 1), and the PUCCH on which the CSI report 1 is to be transmitted overlaps with the PUSCH on which the CSI report 2 is to be transmitted overlap in the time domain, the terminal may not transmit a CSI report having a low priority (e.g., CSI report having a high pri(y, k, c, s)).

When all the CSI reports are transmitted on PUCCHs (e.g., when y is 2 or 3), and the PUCCHs overlap in the time domain, the terminal may not transmit a CSI report having a low priority CSI report (e.g., CSI report having a high pri(y, k, c, s))), and multiplex CSI report(s) selected according to the priorities. The multiplexed CSI report(s) may be transmitted on the PUCCH resource J−1.

In a proposed method, the priorities of the CSI reports for two or more transmission reception points (TRPs) may be determined according to the order (e.g., priorities) of the two or more TRPs. The priority of the CSI report for one TRP may be determined according to the 3GPP technical specification, and each of the TRPs may have a different offset. The priority of the CSI report for a TRP (e.g., TRP A) having a high priority may be higher than the priority of the CSI report for a TRP (e.g., TRP B) having a low priority. Management of the TRP B may be difficult because the priority of the most important CSI report among all the CSI reports for the TRP B is also lower than the priorities of any of CSI report for the TRP A.

In a proposed method, the CSI reports having the same priority may be transmitted in the order of the TRPs. The CSI reports having different priorities may be transmitted according to the priorities of the CSI reports regardless of the order of the TRPs. The priority of CSI report may be defined according to the 3GPP technical specification regardless of the TRP indexes (e.g., TRPA, TRP B).

When the priorities of the CSI reports are determined according to a function (e.g., equation 9), and the indices of the serving cells associated with the CSI reports are the same, the priorities of the CSI reports may be calculated regardless of the priorities of the TRPs. Since the priority of the TRP is independent of the priority of the CSI report, if the indexes of the serving cells associated with the CSI reports are different, the priorities of the CSI reports may be determined based on the indexes of the serving cells regardless of the priorities of the TRPs.

When the priorities of the CSI reports are different, the CSI reports may be transmitted according to the priorities of the TRPs. In the same serving cell, the priority of channel quality indicator (CQI)/rank indicator (RI) report of each of the TRP A and B may be determined based on the priority of the CQI/RI report, and the priority of L1-RSRP report of each of the TRP A and B may be determined based on the priority of the L1-RSRP report. In the same serving cell, the relative priority between the CQI/RI report of the TRP A and the L1-RSRP report of the TRP B may be determined based on a comparison result between the priority of the CQI/RI report and the priority of the L1-RSRP report regardless of the priorities of the TRP A and B. In contrast, in the same serving cell, when same CSI reports are performed by different TRPs (e.g., TRP A and B), the priorities of the same CSI reports may be determined based on the priorities of the different TRPs.

In a proposed method, the priorities of some CSI reports may be determined regardless of the priorities of the TRPs, and the priorities of the remaining CSI reports may be determined according to the priorities of the TRPs. The CSI report may include a combination of one or more among L1-RSRP, CQI, precoding matrix indicator (PMI), channel state information-reference signal (CSI-RS) resource indicator (CRI), synchronization signal/physical broadcast channel (SS/PBCH) resource block indicator (SSBRI), layer indicator (LI), and RI. The type of CSI report may vary according to information included in the CSI report. The type of CSI report may be indicated by higher layer signaling.

For example, the CSI report may be CQI, PMI, a combination of CRI, RI, PMI, and CQI, a combination of CRI, RI, LI, PMI, and CQI, a combination of CRI, RI, and LI, and a combination of CRI, RI, and CQI, a combination of CRI, RI, L1, and CQI, a combination of CRI and L1-RSRP, or a combination of SSBRI and L1-RSRP. Alternatively, the CSI report may not include any information.

In the conventional 3GPP technical specification, the type of CSI report may be classified into a CSI report including L1-RSRP and a CSI report including information other than L1-RSRP. The priority of the CSI report including L1-RSRP may be higher than the priority of the CSI report including information other than the L1-RSRP. The priorities of CSI reports including information other than L1-RSRP may be the same.

All TRPs may have priorities. The priority of the TRP may correspond to the priority of the CSI report. In the procedure for determining the priorities for the ordered pairs (CSI report, TRP) of the same CSI report trigger and the same serving cell index, the priority of the CSI report including L1-RSRP may be higher than the priority of CSI report including information other than L1-RSRP regardless of the priority of the TRP. In contrast, the priority of CSI reporting including information other than L1-RSRP may be determined according to the priority of the TRP.

Accordingly, a value of k may be newly introduced. For example, k may reflect the priority of the TRP, and the priority of CSI report may be determined based on the new k. When two TRPs are present, (k=2) may be introduced. (k=1) may be applied to the TRP having the highest priority among the TRPs, and (k=2) may be applied to the TRP having the lowest priority among the TRPs. In this case, the CSI report may include information other than L1-RSRP. (k=0) may be applied to the CSI report including L1-RSRP regardless of the TRP. Since the value of k has one of three values, a value of y may be configured based on the value of k. A function for determining the priority of each of the CSI reports may be defined as in Equation 10 below.

$$pri(y,k,c,s)=3 \cdot N_{cells} \cdot M_s \cdot y + N_{cells} \cdot M_s \cdot k + M_s \cdot c + s \quad \text{[Equation 10]}$$

The above-described exemplary embodiment may be applied when the priorities of m TRPs are discriminated. Here, m may be a natural number. For example, a function for determining the priority of each of the CSI reports may be defined as in Equation 11 below.

$$pri(y,k,c,s)=m \cdot N_{cells} \cdot M_s \cdot y + N_{cells} \cdot M_s \cdot k + M_s \cdot c + s \quad \text{[Equation 11]}$$

In a proposed method, when DL data channel candidates overlap in the time domain in a generation procedure of an HARQ response codebook having a semi-static size, one DL data channel candidate may be selected from among the DL data channel candidates.

When the size of the HARQ response codebook is semi-statically determined, the terminal may derive the size of the HARQ response codebook from a feedback timing (e.g., slot offset or sub-slot offset) of the HARQ response and the DL data channel candidate (e.g., TDRA index). In the communication system supporting the TDD scheme, the slot pattern may affect the size of the HARQ response codebook. The base station may inform the terminal of at least one of the feedback timing of the HARQ response, a list (or a table) consisting of TDRA indexes, and the slot pattern using higher layer signaling. The number of HARQ responses generated within a unit time (e.g., one slot) may vary depending on the processing capability of the terminal. For example, the terminal may generate the HARQ response for one DL data channel or the HARQ responses for two or more DL data channels within a unit time (e.g., one slot).

The terminal may generate an HARQ response codebook for the HARQ response for the DL control channel indicating the HARQ response for the DL data channel and the release of the SPS DL data channel (e.g., semi-statically assigned DL data channel). When the DL control channel indicating the release of the SPS DL data channel is received, the terminal may generate the HARQ response based on a resource for receiving the SPS DL data channel.

When the slot format is configured in the terminal by higher layer signaling, the terminal may not generate an HARQ response for the TDRA index indicating the UL symbol. The terminal may generate HARQ responses for two or more DL data channels. In this case, an order may be assigned to valid DL data channel candidates (e.g., valid TDRA indexes) in a slot (or sub-slot). A reference symbol (e.g., symbol m) may be defined. For example, the most advanced symbol in the time domain among the last symbols of the valid DL data channel candidates may be configured as the reference symbol (e.g., symbol m).

When the first symbol (e.g., symbol S) of the valid DL data channel candidate is equal to the symbol m, or when the first symbol (e.g., symbol S) of the valid DL data channel candidate is located before the symbol m, the order of HARQ response bits for the valid DL data channel candidates may be early within the HARQ response codebook. When the order is assigned to the valid DL data channel candidates, the ordered DL data channel candidates may be excluded in the later procedure of determining the symbol S and the symbol m.

In this case, the base station may assign to the terminal two or more DL data channels that overlap in the time domain but do not overlap in the frequency domain. This operation may be necessary in the communication system supporting the eMBB service and the URLLC service. The terminal may multiplex an HARQ response of a DL data channel for supporting the eMBB service (e.g., high performance communication service) and an HARQ response of a DL data channel for supporting the URLLC service (e.g., service supporting an error rate of 1E-5) in the same HARQ response codebook.

In order to support a high level of URLLC service (e.g., service supporting an error rate of 1E-6), the base station may not need to assign two or more DL data channels to the terminal that overlap in the time domain but do not overlap in the frequency domain. The reason is that an HARQ response codebook in which an HARQ response for a DL data channel for supporting the eMBB service (e.g., high performance communication service) is multiplexed is different from an HARQ response codebook in which an HARQ response for a DL data channel for supporting the high level URLLC service.

Since the DL data channel is allocated to a small number of symbols, when assigning a new DL data channel for a new TB, the new DL data channel may not overlap with the previous DL data channel in the time domain. As the size of the HARQ response codebook is smaller, the reception quality of the UL control channel and/or the UL data channel may increase. Therefore, the base station may preferably assign the DL data channels so that the DL data channels do not overlap in the time domain.

In a proposed method, when DL data channel candidates overlap in the time domain, the terminal may select one DL data channel candidate among the overlapping DL data channel candidates, and consider the selected DL data channel candidate as a valid DL data channel candidate. The valid DL data channel candidate may not include UL symbols. The terminal may generate an HARQ response for the valid DL data channel candidate, and may not generate an HARQ response for the remaining invalid DL data channel candidate. The operation of selecting the DL data channel candidates that do not overlap in the time domain may be added to the generation procedure of the HARQ response codebook.

Meanwhile, the procedure of excluding TDRA indexes may be applied in various ways. For example, the proposed procedure may be applied first, and then the conventional procedure may be applied. Alternatively, the proposed procedure may be applied in the process of applying the conventional procedure. Alternatively, the conventional procedure may be applied first, and the HARQ response bit (e.g., HARQ response value) may not be mapped to some positions of the HARQ response codebook. Alternatively, a known value (e.g., NACK) may be mapped to some positions of the HARQ response codebook.

According to the difference in the procedure, the position of the HARQ response bit for the same TDRA index may be changed in the HARQ response codebook. The generation procedure of the HARQ response codebook may be shared between the base station and the terminal. Therefore, since the base station knows the allocation order of the DL data channel, the base station may know the position of the HARQ response bit for the corresponding DL data channel in the HARQ response codebook.

The proposed procedure may be further applied to TDRA indexes configured in the terminal. The terminal may derive simple TDRA indexes and generate an HARQ codebook for the simple TDRA indexes using the conventional procedure. The simple TDRA indexes may be the remaining TDRA indexes excluding TDRA indexes overlapping in the time domain among all TDRA indexes.

FIG. 33 is a conceptual diagram illustrating a first exemplary embodiment of a method for configuring a TDRA index in a communication system.

Referring to FIG. 33, TDRA index 0 may overlap TDRA index 1 in some symbols of the time domain. In order to support a high level of URLLC service, the base station may request the terminal to transmit an HARQ response for TDRA index 0 or TDRA index 1. Although there are two TDRA indexes, the terminal may generate an HARQ response for one TDRA index (e.g., one DL data channel candidate). That is, the HARQ response for one DL data channel candidate may be included in an HARQ response codebook. The HARQ response for TDRA index 0 in the HARQ response codebook needs not be distinguished from the HARQ response for TDRA index 1. The reason is that since the terminal follows the instruction of the base station, the base station may know which TDRA index the HARQ response codebook received from the terminal includes.

FIG. 34A is a conceptual diagram illustrating a second exemplary embodiment of a method of configuring a TDRA index in a communication system, FIG. 34B is a conceptual diagram illustrating a third exemplary embodiment of a method of configuring a TDRA index in a communication system, and FIG. 34C is a conceptual diagram illustrating a fourth exemplary embodiment of a method of configuring a TDRA index in a communication system.

Referring to FIGS. 34A to 34C, TDRA index 2 may overlap TDRA index 0 and TDRA index 1 in some symbols of the time domain. According to the conventional procedure, in the exemplary embodiment shown in FIG. 34A, the order of HARQ responses in the HARQ response codebook may be "HARQ response for TDRA index 2→HARQ response for TDRA index 0→HARQ response for TDRA index 1". In the exemplary embodiment shown in FIG. 34B, the order of HARQ responses in the HARQ response codebook may be "HARQ response for TDRA index 0→HARQ response for TDRA index 2→HARQ response for TDRA index 1". In the exemplary embodiment shown in FIG. 34C, the order of HARQ responses in the HARQ response codebook may be "HARQ response for TDRA index 0→HARQ response for TDRA index 2→HARQ response for TDRA index 1".

According to a proposed method, when the assignment information of TDRA index 2 is obtained, the terminal may expect not to obtain the assignment information of TDRA index 0 and the assignment information of TDRA index 1. When the assignment information of TDRA index 0 and/or the assignment information of TDRA index 1 is obtained, the terminal may expect not to obtain the assignment information of TDRA index 2. In this case, the terminal may generate an HARQ response codebook for two TDRA indexes.

When one TDRA index corresponds to one HARQ response bit (or HARQ response bit pair), the HARQ response may be represented by two HARQ response bits (or two pairs of HARQ response bits). The first HARQ response bit (or the first HARQ response bit pair) may correspond to TDRA index 0 or TDRA index 2. The second HARQ response bit (or second HARQ response bit pair) may correspond to TDRA index 1 or TDRA index 2. The HARQ response bit for TDRA index 2 may belong to one of the first HARQ response bit (or the first HARQ response bit pair) or the second HARQ response bit (or the second HARQ response bit pair).

The order of HARQ response bits in the HARQ response codebook generated by the terminal may be "HARQ response bit for TDRA index 0→HARQ response bit for TDRA index 1". When TDRA index 0 is assigned, the terminal may map the HARQ response for TDRA index 0 to the first position in the HARQ response codebook. When TDRA index 1 is assigned, the terminal may map the HARQ response for TDRA index 1 to the second position in the HARQ response codebook. When TDRA index 2 is assigned, the terminal may map the HARQ response for TDRA index 2 to the first position or the second position in the HARQ response codebook. When the HARQ response codebook does not include an HARQ response for the TDRA index, the corresponding HARQ response codebook may be regarded as NACK.

In a proposed method, the terminal may not transmit UCI according to an indication of a DL control channel.

The terminal may generate UCI based on a DL control channel (e.g., DCI) received from the base station. In particular, the terminal may generate an HARQ response for the DL data channel scheduled by the DL control channel. The DL control channel may include radio resource information of the DL data channel and radio resource information of the UL control channel. According to the conventional method, the terminal may generate an HARQ response for the DL data channel scheduled by the DL control channel, and may transmit a UL control channel or UL data channel including the HARQ response using a radio resource configured by the base station.

In a communication system supporting minimum transmission delay and short deadline of data, the base station may not be able to decode a UL control channel including an HARQ response. For example, when the terminal fails to decode a DL data channel assigned by the base station and transmits a NACK, the base station should reassign the DL data channel. When the remaining time for the TB is small, the base station may not receive the HARQ response from the terminal. In this case, the terminal may preferably not transmit the HARQ response to the base station. Since the terminal cannot know the remaining time for the TB, the terminal may determine whether to feedback the HARQ response according to signaling of the base station. The base station may inform the terminal whether to feedback the HARQ response by using an explicit signaling method or an implicit signaling method.

When an implicit signaling method is used, the base station may inform the terminal whether or not to feed back the HARQ response by using a combination of values of fields included in the DCI. The terminal may receive the DCI from the base station, and may determine that feedback of the HARQ response is requested when the combination of the values of the fields included in the DCI has a first value. The terminal may determine that feedback of the HARQ response is not requested when the combination of the values of the fields included in the DCI has a second value. The combination of the values of the fields included in the DCI may indicate an invalid scheduling or a valid scheduling to the terminal.

The above-described operation may be applied not only when the DL data channel is dynamically scheduled but also when the DL data channel is semi-statically scheduled. When the DL data channel is configured by the SPS and the DCI indicates activation of the DL data channel configured by the SPS, the terminal may determine whether to feedback the HARQ response based on the corresponding DCI.

Meanwhile, the terminal may transmit HARQ responses for two types of DL data channels (e.g., DL data channels A and B) on the same UL control channel. Feedback of the HARQ response for the DL data channel A may be needed, but feedback of the HARQ response for the DL data channel B may not be needed. The terminal may generate an HARQ response codebook including at least the HARQ response for the DL data channel A. The size of the HARQ response codebook may be determined in consideration of the HARQ response for at least the DL data channel A.

When the size of the HARQ response codebook is semi-statically indicated (e.g., type 1 in the 3GPP technical specification), the size of the HARQ response codebook may be determined by reflecting both the number of the DL data channels A and the number of the DL data channels B. The terminal may map an HARQ response bit for the DL data channel A to the HARQ response codebook, and may map an already-known value (e.g., NACK) as an HARQ response bit for the DL data channel B to the HARQ response codebook.

When the size of the HARQ response codebook is dynamically indicated (e.g., type 2 in the 3GPP technical specification), the size of the HARQ response codebook may be determined by reflecting a DAI for the DL data channel A. The DAI may be obtained from DL control channel(s), and the terminal may not increase the DAI when receiving a DCI for the DL data channel B.

When one or more of the methods proposed below are applied, the terminal may not feed back an HARQ response.

In the proposed methods, the base station may inform the terminal whether or not to feed back the HARQ response by using an explicit signaling method or an implicit signaling method. The terminal may not feedback the HARQ response according to the indication of the base station.

The DCI (e.g., DL-DCI) transmitted on the DL control channel may include radio resource information of the DL data channel and characteristic information of the TB. For example, the DCI may include a new data indicator (NDI) field, an HARQ process identification information, a CBG transmission index, a CBG flush index, a DAI field, a resource index of a UL control channel (PUCCH resource index), and the like.

In a proposed method, the value of the NDI field may be changed, and the value of the DAI field (e.g., counter DAI and/or total DAI) may not be changed.

In the conventional method, a toggled NDI may indicate that the TB allocated by the DCI is a new TB. The terminal may determine that the size of the HARQ response codebook remains the same as before based on the value of the DAI field. That is, the terminal may determine that there is no new UCI, and thus may not generate an HARQ response for the new TB. Alternatively, even when generating the HARQ response for the new TB, the terminal may not include the corresponding HARQ response in the HARQ response codebook.

In a proposed explicit signaling method, the base station may explicitly inform the terminal whether or not to feed back the HARQ response by using a specific field included in the DCI. For example, when a specific field included in the DCI has a first value, the terminal may feedback the HARQ response to the base station. When the specific field included in the DCI has a second value, the terminal may not feedback the HARQ response to the base station.

In the following exemplary embodiments, the fact that the HARQ response codebook does not include HARQ response bits means that the terminal maps an already-known value (e.g., NACK) to the corresponding position (e.g., the position corresponding to a HARQ process) in the HARQ response codebook or that the HARQ response bit is missing in the HARQ response codebook. For example, when the size of the HARQ response codebook is semi-statically determined, the terminal may map an already-known value to the corresponding position in the HARQ response codebook. When the size of the HARQ response codebook is dynamically changed, the terminal may not map the HARQ response bit to the HARQ response codebook. That is, the HARQ response bit may be missing from the HARQ response codebook.

In a proposed implicit signaling method, when the terminal knows that the TB is a TB for low latency communication (hereinafter, referred to as a 'low latency TB'), the base station may configure a redundancy version (RV) for the low latency TB to a specific value, and may inform the terminal of the RV configured to the specific value. When the RV is configured to the specific value, the terminal may not transmit the UL control channel corresponding to the HARQ response (e.g., UCI) one-to-one with respect to the low latency TB. Alternatively, the terminal may not map the HARQ response (e.g., UCI) for the low latency TB to the HARQ response codebook.

The above operation may be applied to a TB assigned by a DCI and a TB assigned by SPS. When the TB is assigned by semi-static scheduling (e.g., SPS), the terminal may determine whether the TB is a low latency TB based on a logical channel index. When TB is assigned by dynamic scheduling (e.g., DCI), the terminal may identify whether the TB is a low latency TB based on a search space (e.g., specific search space configured by higher layer signaling) of a DL control channel (e.g., DCI) or an RNTI (e.g., MCS-C-RNTI or separate RNTI) used for scrambling a CRC of the DL control channel (e.g., CRC of the DCI).

When a DL data channel is assigned by a DL control channel, the base station may explicitly inform the terminal of an RV for a codeword. The RV of the initially transmitted TB may be configured to a specific value. According to a proposed method, the terminal may know in advance a sequence of specific values of the RV. Therefore, when the base station informs the terminal of the RV set to a specific value, the terminal may determine that the corresponding TB is an initially-transmitted TB or a retransmitted TB based on the RV. The terminal may generate an HARQ response (e.g., UCI) by decoding the TB and may not map the HARQ response to an HARQ response codebook.

For example, the value of RV may be 0, 1, 2, or 3. When the RV is set to 1 or 3, the HARQ response for the TB may not be included in the HARQ response codebook. When the RV is set to 0 or 2, the HARQ response for the TB may be included in the HARQ response codebook. These operations may be indicated by higher layer signaling. Alternatively, these operations may be predefined in the 3GPP technical specification. The terminal does not know whether the TB is an initially-transmitted TB or a retransmitted TB, but may determine whether to feedback the HARQ response to the TB based on the RV.

For example, when the terminal knows that RV is indicated by a sequence and the RV is represented in the order of (0, 2, 3, 1), if the RV is set to 0, the HARQ response for TB may be included in the HARQ response codebook. If the RV is set to the remaining value (e.g., 2, 3, or 1), the HARQ response may not be included in the HARQ response codebook. These operations may be indicated by higher layer signaling. Alternatively, these operations may be predefined in the 3GPP technical specification. If the RV is set to 0, the terminal may determine that the RV 0 is reassigned by the base station even when the TB is an initially-transmitted TB or a retransmitted TB. Accordingly, the terminal may generate the HARQ response by decoding the TB, and may map the HARQ response to the HARQ response codebook.

For example, if the RV is set to a specific value (e.g., 1), the terminal may not feed back the HARQ response for the TB. That is, the HARQ response may not be mapped to the HARQ response codebook. Alternatively, if the RV is set to another value (e.g., 0, 2, or 3), the terminal may feed back the HARQ response for the TB. That is, the HARQ response may be mapped to the HARQ response codebook.

In a proposed implicit signaling method, when the terminal knows that the TB is a low-latency TB, and a NDI included in the DCI scheduling the TB is maintained as the previous value, the terminal may transmit a UL control channel one-to-one corresponding to the HARQ response (e.g., UCI) for the corresponding TB. The HARQ response for that TB may not be mapped to the HARQ response codebook.

The method described above may be applied when the TB is dynamically scheduled or when the TB is semi-statically scheduled. The terminal may know that the TB is a low latency TB based on the above-described methods. When the above-described method is applied, the terminal may determine that the TB is a retransmitted TB when the NDI included in the DCI is maintained, and thus may not feed back the HARQ response.

In a proposed implicit signaling method, when the feedback timing of the HARQ response configured by the base station is smaller than a specific value, and the NDI included in the DCI is maintained as the previous value, the terminal may transmit a UL control channel which corresponds one-to-one to the HARQ response (e.g., UCI) for the corresponding TB. Alternatively, the HARQ response for the corresponding TB may not be mapped to the HARQ response codebook.

The base station may set a specific value in consideration of the processing capability of the terminal, and may inform the terminal of the specific value through higher layer signaling. Alternatively, if the specific value is set to the minimum feedback time value according to the processing capability of the terminal, higher layer signaling for informing the specific value may not be performed. When the NDI included in the DCI is set to a new value, the terminal may determine that the corresponding TB is a new TB, and may feed back an HARQ response for the new TB. The base station may not instruct a fast feedback operation beyond the processing capability of the terminal.

The terminal may receive a DL data channel in a minimum time interval required according to the processing capability, and generate an HARQ response for a TB (e.g., DL data channel) by decoding the DL data channel. The terminal may inform the base station of its processing capability using higher layer signaling. If the specific value is the minimum feedback time required by the terminal (e.g., when the feedback time of the HARQ response indicated by the DCI scheduling the TB exceeds the processing capacity of the terminal), the terminal may not transmit a UL control channel which corresponds one-to-one to the HARQ response (e.g., UCI) for the corresponding TB. The HARQ response may not be mapped to the HARQ response codebook.

In a proposed method, when a field included in the DCI indicates the feedback time of the HARQ response set to a specific value, and the NDI included in the DCI is maintained as the previous value, the terminal may not transmit a UL control channel which corresponds one-to-one to the HARQ response (e.g., UCI) for the corresponding TB. The HARQ response may not be mapped to the HARQ response codebook.

According to the conventional method, the base station may configure time resources of UL control channels using higher layer signaling, and may transmit a DCI indicating one time resource among the time resources configured by higher layer signaling. The terminal may transmit an HARQ response for a DL data channel through a UL control channel indicated by higher layer signaling and a DCI. In a proposed method, a specific value among the values configured by higher layer signaling may indicate that the HARQ response (e.g., UCI) is not included in an HARQ response codebook.

A slot for feeding back the HARQ response may be indicated by the DCI. For example, 'PDSCH-to-HARQ_feedback timing indicator' defined in Table 8 below may be included in the DCI and may indicate the slot for feeding back the HARQ response.

TABLE 8

| PDSCH-to-HARQ_feedback timing indicator | | | |
|---|---|---|---|
| 1 bit | 2 bits | 3 bits | Number of slots k |
| '0' | '00' | '000' | $1^{st}$ value provided by dl-DataToUL-ACK |
| '1' | '01' | '001' | $2^{nd}$ value provided by dl-DataToUL-ACK |
|  | '10' | '010' | $3^{rd}$ value provided by dl-DataToUL-ACK |
|  | '11' | '011' | $4^{th}$ value provided by dl-DataToUL-ACK |
|  |  | '100' | $5^{th}$ value provided by dl-DataToUL-ACK |
|  |  | '101' | $6^{th}$ value provided by dl-DataToUL-ACK |
|  |  | '110' | $7^{th}$ value provided by dl-DataToUL-ACK |
|  |  | '111' | $8^{th}$ value provided by dl-DataToUL-ACK |

Here, 'dl-DataToUL-ACK' may be configured in the terminal using higher layer signaling. The dl-DataToUL-ACK may have a value between 0 and 15, and the number of dl-DataToUL-ACKs configured in the terminal may be up to eight. In a proposed method, the dl-DataToUL-ACK may be set to a value other than 0 to 15. The dl-DataToUL-ACK having the value other than 0 to 15 may be configured in the terminal using higher layer signaling. When 'PDSCH-to-HARQ_feedback timing indicator' included in the DCI indicates that dl-DataToUL-ACK having the value other than 0 to 15, the terminal may not map an HARQ response for a DL data channel scheduled by the DCI to an HARQ response codebook. For example, when dl-DataToUL-ACK has the value other than 0 to 15, a value defined in the 3GPP technical specification, or a value configured by the higher layer signaling, the terminal may not map any HARQ-ACK bit for the TB.

In a proposed method, when a PRI included in the DCI is set to a specific value, and a NDI included in the DCI is maintained as the previous value, the terminal transmits an HARQ response (e.g., for a DL data channel scheduled by the corresponding DCI). UCI) may not transmit a UL control channel which corresponds one-to-one to the HARQ response (e.g., UCI) for the corresponding TB. The HARQ response may not be mapped to the HARQ response codebook.

The base station may configure a set of UL control channels to the terminal using higher layer signaling. The terminal may identify a radio resource of a UL control channel based on a specific field included in the DL control channel (e.g., DCI) or an index of a CCE to which the DL control channel is mapped. When the radio resource indicated by the DCI is a specific radio resource among the radio resources of UL control channels configured by higher layer signaling, the terminal may determine that the feedback of the HARQ response is not requested.

In a proposed method, the terminal may transmit a UL control channel including the HARQ response when the HARQ response for the DL data channel is an NACK.

Meanwhile, when a transmission target error rate of the DL data channel is low, a difference between an occurrence rate of ACK and an occurrence rate of NACK may increase. When the transmission target error rate is 1E-1, an expected occurrence ratio of ACK and NACK may be 9:1. When the transmission target error rate is 1E-5, the expected occurrence ratio of ACK and NACK may be 99999:1. Instead of allocating the radio resource for the HARQ response, if the feedback operation of the HARQ response is performed through a separate procedure when the HARQ response is NACK, the usage of the UL radio resource may be reduced.

In a proposed method, the terminal may transmit a UL control channel including the corresponding HARQ response when the HARQ response is a NACK. The radio resource of the UL control channel may be indicated by the information included in the DCI scheduling the TB associated with the corresponding UL control channel. When the transmission target error rate of the DL data channel is low, it is preferable that the base station does not allocate TB to two or more terminals. The terminal may receive one TB from the base station and generate an HARQ response for the received TB.

In a proposed method, one radio resource for the feedback of the HARQ response may be shared by a plurality of terminals, and the terminal may transmit its identification information to the base station using the shared radio resource when the HARQ response is a NACK. Here, the identification information may be an RNTI of the terminal or information (e.g., PDSCH DM-RS ID) obtained from the DCI.

When the DL data channel is semi-statically scheduled and a feedback periodicity of the HARQ response configured in the terminal is short (e.g., when the feedback periodicity is a few slots or a few symbols), the size of the UL control channel required to transmit the HARQ response for each DL data channel may be large. In this case, the terminal may transmit the UL control channel including a NACK only when the NACK occurs. Accordingly, the size of the required UL control channel may be reduced, and power consumption may also be reduced at the terminal.

Since the results of the decoding operation on the DL data channel are mostly ACK, the terminal may not transmit a UL control channel in most cases. Accordingly, if the base station does not receive an HARQ response (e.g., UL control channel) from the terminal, the base station may determine that the DL data channel associated with the corresponding HARQ response has been successfully received at the terminal. When the base station receives an HARQ response (e.g., UL control channel) from the terminal, the base station may regard the corresponding HARQ response as NACK.

In case of feeding back an HARQ response for an SPS PDSCH, the terminal may use a format of UL control channel for transmitting one UCI bit (e.g., one HARQ response bit). Since the UL control channel is configured with a specific sequence, the base station may consider that the HARQ response is NACK when a specific sequence is detected in the UL control channel. The base station may consider the HARQ response as ACK if the specific sequence is not detected in the UL control channel.

The terminal may map an HARQ response (e.g., a large amount of UCI) for the dynamically-assigned DL data channel and an HARQ response for a semi-statically assigned DL data channel to the same UL control channel. In this case, when the size of the HARQ response codebook is dynamically determined, an HARQ response codebook may not include the HARQ response for the SPS PDSCH. If the size of the HARQ response codebook is determined semi-statically, the HARQ response codebook may include the HARQ response for the SPS PDSCH.

In a proposed method, feedback of HARQ response(s) for some DL data channel(s) of a plurality of DL data channels activated among semi-statically assigned DL data channels may be omitted.

When the base station periodically transmits a DL data channel to the terminal, the PDSCH may be transmitted through semi-static resource allocation, but transmission of a PDCCH may be omitted. This operation may be introduced for periodic transmission of small traffic (e.g., voice over internet protocol (VoIP) traffic) and for reducing CCE overheads. The URLLC traffic in the NR communication system may have a small size similarly to the VoIP traffic. In addition, the URLLC traffic may be transmitted periodically similarly to the VoIP traffic. Transmission reliability of the URLLC traffic may be higher than transmission reliability of the VoIP traffic. Since a low code rate is applied to a TB having a small size, the number of REs to which the DL data channel is mapped in the resource grid may not be small.

Alternatively, the URLLC traffic may not be transmitted periodically. For example, although the URLLC traffic may occur periodically on average, but may occur randomly instantaneously. In this case, the URLLC traffic may have a random offset, and an average periodicity of the URLLC traffic may be semi-static. The random offset may be referred to as a jitter, and the average periodicity may be referred to as a cycle time.

For example, according to TS 22.804, the cycle time of a mobile control panel with safety function may be 4 millisecond (ms) or more and 8 ms or less, and the mobile control panel with safety function have a jitter less than 50%. The data size is 40 bytes or more and 250 bytes or less. According to TS 22.804, a cycle time of a mobile robot may be configured variously. The cycle time required for accurate motion control may be 1 ms. The cycle time required for typical mobile robot operation may be less than 500 ms and jitter therefor may be less than 50%. According to TS 22.804, a cycle time of process automation may be within 10 ms and a jitter therefor may be less than 10%.

The base station may configure a DL SPS in the terminal using higher layer signaling (e.g., an RRC message). The RRC message for configuring the DL SPS may include information (e.g., periodicity, subframe offset) indicating time resources in which the SPS PDSCH is allocated.

In a proposed method, the periodicity of the SPS PDSCH may be configured in units of symbols or slots.

When the periodicity of the SPS PDSCH is configured as a physical time (e.g., ms), the periodicity of the SPS PDSCH may be configured regardless of a subcarrier spacing of the corresponding DL BWP. In order to support transmission of various traffic on the SPS PDSCH, it may be preferable that the periodicity of the SPS PDSCH is configured as a relative time. In a proposed method, the periodicity of the SPS PDSCH may be configured in units of slots or symbols.

According to the conventional method, the periodicity of the SPS PDSCH may be set to one of 10 ms, 20 ms, 32 ms, 40 ms, 64 ms, 80 ms, 128 ms, 160 ms, 320 ms, and 640 ms. In this case, traffic having a transmission periodicity shorter than a radio frame (e.g., 5 ms) may not be transmitted through the SPS PDSCH. In order to solve this problem, the periodicity of the SPS PDSCH may be preferably configured in units of slots or symbols. In this case, since the periodicity of the SPS PDSCH is determined based on a subcarrier spacing, it may be interpreted that subdivided periodicities of the SPS PDSCH are introduced. For example, if the periodicity of the SPS PDSCH is interpreted as 10 ms (e.g., 10 slots) at a subcarrier spacing of 15 kHz, the periodicity of the SPS PDSCH may be interpreted as 5 ms at a subcarrier spacing of 30 kHz and interpreted as 2.5 ms at a subcarrier spacing of 60 kHz.

Meanwhile, a periodicity of a UL SPS assigned by a UL configured grant may be defined in units of symbols or slots. A value and a unit related to the periodicity of the UL SPS may be equally applied to the periodicity of the DL SPS. The periodicity of the UL SPS or DL SPS may be 2 symbols, 6 symbols, 7 symbols, 1 slot, 2 slots, 4 slots, 5 slots, 8 slots, 10 slots, 16 slots, 20 slots, 128 slots, 160 slots, 256 slots, 320 slots, 512 slots, 640 slots, 1280 slots, or 2560 slots. When the extended CP is used, one slot may include 12 symbols. When the normal CP is used, one slot may include 14 symbols.

In a proposed method, each of a DCI indicating activation of the SPS PDSCH, a DCI indicating activation of the SPS PUSCH, a DCI indicating release of the activated SPS PDSCH, and a DCI indicating release of the activated SPS PUSCH may include an index and/or a bitmap. Each of the index and bitmap included in the DCI may indicate a combination of one or more SPS PDSCHs (or a combination of one or more SPS PUSCHs).

The base station may configure a plurality of DL SPSs for the corresponding DL BWP to the terminal using higher layer signaling (e.g., RRC message), and may transmit to the terminal a DL-DCI to activate or deactivate some DL SPS(s) among the plurality of DL SPSs configured by higher layer signaling. The DL-DCI (e.g., CRC of the DL-DCI) may be scrambled with a specific RNTI. The terminal may determine that the SPS PDSCH indicated by the DL-DCI is activated or deactivated.

These operations may equally apply to the UL SPS. The base station may configure a plurality of UL SPSs for a UL BWP to the terminal using higher layer signaling (e.g., RRC message), and may transmit to the terminal a UL-DCI activating or deactivating some UL SPS(s) among the plurality of UL SPSs configured by higher layer signaling. The UL-DCI (e.g., CRC of the UL-DCI) may be scrambled with a specific RNTI. The terminal may determine that a SPS PUSCH indicated by the UL-DCI is activated or deactivated.

A plurality of DL SPSs may be configured in a DL BWP, and activation or deactivation of the DL SPS may be indicated by a DL-DCI (e.g., DCI format 1_0, DCI format 1_1, or DCI format 1_2). The DL-DCI may indicate a unique DL SPS. Therefore, a separate index for indicating the DL SPS may not be needed. When two or more DL SPSs are activated in the DL BWP, the DL-DCI may include a field indicating the DL SPSs to be activated. That is, a specific field included in the DL-DCI may indicate two or more DL SPSs.

In a proposed method, the specific field included in the DL-DCI may indicate one or more DL SPS indexes. If the specific field of the DL-DCI includes one or more DL SPS indexes, the length of the specific field of the DL-DCI may depend on the number of bits needed to represent the DL SPS indexes.

The base station may identify the size of the specific field (e.g., the specific field included in the DCI) indicating one or more DL SPS indexes based on the number of DL SPSs configured in the DL BWP. The base station may inform the terminal of information instructing to receive the DL-DCI including the specific field indicating one or more DL SPS indexes by using higher layer signaling (e.g., RRC message). In this case, the RRC message may include DL-DCI related information (e.g., the size of the specific field).

In a proposed method, the specific field of the DL-DCI may include a bitmap indicating one or more DL SPS indexes. The length of the bitmap may be determined based on the number of DL SPSs configured in the DL BWP. A bit set to 0 in the bitmap may indicate that the corresponding DL SPS is deactivated, and a bit set to 1 in the bitmap may indicate that the corresponding DL SPS is activated. The base station may inform the terminal of information instructing to receive the DL-DCI including the bitmap indicating one or more DL SPS indexes using higher layer signaling (e.g., RRC message). In this case, the RRC message may include DL-DCI related information (e.g., the length of the bitmap).

In a proposed method, the DL-DCI may activate or deactivate one or more DL SPSs. To support this operation, one DL SPS index or one bit included in the bitmap may indicate two or more DL SPSs. A set of one or more DL SPSs may be referred to as a DL SPS set. An SPS PDSCH periodicity, a resource index of a UL control channel used for HARQ transmission, an MCS table, and the number of HARQ processes for each of DL SPSs belonging to the same DL SPS set may be configured identically or independently. The DL SPSs belonging to the same DL SPS set may be activated or deactivated by one DL-DCI.

Meanwhile, the DL SPS activated by the DL-DCI may be applied to another DL BWP. For example, when a DL SPS is configured in a DL BWP 1, a DL SPS indicated by a DL SPS index or a bitmap included in the DL-DCI may be applied to a DL BWP 2. The DL SPS(s) indicated by the DL-DCI may indicate the DL SPS(s) that are currently active in the DL BWP 1 and/or the changed DL BWP 2. In this case, the terminal may determine that the DL SPS(s) are activated or deactivated in the DL BWP 2. The DL SPS index or bitmap included in the DL-DCI of the DL BWP 1 may be changed.

For example, when the length of a specific field in the DL BWP 1 (i.e., a specific field included in the DL-DCI) is shorter than the length of a specific field in the DL BWP 2, in order to match the length of the specific field of the DL BWP 1 to be equal to the length of the specific field of the DL BWP 2, a most significant bit (MSB) or a least significant bit (LSB) may be added to a value of the specific field in the DL BWP 1. Each of the MSB and LSB may be 0 or 1. The terminal may determine that the DL SPS(s) indicated by the DL-DCI of the DL BWP 1 are activated in the DL BWP 2. For example, when the length of the specific field in the DL BWP 1 (i.e., the specific field included in the DL-DCI) is longer than the length of the specific field in the DL BWP 2, in order to match the length of the specific field of the DL BWP 1 to be equal to the length of the specific field of the DL BWP 2, the MSB or LSB may be deleted from the value of the specific field in the DL BWP 1. The terminal may determine that the DL SPS(s) indicated by the DL-DCI of the DL BWP 1 are activated in the DL BWP 2.

These operations may be applied to a UL SPS (e.g., configured grant Type 2 of the NR communication system). A CRC of a UL grant (e.g., DCI format 0_0, DCI format 0_1, or DCI format 0_2) may be scrambled with an RNTI (e.g., CS-RNTI) for supporting the UL SPS. In this case, a specific field of the UL-DCI may indicate one or more UL SPS indexes. When the specific field of the UL-DCI indicates two or more UL SPS indices, the specific field may be represented by a bitmap. The UL SPS index(es) or bitmap included in the UL-DCI may indicate one or more UL SPSs among a plurality of UL SPSs configured by higher layer signaling.

The base station may identify the size of the specific field (e.g., bitmap) included in the UL-DCI based on the number of UL SPSs configured in the terminal. The base station may configure information indicating the size of the specific field (e.g., bitmap) of the UL-DCI to the terminal using higher layer signaling. This configuration operation may be performed in consideration of the number of SPS PUSCHs configured in the corresponding carrier. When the size of the specific field (e.g., the specific field included in the UL-DCI) in the UL BWP 1 is different from the size of the specific field in the UL BWP 2, an MSB or LSB may be added to the specific field of the UL-DCI. Alternatively, the MSB or LSB may be deleted from the value of the specific field of the UL-DCI.

In a proposed method, a HARQ process identifier (HPID) of the SPS PDSCH may be determined based on a symbol used for initial transmission.

According to the conventional method, an HPID for the SPS PDSCH may be determined based on a slot or a subframe to which a time resource of the SPS PDSCH belongs. Since one DL SPS is activated in the DL BWP, the HPID may be explicitly indicated by the DL-DCI (e.g., DCI format 1_0, DCI format 1_1, or DCI format 1_2) so that the HPIDs of dynamically assigned PDSCHs do not overlap.

In a proposed method, a reference time for deriving the HPID may be the first symbol of the SPS PDSCH. The first symbol of the SPS PDSCH may be derived based on the first radio frame (e.g., the first system frame number (SFN)), the current radio frame (e.g., the current SFN), and an index of a symbol (e.g., symbol number) located in the current slot (e.g., slot number).

For example, the HPID may be determined based on "[floor(CURRENT_symbol/periodicity)] modulo nrof-HARQ-Processes". Here, CURRENT_symbol may be a result of (SFN×numberOfSlotsPerFrame×numberOfSymbolsPerSlot+slot number in the frame×numberOfSymbolsPerSlot+symbol number in the slot). Here, numberOfSlotsPerFrame may indicate the number of slots included in the radio frame. Here, numberOfSymbolsPerSlot may indicate the number of symbols included in the slot. Each of numberOfSlotsPerFrame and numberOfSymbolsPerSlot may be a constant defined in the 3GPP technical specification. Here, periodicity may indicate the periodicity of the DL SPS. Here, nrofHARQ-Process may indicate the number of HARQ processes. The base station may inform the terminal of periodicity and nrofHARQ-Process using higher layer signaling (e.g., RRC message).

When two or more DL SPSs are activated, the HPIDs for the two or more DL SPSs may be the same even if the reference times for deriving the HPIDs are different. In this case, the HARQ process performed by the terminal may not be accurately defined. When two or more DL SPSs having the same HPID are received, the terminal may regard the corresponding HPID as the HPID for one DL SPS.

In order to solve this problem, when the HPIDs of the DL SPSs collide, an offset of the HPID may be applied in one DL SPS. Therefore, the HPIDs of the DL SPSs may always have different values. This operation may be applied when two DL SPSs have the same HPID. The periodicity of the DL SPS for supporting the URLLC service may be a small number of symbols. Therefore, there may be three or more DL SPSs having the same HPID. When the HPID offset is applied, the HPID of the DL SPS according to the HPID offset may be the same as the HPID of another DL SPS. Therefore, when the HPID offset is applied, another collision problem may be caused.

In a proposed method, since the base station knows the DL SPSs having the same HPID, the base station may perform a dynamic scheduling operation for the DL SPS which is lately mapped to the HPID among the corresponding DL SPSs. That is, the corresponding DL SPS may be a dynamic scheduling operation rather than a semi-static scheduling operation.

The base station may dynamically assign a PDSCH in a time resource overlapping a SPS PDSCH in the time domain. When a semi-statically assigned PDSCH in the time domain overlaps a dynamically assigned PDSCH, the terminal may expect to receive DL data through the dynamically assigned PDSCH. This operation may be a method of considering the HPID as an HPID for an early-received SPS PDSCH.

In a proposed method, the HPID may be considered as an HPID for a lately-received SPS PDSCH. The terminal may store soft bits of the last received SPS PDSCH in a soft buffer position corresponding to the HPID for the previously received SPS PDSCH.

When two or more SPS PDSCHs are received at the terminal at similar timings, a time budget for a retransmission procedure of the SPS PDSCH received earlier at the terminal may be present at the base station. If the SPS PDSCH transmission satisfies the URLLC requirement, the base station may proceed quickly with the retransmission procedure. Therefore, it may be preferable to utilize the corresponding HPID for the SPS PDSCH received later at the terminal.

In a proposed method, the terminal may interpret the HPID for the SPS PDSCH having a high priority based on the priority of the traffic (e.g., URLLC traffic having a high priority or eMBB traffic having a low priority), which is implicitly or explicitly indicated by the DL-DCI activating the DL SPS.

When the HPID for the SPS PDSCH supporting the URLLC is the same as the HPID for the SPS PDSCH supporting the eMBB, the terminal may not receive the SPS PDSCH supporting the eMBB. In this case, the terminal may not feed back an HARQ response (e.g., HARQ response for the SPS PDSCH supporting the eMBB). Alternatively, the terminal may feed back a NACK.

These operations may be applied to UL SPS. When two or more SPS PUSCHs have the same HPID, three or more SPS PUSCHs may have the same HPID even if an HPID offset is applied. Alternatively, the HPID of the SPS PUSCH to which the HPID offset is applied may collide with the HPID for another UL SPS.

When a proposed method is applied, since the base station knows UL SPSs having the same HPID, the base station may solve the problem of collision of the HPIDs of the UL SPSs by performing dynamic scheduling.

The base station may receive a buffer status report (BSR) from the terminal. Accordingly, the base station may dynamically assign a UL data channel at an appropriate timing based on the BSR. Since an HPID of the dynamically assigned UL data channel may be configured differently from an HPID of the UL SPS, the problem of collision between the HPIDs of the UL SPSs can be solved.

In a proposed method, the HPID may be regarded as the HPID for the SPS PUSCH transmitted later.

The terminal may not necessarily transmit a UL data channel periodically according to a UL SPS. Therefore, the problem of the transmission procedure according to the DL SPS may occur at a low frequency in the transmission procedure according to the UL SPS. In particular, when the UL SPS supporting the URLLC is performed, the terminal may expect the base station to proceed with the TB retransmission procedure quickly. Therefore, when a new SPS PUSCH uses the same HPID, the terminal may delete the existing soft bits stored in the soft buffer and store new soft bits in the soft buffer.

In a proposed method, the HPID may be used in the SPS PUSCH having a high priority along with the UL-DCI for activating the UL SPS.

In this case, the terminal may map a SPS PUSCH having a low priority to a resource of the next period instead of this period. Therefore, the problem of collision of HPID can be solved.

In a proposed method, HARQ response bits for a SPS PDSCH set may be derived.

A DL SPS set (e.g., a set including two or more DL SPSs) to support DL URLLC traffic may be activated. The DL URLLC traffic may have a certain periodicity and jitter. Accordingly, as the DL SPSs are activated, the DL URLLC traffic may be delivered to the terminal through SPS PDSCHs.

Figure 35A:
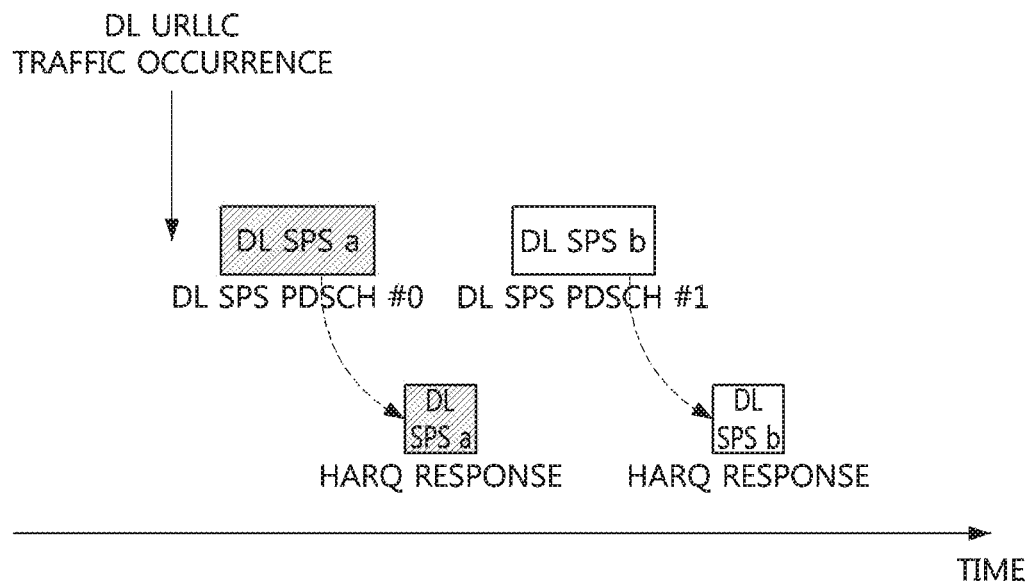
FIG. 35A is a conceptual diagram illustrating a first exemplary embodiment of a method for configuring a DL SPS for supporting DL URLLC traffic in a communication system.
Figure 35B:
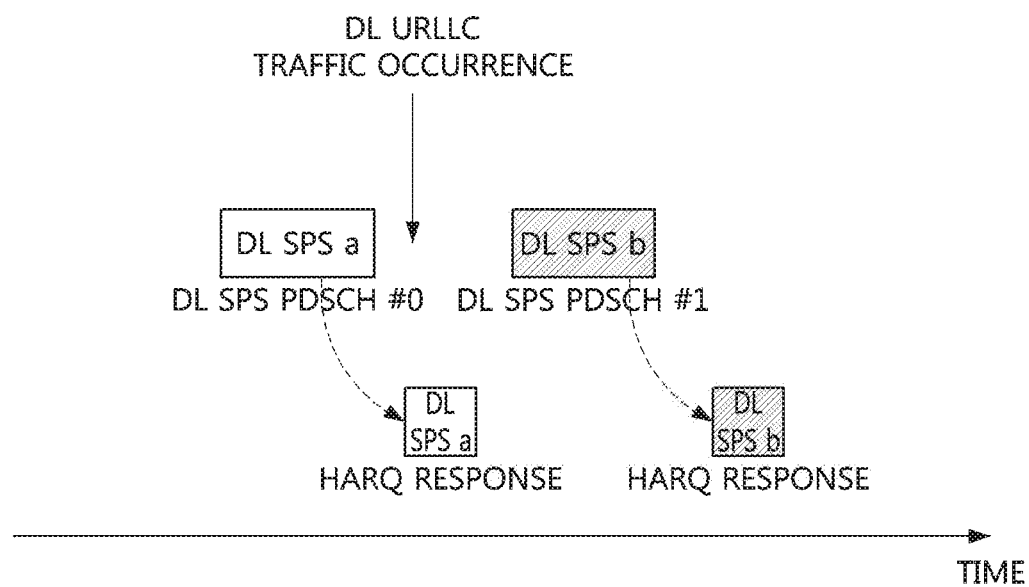
FIG. 35B is a conceptual diagram illustrating a second exemplary embodiment of a method for configuring a DL SPS for supporting DL URLLC traffic in a communication system.
Figure 35C:
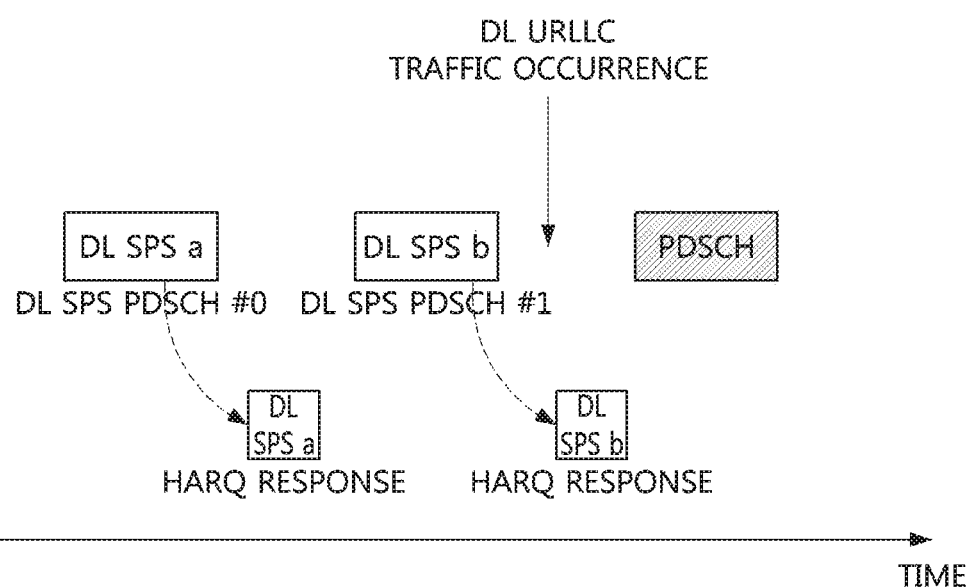
FIG. 35C is a conceptual diagram illustrating a third exemplary embodiment of a method for configuring a DL SPS for supporting DL URLLC traffic in a communication system.

FIG. 35A is a conceptual diagram illustrating a first exemplary embodiment of a method for configuring a DL SPS for supporting DL URLLC traffic in a communication system, FIG. 35B is a conceptual diagram illustrating a second exemplary embodiment of a method for configuring a DL SPS for supporting DL URLLC traffic in a communication system, and FIG. 35C is a conceptual diagram illustrating a third exemplary embodiment of a method for configuring a DL SPS for supporting DL URLLC traffic in a communication system.

Referring to FIGS. 35A to 35C, two DL SPSs (e.g., DL SPS a and DL SPS b) may be activated. In the exemplary embodiment shown in FIG. 35A, DL URLLC traffic may occur before a SPS PDSCH #0. In this case, the base station may transmit the DL URLLC traffic to the terminal on the SPS PDSCH #0. The terminal may receive the DL URLLC traffic on the SPS PDSCH #0, and transmit an HARQ response for the DL URLLC traffic to the base station. The terminal may expect not to receive the DL URLLC traffic on a SPS PDSCH #1. Accordingly, the terminal may not perform a monitoring operation for the SPS PDSCH #1 and may not feedback an HARQ response to the SPS PDSCH #1.

In the exemplary embodiment shown in FIG. 35B, the DL URLLC traffic may occur between the SPS PDSCH #0 and the SPS PDSCH #1. The base station may not transmit the DL URLLC traffic on the SPS PDSCH #0. The terminal may perform a monitoring operation for the SPS PDSCH #0. Since the DL URLLC traffic is not received on the SPS PDSCH #0, the terminal may not transmit an HARQ response for the DL URLLC traffic to the base station. Alternatively, the terminal may feed back a NACK to the base station.

On the other hand, the base station may transmit the DL URLLC traffic to the terminal on the SPS PDSCH #1. Although the terminal did not detect the SPS PDSCH #0, the terminal may expect to detect the SPS PDSCH #1. The terminal may detect a DM-RS resource for the SPS PDSCH #1 in order to detect the SPS PDSCH #1. When the DM-RS resource for the SPS PDSCH #1 is detected, the terminal may determine that the SPS PDSCH #1 is received. Accordingly, the terminal may receive the DL URLLC traffic on the SPS PDSCH #1 and transmit an HARQ response for the DL URLLC traffic to the base station.

In the exemplary embodiment shown in FIG. 35C, the DL URLLC traffic may occur after the SPS PDSCHs #0 and #1. In this case, the base station may assign a DL data channel in a dynamic scheduling scheme and transmit the DL URLLC traffic on the DL data channel. The terminal may detect the DM-RS resource of the SPS PDSCH #0, and may determine that the SPS PDSCH #0 is not transmitted when the DM-RS resource is not detected. Therefore, the terminal may not transmit the HARQ response for the SPS PDSCH #0. Alternatively, the terminal may transmit a NACK for the SPS PDSCH #0 to the base station.

In addition, the terminal may detect the DM-RS resource of the SPS PDSCH #1, and may determine that the SPS PDSCH #1 is not transmitted when the DM-RS resource is not detected. Therefore, the terminal may not transmit the HARQ response for the SPS PDSCH #1. Alternatively, the terminal may transmit a NACK for the SPS PDSCH #1 to the base station.

In a proposed method, the terminal may not derive an HARQ response bit for the deactivated SPS PDSCH.

In the conventional method, when the size of the HARQ response codebook is semi-static, the terminal may multiplex HARQ responses for all DL data channel candidates configured by higher layer signaling. This operation may be performed when one DL SPS is configured in the communication system supporting the eMBB service.

In the communication system supporting the URLLC service, the base station may configure a plurality of DL SPSs in a DL BWP using higher layer signaling, and may use a DCI to activate one or more DL SPSs among the plurality of DL SPSs configured by higher layer signaling. The terminal may receive DL data through the activated SPS PDSCH(s). The terminal may not feed back an HARQ response for some SPS PDSCHs among the activated SPS PDSCHs. That is, it may be prevented that many HARQ responses are fed back.

In a proposed method, the terminal may feed back HARQ responses for SPS PDSCHs according to one or more DL SPSs among the activated DL SPSs.

Here, the SPS PDSCHs according to the one or more DL SPSs may be SPS PDSCHs actually transmitted from the base station. For example, to support transmission of URLLC traffic with a periodicity of 6 ms, the base station may activate a DL SPS with a periodicity of 2 ms, and may transmit the SPS PDSCH in one-thirds of total transmission instances according to the activated DL SPS. Since the terminal does not detect the presence of the SPS PDSCH in two-thirds of the total transmission instances according to the activated DL SPS, the terminal may not feed back an HARQ response for the undetected SPS PDSCH.

When it is determined that a SPS PDSCH is not received, the terminal may not transmit an HARQ response for the corresponding SPS PDSCH. When the terminal feeds back an HARQ response for the SPS PDSCH on a UL control channel, the size of the corresponding HARQ response may be 1 bit or 2 bits. When it is determined that a SPS PDSCH is not received, the terminal may not transmit a UL control channel for the corresponding SPS PDSCH.

When an HARQ codebook having a semi-static size is configured and it is determined that a SPS PDSCH is not received, the terminal may transmit a NACK as an HARQ response for the corresponding SPS PDSCH. When an HARQ book having a dynamic size is configured, a DAI may be configured without consideration of an SPS PDSCH that is not actually transmitted from the base station. When a DL data channel is dynamically assigned using a DL-DCI in a slot to which the SPS PDSCH is assigned or in a subsequent slot of the slot to which the SPS PDSCH is assigned, the number of DL data channels indicated by the DAI included in the DL-DCI may not include the SPS PDSCH.

In a proposed method, the terminal may interpret a unit in which the SPS PDSCH is received as a DL SPS set.

Referring back to FIGS. 35A to 35C, one DL SPS set may include two DL SPSs. The maximum size of the HARQ response bits for the DL SPS set may be 1 bit. When the SPS PDSCH consists of two codewords, the size of HARQ response bits for the DL SPS set may be up to 2 bits.

When DL URLLC traffic has a large range of jitter, the DL SPS set may consist of a large number of DL SPSs. The maximum size of the HARQ response bits for the DL SPS set may be 1 bit. When the SPS PDSCH consists of two codewords, the maximum size of the HARQ response bits for the DL SPS set may be 2 bits.

When the HARQ response is generated on a DL SPS set basis, the actual position of the HARQ response bits in the HARQ response codebook may not be determined according to the reception timing of a SPS PDSCH. This is because the base station may not transmit the SPS PDSCH. Therefore, the HARQ response bits may be mapped according to a reference position in the HARQ response codebook. For example, the reference position may be configured based on symbols of an SPS PDSCH of the first DL SPS or the last DL SPS belonging to the DL SPS set. When the SPS PDSCHs for all the DL SPSs belonging to the DL SPS set are not received, the terminal may map a NACK to the HARQ response codebook.

In a proposed method, the terminal may generate the HARQ response codebook including HARQ response bits for dynamically assigned DL data channels, and generate the entire HARQ response codebook by concatenating the HARQ response bits for the SPS PDSCHs in the corresponding HARQ response codebook.

When there is no HARQ response for the SPS PDSCH, the size of the entire HARQ response codebook generated by the terminal may be reduced. The base station may interpret that the size of the entire HARQ response codebook has one of two values. Since the SPS PDSCH is assigned by the base station, the base station may interpret that the size of the entire HARQ response codebook would have one value in implementation.

In a proposed method, the terminal may not transmit an HARQ response for some SPS PDSCHs among the SPS PDSCHs activated by the base station according to a slot pattern.

The terminal may transmit an HARQ response for the SPS PDSCH on a PUCCH. In the conventional method, an SPS PDSCH may be transmitted in a periodically allocated resource, and an HARQ response to the SPS PDSCH may also be transmitted in a periodically allocated resource. However, the terminal may not periodically transmit a PUCCH (e.g., HARQ response) according to a slot format. For example, the PUCCH may not be transmitted in DL symbols.

When FL symbols are changed to UL symbols, the PUCCH may be transmitted through the corresponding UL symbols.

In a proposed method, a transmission timing of the HARQ response may be changed, and the terminal may transmit the HARQ response on a PUCCH capable of transmitting the HARQ response. For example, the terminal may not transmit HARQ responses for two SPS PDSCHs in a periodically assigned PUCCH. The terminal may multiplex the HARQ responses for the two SPS PDSCHs and the HARQ response for the last SPS PDSCH, and transmit the multiplexed HARQ responses on a PUCCH for the last SPS PDSCH. Therefore, the HARQ response bits transmitted by the terminal may vary depending on a slot format.

If the terminal does not receive a slot format indicator (SFI) that is dynamically transmitted from the base station, the number of HARQ response bits may vary. It may be preferable that a transmission timing of the PUCCH for the SPS PDSCH configured to support URLLC traffic transmission is not changed.

In a proposed method, the terminal may not perform a decoding operation for the corresponding SPS PDSCH when the terminal cannot transmit the PUCCH for the SPS PDSCH. Accordingly, the base station may omit transmission of the corresponding SPS PDSCH (e.g., the SPS PDSCH not decoded by the terminal). In order to support the transmission of URLLC traffic in the communication system supporting the TDD scheme, when the terminal determines that PUCCH transmission is impossible according to the slot format, the base station may assign a PDSCH by the dynamic scheduling scheme instead of the DL SPS.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a terminal in a communication system, the operation method comprising:
   receiving downlink (DL) data #1 from a base station through a DL data channel #1;
   receiving DL data #2 from the base station through a DL data channel #2; and
   when each of an uplink (UL) control channel #1 on which a hybrid automatic repeat request (HARQ) response #1 for the DL data #1 is to be transmitted and an UL control channel #2 on which an HARQ response #2 for the DL data #2 is to be transmitted overlaps with an UL data channel assigned by the base station, transmitting the HARQ response #1 and the HARQ response #2 to the base station through the UL data channel,
   wherein when the UL data channel is transmitted based on a frequency hopping scheme and includes a first UL instance and a second UL instance, the HARQ response #1 is transmitted on the first UL instance of a hop #n, the HARQ response #2 is transmitted on the second UL instance of a hop #m, and n and m are different natural numbers.

2. The operation method according to claim 1, wherein at least one DL data channel among the DL data channel #1 and the DL data channel #2 is indicated by a dynamic scheduling scheme, and a remaining DL data channel is indicated by a semi-persistent scheduling scheme.

3. The operation method according to claim 1, wherein when a priority of each of the DL data #1 and the DL data #2 is identical to a priority of UL data to be transmitted through the UL data channel, the HARQ response #1 and the HARQ response #2 are multiplexed in the UL data channel.

4. The operation method according to claim 1, wherein each of the UL control channel #1 and the UL control channel #2 is configured in units of a sub-slot, and the UL data channel is configured in units of a slot comprising two or more sub-slots.

5. The operation method according to claim 1, wherein a first HARQ codebook including the HARQ response #1 is multiplexed in the first UL instance, and a second HARQ codebook including the HARQ response #2 is multiplexed in the second UL instance.

6. The operation method according to claim 5, wherein each of the first and second HARQ codebooks is configured in units of a slot comprising two or more sub-slots.

7. The operation method according to claim 1, wherein UL scheduling information of the UL data channel is received after DL scheduling information #1 of the DL data #1 and DL scheduling information #2 of the DL data #2, and a size of the UL data channel is configured considering a size of the HARQ response #1 and a size of the HARQ response #2.

8. The operation method according to claim 1, wherein a size of uplink control information (UCI) including the HARQ response #1 and the HARQ response #2 is estimated based on UL scheduling information of the UL data channel, and a puncturing operation or a rate-matching operation for the UL data channel is performed based on the estimated size of the UCI.

9. The operation method according to claim 1, wherein a timing of encoding the HARQ response #1 is identical to a timing of encoding the HARQ response #2.

10. The operation method according to claim 1, wherein the HARQ response #1 is multiplexed in a radio resource overlapping or adjacent to the UL control channel #1 among radio resources occupied by the UL data channel, and the HARQ response #2 is multiplexed in a radio resource overlapping or adjacent to the UL control channel #2 among the radio resources occupied by the UL data channel.

11. The operation method according to claim 1, wherein when the DL data channel #2 is located after the DL data channel #1 in a time domain, an interval between a last symbol of the DL data channel #2 and a start symbol of the UL data channel is equal to or larger than an interval configured by the base station.

12. An operation method of a base station in a communication system, the operation method comprising:
    transmitting downlink (DL) data #1 to a terminal through a DL data channel #1;
    transmitting DL data #2 to the terminal through a DL data channel #2;
    generating uplink (UL) scheduling information of an UL data channel;
    transmitting the UL scheduling information to the terminal; and
    receiving UL data, a hybrid automatic repeat request (HARQ) response #1, and a HARQ response #2 on the UL data channel indicated by the UL scheduling information,
    wherein each of an UL control channel #1 on which the HARQ response #1 is to be transmitted and an UL control channel #2 on which the HARQ response #2 is to be transmitted overlaps with the UL data channel, and
    wherein when the UL data channel is transmitted based on a frequency hopping scheme and the UL data channel includes a first UL instance and a second UL instance, the HARQ response #1 is transmitted on the first UL instance of a hop #n, the HARQ response #2 is transmitted on the second UL instance of a hop #m, and n and m are different natural numbers.

13. The operation method according to claim 12, wherein when a priority of each of the DL data #1 and the DL data #2 is identical to a priority of the UL data to be transmitted through the UL data channel, the HARQ response #1 and the HARQ response #2 are multiplexed in the UL data channel.

14. An operation method of a terminal in a communication system, the operation method comprising:
- receiving downlink (DL) data from a base station through a DL data channel;
- when an uplink (UL) control channel on which a hybrid automatic repeat request (HARQ) response for the DL data is to be transmitted overlaps with first and second UL instances included in an UL data channel assigned by the base station, transmitting the HARQ response and UL data in the first UL instance located first in time among the first and second UL instances to the base station; and
- transmitting the UL data in the second UL instance,
- wherein transmission of UL data is repeated in the first and second UL instances.

\* \* \* \* \*